United States Patent [19]

Belle Isle

[11] 3,962,685
[45] June 8, 1976

[54] DATA PROCESSING SYSTEM HAVING PYRAMIDAL HIERARCHY CONTROL FLOW

[75] Inventor: Albert P. Belle Isle, Pittsfield, Mass.

[73] Assignee: General Electric Company, Salem, Va.

[22] Filed: June 3, 1974

[21] Appl. No.: 476,030

[52] U.S. Cl. ............................................. 340/172.5
[51] Int. Cl.² ......................................... G06F 15/16
[58] Field of Search ...................... 340/172.5; 445/1

[56] References Cited
UNITED STATES PATENTS

| | | | |
|---|---|---|---|
| 3,537,074 | 10/1970 | Stokes | 340/172.5 |
| 3,541,516 | 11/1970 | Senzig | 340/172.5 |
| 3,544,973 | 12/1970 | Borck et al. | 340/172.5 |
| 3,566,363 | 2/1971 | Driscoll | 340/172.5 |
| 3,701,976 | 10/1972 | Shively | 340/172.5 |
| 3,702,462 | 11/1972 | England | 340/172.5 |
| 3,711,835 | 1/1973 | Jaeger et al. | 340/172.5 |

*Primary Examiner*—Mark E. Nusbaum
*Attorney, Agent, or Firm*—Arnold E. Renner; Robert E. Brunson

[57] ABSTRACT

A data processing system employing a pyramidal hierarchical scheme of control flow in which instruction words identifying operations to be performed include defined portions prescribing the path of control flow through the system and in which lower level elements identify to those elements in the control flow path at higher levels the ability of the former elements to perform the next in a sequence of operations.

22 Claims, 29 Drawing Figures

| | | | |
|---|---|---|---|
| 77 | XXX | SPARE | |
| 76 | XXX | SPARE | |
| 75 | XXX | SPARE | |
| 74 | XXX | SPARE | |
| 73 | XXX | SPARE | |
| 72 | R | TRANSFER | DMU TO R |
| 71 | XXX | TRANSFER | BLU DATA ACKNOWLEDGE |
| 70 | XXX | SPARE | |
| 67 | XXX | SPARE | |
| 66 | XXX | SPARE | |
| 65 | XXX | LOGICAL | SET 4-BIT BLU CONDITION |
| 64 | XXX | LOGICAL | SET-UP BLU LOGIC UNITS TO EXOR/OR |
| 63 | XXX | LOGICAL | SET-UP BLU LOGIC UNITS TO OR/AND |
| 62 | XXX | LOGICAL | SET-UP BLU LOGIC UNITS TO AND/OR |
| 61 | N | TRANSFER | RTC CONDITION TO BLU FUNCTION LATCH, BIT N |
| 60 | N | TRANSFER | BLU LOGIC UNIT 2 TO FUNCTION LATCH, BIT N |
| 57 | R | TRANSFER | (N) TO BLU FUNCTION LATCH |
| 56 | XXX | LOGICAL | RESET BLU FUNCTION LATCH |
| 55 | R | TRANSFER | (R) TO BLU LOGIC UNIT INPUT B |
| 54 | U | TRANSFER | U TO BLU LOGIC UNIT INPUT B |
| 53 | R | TRANSFER | (R) TO BLU LOGIC UNIT INPUT A |
| 52 | XXX | TRANSFER | DMU TO BLU LOGIC UNIT INPUT A |
| 51 | XXX | SPARE | |
| 50 | XXX | SPARE | |
| 47 | R | TRANSFER | |
| 46 | R | TRANSFER | DMU TO K |
| 45 | R | TRANSFER | O HIGH TO R, ACKNOWLEDGE DATA |
| 44 | R | TRANSFER | O LOW TO R, ACKNOWLEDGE DATA |
| 43 | R | TRANSFER | BLU LOGIC UNIT INPUT A TO R |
| 42 | R | TRANSFER | BLU LOGIC UNIT 1 TO R |
| 41 | R | TRANSFER | BLU FUNCTION LATCH TO R |
| 40 | XXX | NOP | |

OUTPUT BITS

| OP CODES | DESCRIPTION | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|---|
| 40 | NO OP | | | | | | | | | | | | | | | | | | | | | | | | | | | | | | | | |
| 41 | LD(R)/F | 1 | 1 | 1 | 1 | 0 | 1 | | | | | | | | | | | | | | | | | | | | | | | | | | |
| 42 | LD(R)/ALU-1 | 1 | 1 | 1 | 1 | 1 | 0 | 1 | 0 | | | | | | | | | | | | | | | | | | | | | | | | |
| 43 | LD(R)/A | 1 | 1 | 1 | 0 | 1 | 0 | 0 | 1 | | | | | | | | | | | | | | | | | | | | | | | | |
| 44 | LD(R)/BUF, L ACK | | | | | | | | | | | | | | | | | | | | | | | | | | | | | | | | |
| 45 | LD(R)/BUF, U ACK | | | | | | | | | | | | | | | | | | | | | | | | | | | | | | | | |
| 46 | LD(R) IOU | | | | | | | | | | | | | | | | | | | | | | | | | | | | | | | | |
| 47 | LD(R)/V | | | | | | | | | | | | | | | | | | | | | | | | | | | | | | | | |
| 50 | SPARE | | | | | | | | | | | | | | | | | | | | | | | | | | | | | | | | |
| 51 | SPARE | | | | | | | | | | | | | | | | | | | | | | | | | | | | | | | | |
| 52 | LD A/IOR | | | | 1 | 1 | 0 | 1 | | | | | | | | | | | | | | | | | | | | | | | | | |
| 53 | LD A/(R) | | | | 1 | 0 | 1 | 0 | | | | | | | | | | | | | | | | | | | | | | | | | |
| 54 | LD B/MASK | | | | | | | | | | | | | | 1 | | | 1 | 1 | | 1 | | | | | | | | | | | | |
| 55 | LD B/(R) | | | | | | | | | | | | | | | 1 | | 1 | 1 | | 1 | | | | | | | | | | | | |
| 56 | LD F/O | | | | | | | | | | | | | | | | | | | 1 | 1 | | | | | | | | | | | | |
| 57 | LD F/(R) | | | | | | | | | | | | | | | | | | | 1 | 1 | | | | | | | | | | | | |
| 60 | LDF(N)/ALU-2 | | | | | | | | | | | | | | | | | | | | | | | 0 | 1 | 1 | 0 | 1 | 1 | | | | |
| 61 | LD F(N)/RTC | | | | | | | | | | | | | | | | | | | | | | | 0 | 1 | 1 | 0 | 1 | 1 | | | | |
| 62 | ALU ÷/+ | | | | | | | | | | | | | | | | | | | | | | | | | | | | | | | 1 | |
| 63 | ALU +/÷ | | | | | | | | | | | | | | | | | | | | | | | | | | | | | | | | 1 |
| 64 | ALU +/+ | | | | | | | | | | | | | | | | | | | | | | | | | | | | | | | 1 | 1 |
| 65 | LD COND | | | | | | | | | | | | | | | | 1 | | | | | | | | | | | | | | | | |
| 66 | SPARE | | | | | | | | | | | | | | | | | | | | | | | | | | | | | | | | |
| 67 | SPARE | | | | | | | | | | | | | | | | | | | | | | | | | | | | | | | | |
| 70 | SPARE | | | | | | | | | | | | | | | | | | | | | | | | | | | | | | | | |
| 71 | DATA READY | | | | | | | | | | | | | | | 1 | | | | | | | | | | | | | | | | | |
| 72 | LD (R)/IOU, | 0 | 1 | 1 | | | | | | | | | | | | | | | | | | | | | | | | | | | | | |
| 73 | SPARE | | | | | | | | | | | | | | | | | | | | | | | | | | | | | | | | |
| 74-77 | SPARES | | | | | | | | | | | | | | | | | | | | | | | | | | | | | | | | |

DESCRIPTION OF MICRO-CODE GENERATOR OUTPUTS

| BIT # | DESCRIPTION | FUNCTION |
|---|---|---|
| 0 | MULTIPLEXER B | CONTROL LINES FOR MULTIPLEXER B |
| 1 | | |
| 2 | | |
| 3 | SP | SPARE SIGNAL |
| 4 | MULTIPLEXER E | CONTROL LINES FOR MULTIPLEXER E |
| 5 | | |
| 6 | MULTIPLEXER F | CONTROL LINES FOR MULTIPLEXER F |
| 7 | | |
| 8 | SP | SPARE SIGNAL |
| 9 | SP | SPARE SIGNAL |
| 10 | SP | SPARE SIGNAL |
| *11 | SP | SPARE SIGNAL |
| 12 | SP | SPARE SIGNAL |
| *13 | LD LATCH | LOAD ENABLE SIGNAL FOR BLU OUTPUT LATCH |
| *14 | DATA REC | DATA RECEIVED ENABLE SIGNAL |
| *15 | DATA READY | DATA READY ENABLE SIGNAL |
| *16 | LD A | LOAD ENABLE SIGNAL FOR THE A LATCH |
| *17 | LD B | LOAD ENABLE SIGNAL FOR THE B LATCH |
| 18 | SP | SPARE SIGNAL |
| 19 | SP | SPARE SIGNAL |
| **20 | 0-3R/$\overline{W}$ | ENABLE SIGNAL FOR R-REGISTER BITS 0-3 |
| **21 | 4-7R/$\overline{W}$ | ENABLE SIGNAL FOR R-REGISTER BITS 4-7 |
| *22 | LD COND. F/F | ENABLE SIGNAL FOR LOADING THE T/C F/F WHICH DRIVES THE BLU-CONDITION LINE WITH THE RESULTS OF A 4-BIT COMPARE |
| 23 | SP | SPARE SIGNAL |
| 24 | $ALU_1$ | CONTROL SIGNALS FOR $ALU_1$ |
| 25 | | |
| 26 | $ALU_2$ | CONTROL SIGNALS FOR $ALU_2$ |
| 27 | | |
| *28 | LD ALU | ENABLE SIGNAL FOR LOADING $ALU_1$ AND $ALU_2$ WITH THEIR CONTROL SIGNALS |
| *29 | (N) | ENABLE SIGNAL FOR LOADING BIT N OF THE F LATCH |
| *30 | ALL | ENABLE SIGNAL FOR LOADING ALL FOUR BITS OF THE F LATCH |
| *31 | RESET | ENABLE SIGNAL THAT RESETS THE F LATCH |

\* USED AS AN ENABLE SIGNAL FOR THE CONTROL AND TIMING SIGNAL "EXECUTE"

\*\* USED AS AN ENABLE SIGNAL FOR THE CONTROL AND TIMING SIGNAL "WRITE"

FIG.16

FIG. 21 BASIC VDEM TIMING

3,962,685

DATA PROCESSING SYSTEM HAVING PYRAMIDAL HIERARCHY CONTROL FLOW

BACKGROUND OF THE INVENTION

The present invention relates generally to data processing systems and more particularly to a new approach to the basic structure, or "architecture" of programmable digital data processing systems.

A programmable digital data processing system can be defined as an assemblage of physical information processing and storage components, "hardware", which are interconnected and operationally under the basic control of an internally stored sequence of instructions, called "software". The same hardware, when provided or "programmed" with different software, can be used to perform a wide range of desired digital data processing tasks of a complex nature. The choice of the particular information processing functions to be performed by each hardware element, the numbers of such elements, and their arrangement into an interconnected structure which provides for data communication between elements in an orderly fashion under the control of a stored sequence of instructions or program, which instructions may be treated as data to be processed or modified by the hardware elements, can be defined as the architecture of such a system.

Three basic architectures known to the prior art are further described in the Detailed Description which follows. These architectures, as is true of most data processing systems of the type usually referred to as "general purpose computers", are such that the cost and degree of complexity of the software needed to program them to achieve a desired set of information processing operations have become inordinately high in many areas of application, such as automation systems, which require complex "real-time" digital data processing functions.

SUMMARY OF THE INVENTION

It is, therefore, a principal object of the present invention to provide a new and improved data processing system. It is a further object to provide a data processing system employing a novel architecture which facilitates the establishment of control flow in an orderly manner so as to require a lesser amount of software than was heretofore possible through the direct execution of instructions of higher complexity. Another object is to provide a new architecture for programmable digital data processing systems within which different subsets of such systems' instruction sets are the specific "responsibility" of different distinct, selfcontained portions of the systems' hardware.

It is a still further object to provide a data processing system in which specific instruction words are the distinct responsibility of defined portions of the system hardware to provide an overall system which is highly modular and extremely flexible.

The foregoing and other objects which will become apparent as this description proceeds are achieved, in accordance with the present invention, through the employment of a plurality of two types of subsystems or processing units, designated execution processing units and translator processing units in a distributed, multilevel pyramidal hierarchy. An execution processing unit is one which performs a final system function while a translator processing unit performs routing and sequencing of instructions to lower level processing units.

In the system of the present invention, a first level controller initiates the basic system sequencing by sequentially retrieving instruction words from a store and placing those words on an instruction bus which interfaces the controller with the next lower level of the system. A minimum of two lower levels are provided, each including a plurality of processing units, at least one of which is of the translator type. An appropriate interfacing instruction bus is provided between adjacent levels. Thus, the system results in a pyramidal hierarchy of at least two major legs. Each of these major legs and branches thereof terminates in one or more execution processing units to perform the final system function, such as computation or communication with equipment outside of the system.

Each instruction word includes an operation code portion and an operand field which contains one or more operands. Each processing unit includes recognition circuitry responsive to the operation code portion of an instruction word presented on an interface bus at its input. Through the recognition circuitry, the unit will accept only a specified word or words. If the accepting unit is of the execution type, the word will be used to direct the performance of a function. If the accepting unit is of the translator type, one of two modes of operation will result. The first mode is one of routing in which the translator merely passes the word on to the next lower interface bus. The second mode results in the translator accessing an associated store to secure additional instruction words for placement on the instruction bus at its output. The instruction words so placed are for the use of lower level processing units, either execution or translator as the case may be.

To facilitate the orderly flow of control and prevent the loss of information, there is further provided means for lower level units to signify to higher level units or to the controller, as the case may be, its ability to accept an instruction word and to prevent the changing of an available instruction word if the unit next in the flow chain is unable to accept it.

DESCRIPTION OF THE DRAWINGS

While this specification concludes with claims distinctly pointing out and claiming what is considered to be the present invention, a better understanding thereof may be had from the attached specification taken in conjunction with the accompanying drawings in which:

FIG. 14 is a descriptive tabulation of instructions for use by the processing unit of FIG. 11.

FIGS. 15 and 16 list patterns of control bits and the purpose of those bits for performing control functions to control the operation of the processing unit of FIG. 11 as specified by operation codes in instructions provided to that unit.

. DETAILED DESCRIPTION

Figure 1:
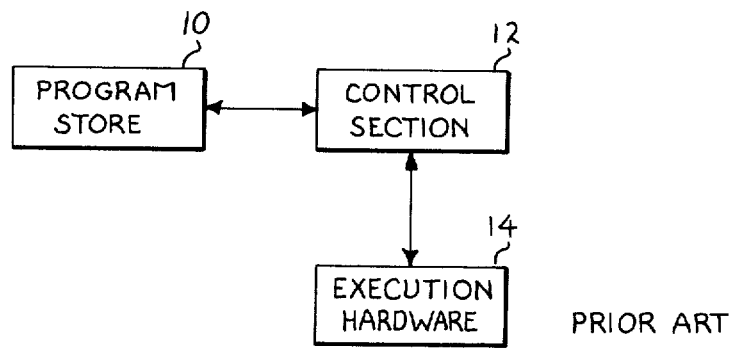
FIGS. 1, 2 and 3 are block diagrams illustrating prior art data processing system architectures, the understanding of which will aid in the understanding of the present invention.
Figure 2:
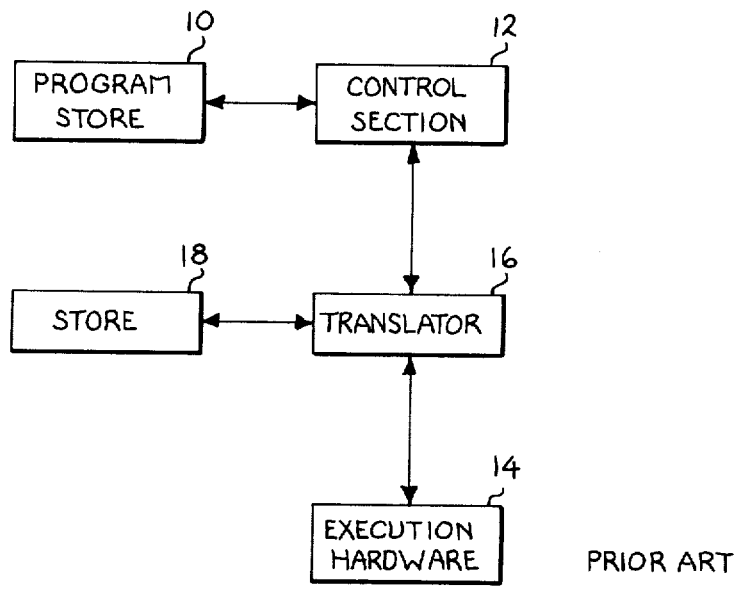
Figure 3:
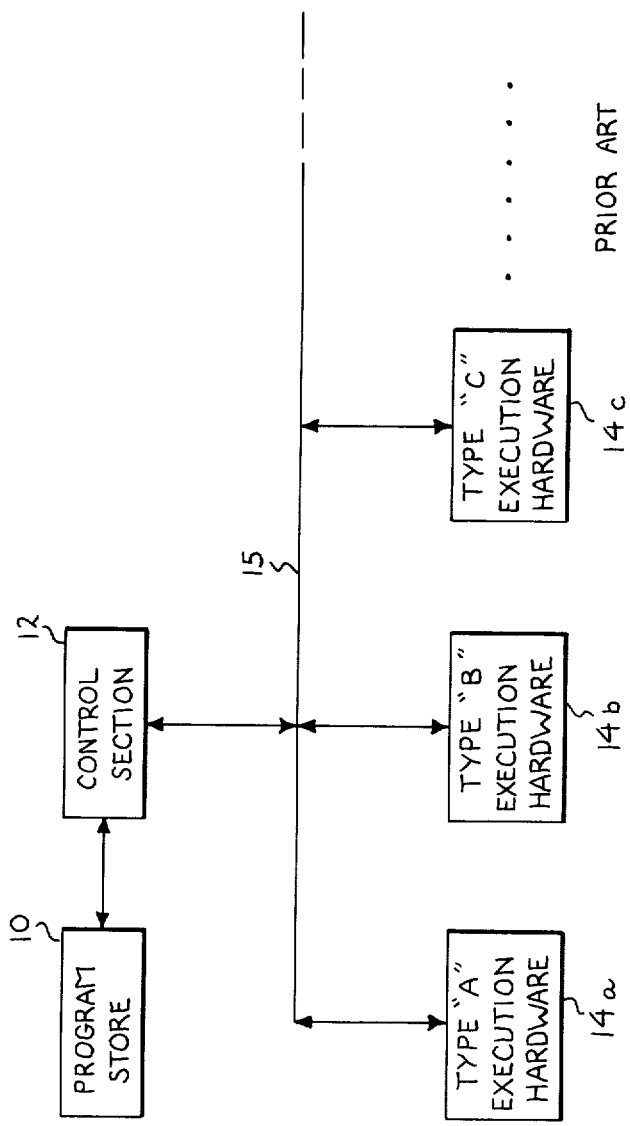

As previously indicated, before beginning a detailed description of the present invention it is believed desirable, as an aid to the understanding of this invention, to discuss briefly known prior art data processing systems architectures as are illustrated in FIGS. 1, 2 and 3. In this discussion, as well as in the description of the present invention, emphasis is placed upon the flow of system control information as opposed to the flow of data.

With reference now to FIG. 1, there is shown what is considered as a basic, typical general purpose computer. For the purposes of the present discussion, such a system is depicted as consisting of three subsystems: a "program store" subsystem 10, wherein are stored the system instruction words; a "control section" subsystem 12 which accesses individual instructions from program store in the proper sequence; and an "execution hardware" subsystem 14, which consists of all of the data processing and storage elements necessary to execute instructions issued by the control section. It is, of course, immediately obvious to one skilled in the art that the above description (as well as those of the other prior art which follow) is not intended to be all inclusive but is merely directed to the flow of control information. The store, for example, in a full operational system could contain other than instruction words; e.g. data words. Similarly, the control section would normally direct the execution hardware to perform other functions such as instruction word modification as well as arithmetic computations, etc. all in the manner of data processors well-known in the art and believed unnecessary to discuss here.

With FIG. 1 as a point of reference, two existing variations on this "standard" architecture which exhibit, to a limited degree, some of the advantages of the present invention will be described. FIG. 2 illustrates the flow of control information within a "microprogrammed" digital data processing system of the type described in "The Best Way to Design an Automatic Calculating Machine," Manchester Univ. Computer Inaugural Conf., July 1951, Published by Ferranti Ltd., London, by M. V. Wilkes. This system, like that of FIG. 1 includes the store, control and execution subsystems (again indicated at 10, 12 and 14, respectively) and differs conceptually from the "standard general purpose computer" of FIG. 1 by the presence of a "translator" 16 and an associated read-only memory (ROM) 18 located between the control section 12 which issues instruction words from program store and the execution hardware 14 which is only capable of executing more simple instructions, called "microinstructions". It should be noted that this translator function is not always performed by a distinct hardware subsystem separate from the control section, but is shown that way in FIG. 2 for illustrative purposes. It should be further noted that other forms of memory or store such as read-write core memories or registers can be used.

The ROM-translator is a hardware design concept which is analogous to the software programming concept of a "subroutine". Each machine language instruction received from program store via the control section is accepted by the translator in such a fashion as to appear to the control section as the machine's execution hardware. For each such machine language instruction, the translator 16 issues a sequence of microinstructions, which are stored in the ROM 18, to the execution hardware in such a fashion as to appear thereto just as if the microinstructions had been software from a program memory. This type of microprogrammed machine architecture provides a means for constructing a variety of programmable digital data processing systems which utilize the same simple execution hardware, yet are capable of directly executing machine language instructions from different machine programming languages. To a degree, it is possible to construct systems with application-oriented programming languages by using such an architecture. However, the amount of ROM hardware required, and the requirement for very fast execution hardware (in order to complete the long sequences of microinstructions in a reasonable machine language instruction execution time) limit the power of the languages which may be directly executed by systems constructed with this architecture to a much lower level than those attainable in a practical manner with the present invention.

FIG. 3 illustrates the flow of control information within a "direct function processor" of the type described in U.S. Pat. No. 3,631,401, "Direct Function Data Processor" by Saul B. Dinman, issued Dec. 28, 1971. Conceptually, the difference between the standard general purpose computer of FIG. 1 and the direct function processor of FIG. 3 lies in the use of separate blocks of execution hardware 14a, 14b and 14c for different ones of the system's instructions. The separate blocks of execution hardware are connected to or interfaced with the control section 12 by way of an instruction bus 15. When an instruction word is accessed from program store 10 by the control section 12 it is issued onto the instruction bus, and the block of execution hardware responsible for that instruction type takes the instruction and executes it.

The direct function processor architecture approach provides a means for constructing programmable digital data processing systems within which different machine language instruction execution capabilities are the "responsibility" of different distinct areas of the system's hardware. This approach yields a degree of modularity for flexibility for change, and for increased diagnosability of failures, but not to the degree possible with, nor in conjunction with high level machine language execution capability possible with the present invention.

Figure 4:
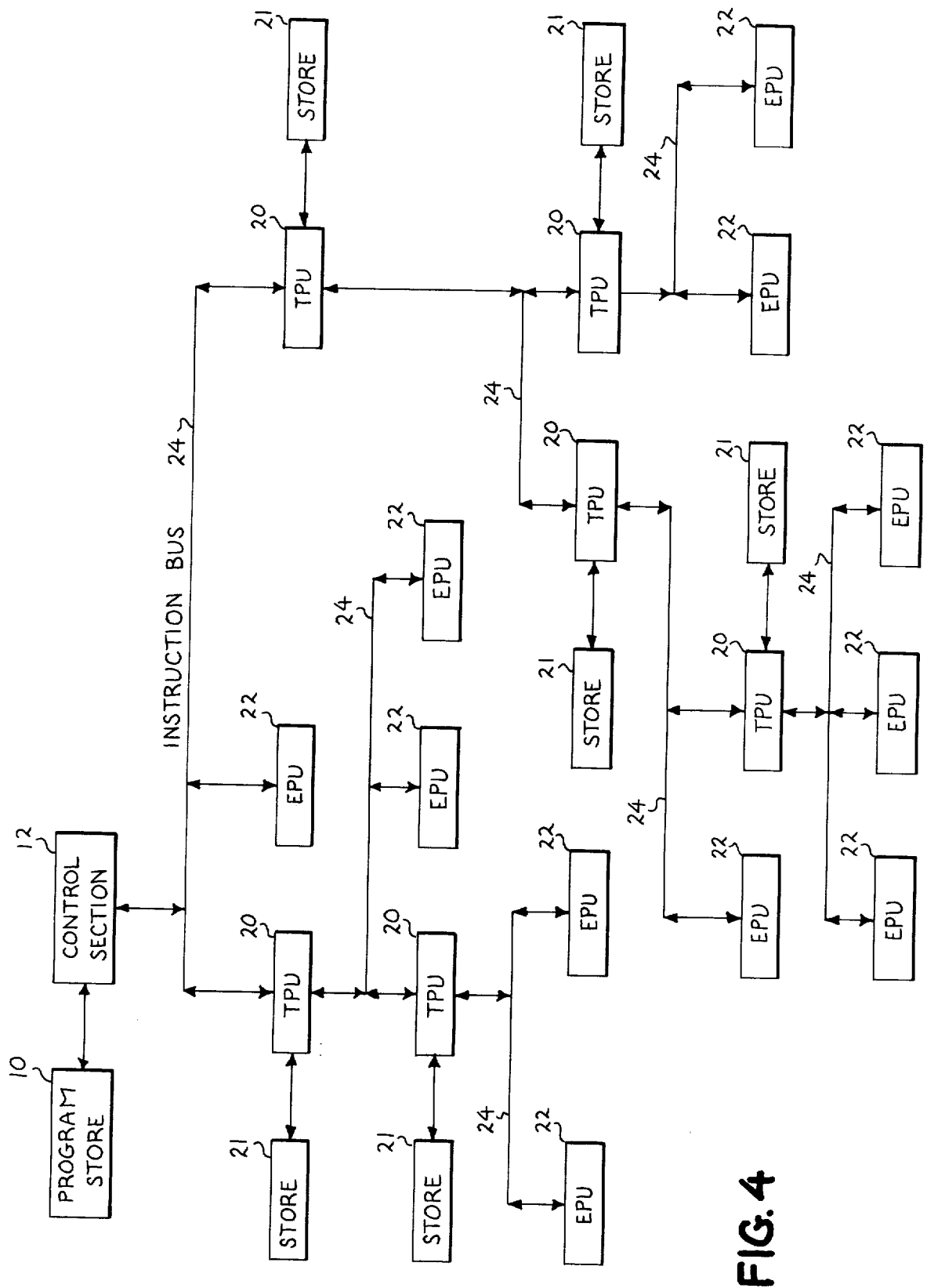
FIG. 4 is a block diagram illustrating the concept of the present invention.

Reference is now made to FIG. 4 which shows in major block diagram form a digital data processing system in accordance with the present invention. As can be seen, the invention is structured as a multi-level pyramidal hierarchy of several levels of processing units comprising translator processing units (TPU) 20 and execution processing units (EPU) 22. Each TPU is shown as having an associated store 21. The several levels are connected or interfaced by corresponding instruction buses 24. Any number of the processing units (TPU's and EPU's) or any combination of those processing units can reside on any one of the instruction buses in the system with the restriction that at least one TPU must be included in each intermediate level and that the lowest level will normally be all EPU's.

The control section or sequence controller 12 has an associated program store 10. The program store contains the usual binary words in the form of instructions defining various parameters (e.g., address and pointer fields) utilized to identify sources and destinations of operand and resultant data and further containing a field of bits specifying an operation to be performed. This latter field is normally called the operation code field or more simply the op-code. The op-code is a binary number between 0 and $2^{N-1}$ (for a data processing system employing an N bit op-code field). The instruction word further includes an operand field containing one or more operands each normally designating a lower level store address (direct or indirect) for the storage, retrieval or movement of information.

In the present invention the control section 12 and the program store 10 may be comprised of any of the usual combinations of digital logic and storage components found in well-known programmable digital data processing systems. The program store may be a ferrite core or a metal oxide semiconductor (MOS) memory system, a plated wire memory system, or various other similar types of memory systems. The control section further includes a program memory address counter and various general storage registers, timing and gating logic, etc. as is commonly found in data processing systems. A typical data processor which may be employed in the control section 12 and the program store 10 may be the General Electric Company 425 Data Processing Computer. The only requirement to implement a data processor of well-known design into the architectural structure of FIG. 4 is that that data processor possesses a control interface portion between the control section and the remainder of the system (TPU's and EPU's) which meets the following criteria:

1. An instruction word which is to be executed will be loaded into an instruction register in the interface of the control section.

2. The contents of the instruction register will be connected to the upper level instruction bus 24, as shown in FIG. 4.

3. In the present system each of the TPU and EPU processing units is capable of executing specified instructions as defined by a range of op-code numbers whereby each processing unit is assigned a particular range or block of op-code numbers. To assure orderly execution of successively retrieved instructions, the op-code field of a word in the instruction register is connected to decoding recognition logic which is capable of determining which of several blocks of numbers, into which the op-code number range has been partitioned, the particular op-code lies in. This determination is compared to indications from lower level processing units to determine if the unit which will receive the word then held in the instruction register is capable of then accepting that word.

4. If a word held in the instruction register is to be passed to a processing unit which is not then able to accept that word because of a "busy" condition as indicated above, suitable control logic in the interface portion will prevent the further accessing of words from the program store until that unit accepts the word then held.

The other two types of processing units (TPU's and EPU's) will now be described. In the present invention instructions having op-codes defining any level of execution complexity can be stored in the program store or retained in the associated store of any TPU in the system. However, in the normal course of events, instructions defining higher level operations to be performed will be stored in the program store and instructions defining operations of lesser complexity will be located in the stores associated with the processing units at the corresponding levels in the pyramidal architecture. Finally, the EPU's are usually capable of executing only instructions of a relatively low level of complexity, as compared with those normally found in the program store.

Each processing unit, TPU and EPU, contains decoding logic connected to the op-code field bit lines of its input instruction bus whereby that logic determines whether or not a particular op-code lies within the unique block of op-codes which has been assigned to that processing unit. Each processing unit also includes means, presented in the form of a busy signal, to indicate to the unit in the control flow path at the next higher level that that unit is or is not capable of accepting an instruction word. Each TPU includes recognition logic similar to that briefly described with respect to the control section 12, which governs the placement of new instructions into an instruction register in the TPU.

Two basic type of op-codes lie within the block of op-codes assigned to a TPU to cause that unit to operate in one of two modes. The first type of op-code places a TPU in a sequence mode of operation. In this mode of operation the TPU generates a sequence of one or more instructions which are executable by EPU's or utilized by TPU's connected to that translator's output instruction bus. The normal function of this sequence is the transformation from higher-level instructions to lower level instructions for utilization by a lower level processing unit. This transformation is achieved through the inclusion of a store associated with the TPU which store contains a sequence or sequences of instructions which are issued during the sequence mode of operation. Through the storage of different sequences, structurally equivalent TPU's can be used throughout the system architecture. In some cases the only difference between TPU's is the contents of their particular stores and their assigned block of op-codes. A typical example of the manner in which various high-level instructions are passed in a sequence through a series of translators will subsequently be described.

In the preferred embodiment of the present invention the store associated with each of the TPU's is a read-only memory (ROM). However, other types of stores such as semiconductor random access read-write memories (RAM), coincident core memories, plated wire memories, etc. may be used.

The second type of op-code to which each of the TPU's can respond is a direct op-code which lies within the block of responsibility of a processing unit connected to the TPU's output instruction bus. The direct op-code places the TPU in a direct mode of operation. In this mode of operation the instruction gets passed directly from the TPU's input instruction bus to a lower processing unit via the TPU's output instruction bus. That direct op-code is held on the output instruction bus until the receiving processing unit accepts the instruction. The means by which this is done is essentially the same as that described with respect to control section 12 and will be explained in greater detail later. When that op-code is accepted by the receiving processing unit, the TPU monitors the instruction bus to which its input is connected in anticipation of the next instruction that contains an op-code that lies within the block of op-codes for which that unit is responsible.

As previously described, while the TPU's provide the high-level programming language inherent in the processor structure of FIG. 4, the EPU's provide the actual processing power normally found in data processing systems. Each EPU, as the name implies, is a completely self-contained functional entity capable of executing instructions. All instructions presented to the EPU's are defined in terms of operations (op-codes) to be performed using data (usually as a result of previously executed instructions) which is already present in storage elements (registers or other stores) within each of the EPU's. Each EPU contains all of the logic and storage elements necessary to perform all of its assigned functions (execution of instructions) within its block of responsibility as identified by the op-codes.

Figure 5:
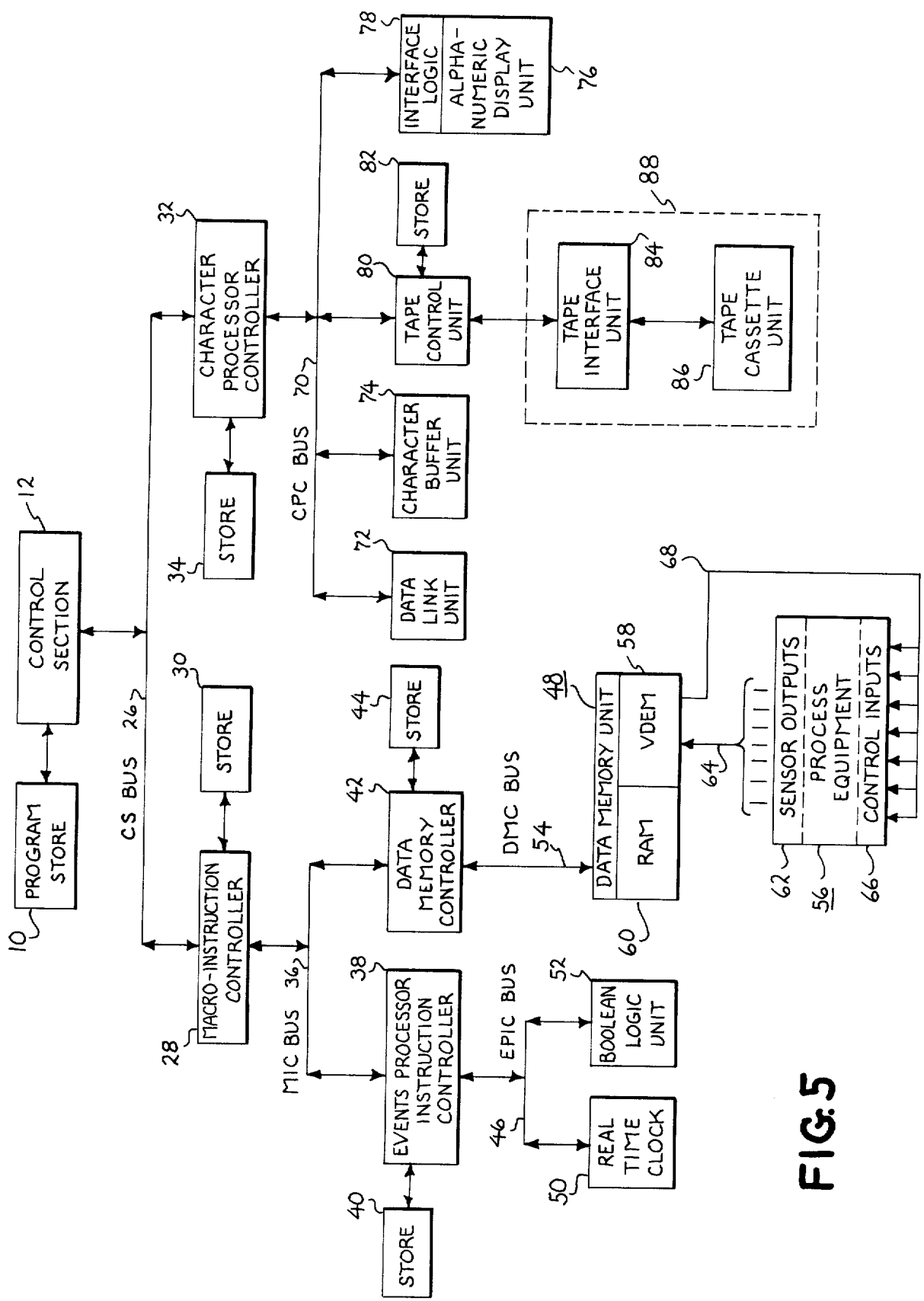
FIG. 5 is a block diagram similar to FIG. 4, but in greater detail illustrating one possible example of a data processing system in accordance with the present invention.

Reference is now made to FIG. 5 which shows in block detail an architecture exemplary of a system structured in accordance with the present invention. As can be seen, the architecture of FIG. 5 closely resembles that of FIG. 4 but is inclusive of more specific definitions or titles for the several processing units (translator processing units and execution processing units). The control section 12 and its associated program store 10 are shown in the same manner as previously described for FIG. 4. Instructions are delivered by the control section 12 to a control section bus (CS BUS) 26 and presented simultaneously to the TPU's connected to that bus. Two TPU's, a macro-instruction controller (MIC) 28 having associated store 30 and a character processor controller (CPC) 32 and its associated store 34 are shown connected to the bus 26. In the showing of FIG. 5 all instruction words placed upon the CS BUS 26 will be recognized by either the MIC 28 or the CPC 32. (It should here be noted that the op-codes utilized in a particular system need not be consecutive and that the flexibility occasioned by the modularity of the present system permits the leaving of blocks of op-code numbers so that the system may be easily expanded at some subsequent time.)

Assuming first that the instruction word is one which is recognized by the MIC 28, in accordance with the type of instruction on the bus; i.e., either a sequence op-code or a direct op-code, the MIC 28 will either pass that instruction directly from the CS BUS through to an MIC BUS 36 in the case of a direct op-code word or recognize that instruction as a sequence mode type instruction. In the latter case, the MIC 28 will begin to retrieve from its associated store 30 a sequence or series of instruction words containing operation codes and/or operands for presentation to the MIC BUS 36. In any event, the instruction now existing on the MIC BUS 36 will be presented simultaneously to all processing units connected to that bus. In FIG. 5, the additional processing units are illustrated as two additional translators designated an events processor instruction controller (EPIC) 38 and a data memory controller (DMC) 42. Because the processing units here are TPU's, they include respective stores 40 and 44.

The EPIC 38 and the DMC 42 will each interrogate the op-code of the instruction word on the bus 36 to determine if that word is one which is within the assigned block of that unit. Again, if the operation code of the instruction on the MIC BUS 36 is a direct function type of operation code the instruction will be directly passed through the recognizing TPU and presented either to an EPIC BUS 46 or a data memory unit (DMU) 48 via a DMC BUS 54. On the other hand, if the instruction word defines a sequence mode of operation (i.e., a sequence op-code instruction) the TPU responsible for that instruction will begin to place a sequence of instruction words retrieved from its store on its output lines in the same manner as done by the MIC 28. The instructions presented to the EPIC BUS 46 and to the DMU 48 are of the lowest level in the language of the system of the present invention. These instruction words are of the type which, when presented to EPU's will cause those units to execute the instruction as specified by the op-code of that instruction.

In FIG. 5 the EPU's connected to the EPIC BUS are a real time clock (RTC) 50 and a Boolean logic unit (BLU) 52. The real time clock may be of the type normally found in data processing systems and of a programmable nature providing an output which can be utilized to perform timing functions, control of data processing and providing a time readout for designated functions. The BLU 52 contains all of the necessary hardware (registers, memory control and decode logic, etc.) for performing Boolean logic functions. A detailed description of the BLU along with its relationship to the rest of the system as an example of the manner in which an EPU functions within the system will be described later in this specification.

The DMU 48, which in FIG. 5 is the sole recepient of instruction words from the DMC 42, is connected thereto DMC BUS 54. The DMU 48 serves as a temporary store for system data as well as a primary interface controller or EPU for controlling the transfer of data between the system of the present invention and external process equipment symbolized by a block indicated generally at 56. As illustrated, the DMU 48 is comprised of two memory portions, a virtual discrete event memory portion (VDEM) 58 and a random access memory portion (RAM) 60.

A detailed description of the DMU 48 and its operation will be provided hereinafter. Very briefly, however, input signals are provided to the DMU 48 under program control via a bus 64 from sensor outputs 62 of the process equipment 56 and a DMU provides output control signals via a bus 68 to control inputs 66 of that process equipment. Typically in a system of the type illustrated in FIG. 5, the signals presented on the sensor outputs 62 and to the control inputs 66 of the process equipment 56 are representative of discrete events and each signal is presented simultaneously on one digital signal line. Such a signal is referred to as a Boolean variable differing by transitions between a logic "1" to a logic "0" to signify information essential to the operation of the process equipment. (Obviously, multi-bit digital words representing the outputs of analog-to-digital converters, and/or the inputs of digital-to-analog converters could be dealt with in a similar fashion.) This type of digital information is typical of many commercial and military applications wherein a data processor is required to control or be controlled by equipment on a command/acknowledge basis. Particular examples of components within the process equipment exhibiting the type of behavior which will respond to these types of digital signals include motors (turn on motor, turn off motor, is motor on?) solenoids, fluid and gas control valves, and activating various control stages at different times in a chemical process. In that the system of the present invention has the ability to control such process equipment, it follows that the processor also has the ability to be controlled by such devices. For example, the process equipment could very well be a simulator to be utilized for training purposes whereby that simulator may contain control switches and indicators for an operator to input information to the computer to train individuals in the operation of a specific type of system such as a missile launching system.

The second major leg of the FIG. 5 depiction is what may be termed a character data processor for dealing with the man/machine interface which begins with the character processor controller (CPC) 32 previously mentioned. The CPC 32 provides instruction word outputs to a CPC BUS 70 in the same manner as other TPU's. Four processing units, one TPU and three EPU's are shown connected to the CPC BUS 70. The EPU's include a data link unit (DLU)72, a character buffer unit (CBU)74 and an alpha numeric display unit (ANDU)76 having an appropriate interface logic portion 78. The TPU in this leg of the FIG. 5 illustration is defined as a tape control unit (TCU)80 having an associated store 82. Connected to the TCU 80 and receiving instruction words therefrom is an EPU. In the strictest sense of present terminology this EPU consists only of a tape interface unit (TIU)84 which exchanges signals with a tape cassette unit 86 located external to the processing unit in the same manner as the process equipment 56. For purposes of understanding, however, it is sometimes convenient to consider the TIU 84 and the tape cassette unit 86 collectively as an EPU as illustrated by the dotted line box 88. Under program control from the control section 12 via the CPC 32, the tape cassette unit is capable of reading information or programs into the system structure of FIG. 5 and of receiving information from the TCU 80 via the TIU 84 for storage on the tape cassette unit.

The alpha numeric display knit (ANDU)76, through its interface logic 78, is capable of displaying various information under program control via the CPC 32. A detailed description will subsequently be given of a typical commercially available alpha numeric display and how that display can be adapted with its interface logic to fit into the architecture of the present system.

The data link unit (DLU)72 forms a communication link with equipment external to the present system; eg an ASCII (American Standard Code for Information Interchange) key board. An ASCII keyboard is one means for entering data into the system for subsequent action such as storage on the tape cassette unit 86 or display on the ANDU 76. The DLU can also provide a means of communicating with another data processing system.

The character buffer unit (CBU)74 is used as a temporary store and can be used, for example, to exchange data with the tape cassette unit 86. Perhaps a more common use for the CBU is the storage of ASCII characters which are used in conjunction with the ANDU 76 for display minipulation (shifting, rolling, etc.)

Figure 6:
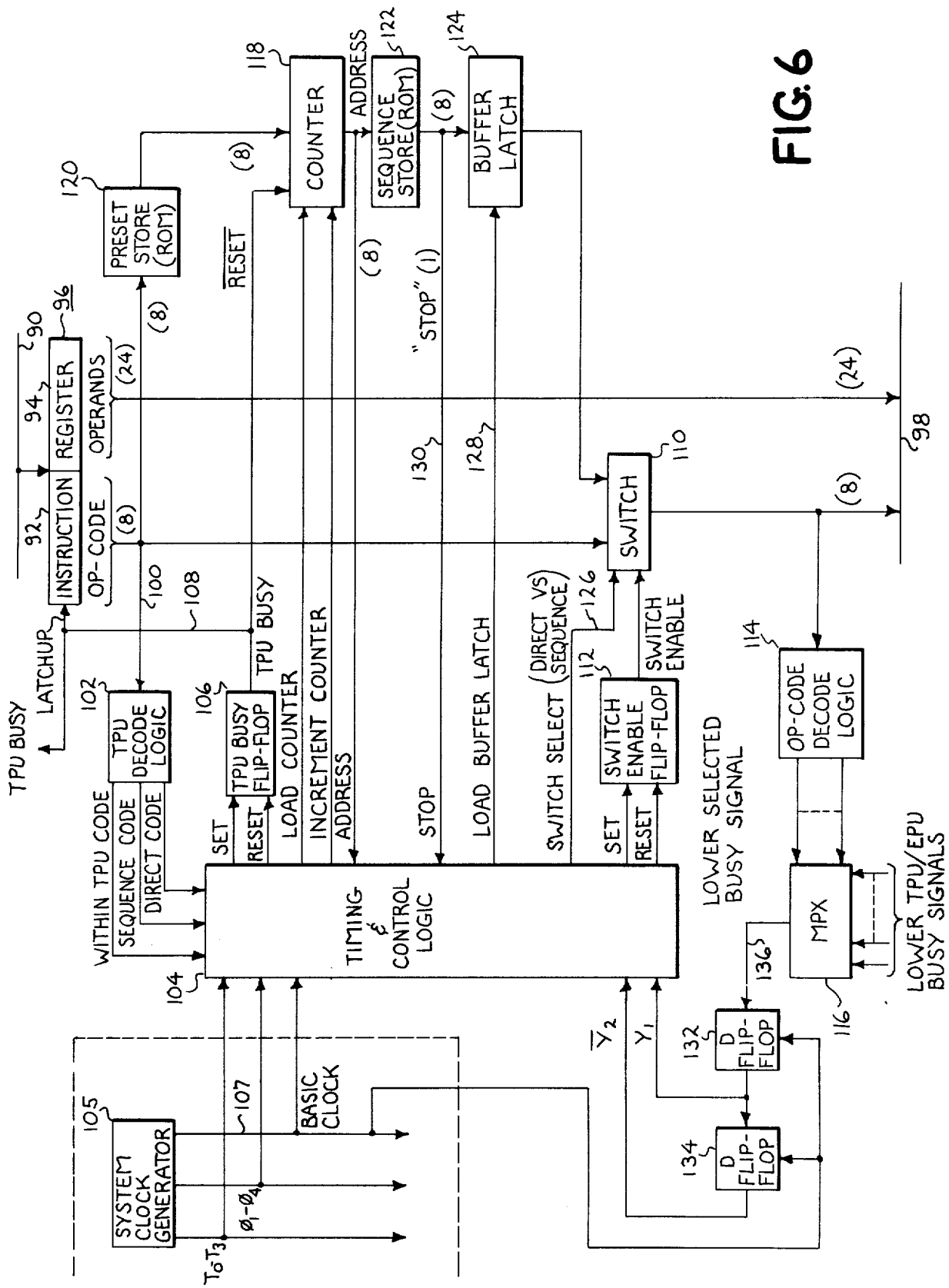
FIG. 6 is a block diagram of an exemplary processing unit for use as a translator in the present invention.

FIG. 6 shows in greater detail the structuring concept, including basic internal control information flow, of a typical TPU such as was generally discribed in FIGS. 4 and 5. The numbers shown in FIG. 6 enclosed in parentheses indicate the number of bits transmitted by the parallel information control lines between the various components of the TPU. Referencing now to that figure, there is included an upper instruction bus 90 which provides inputs to the TPU. By way of example, if the TPU were the MIC 28 of FIG. 5, bus 90 would be the CSBUS 26. Bus 90 contains both op-codes and operands as shown by the parenthetical notation of 8 bits for the op-code and 24 bits for the operand. In the description that follows op-code buses and operand buses will be discussed. It is to be understood, however, that taken together they form an instruction bus containing a number of bits equal to the sum of the numbers of bits on the op-code and operand buses.

Figure 7:
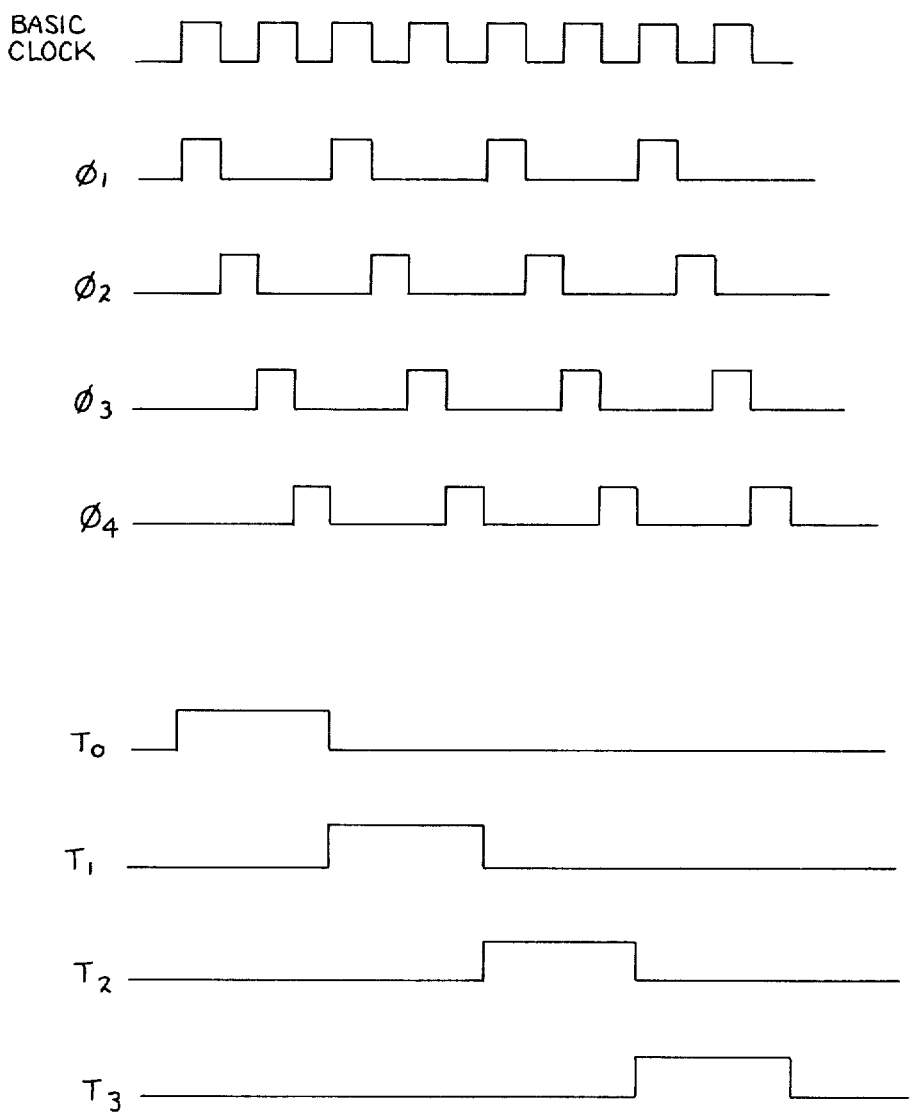
FIG. 7 illustrates the system timing of clock signals generated by a system clock generator for use by processing units in the present invention.

Consider the first case of a direct op-code, that is, the type of op-code that results in an instruction word being passed directly through the TPU without modification. The timing diagram for the direct code timing of the TPU of FIG. 6 is shown in FIG. 7. Before the detailed timing is explained, however, the flow of the op-code through the TPU of FIG. 6 will be described.

As there shown, the system of the present invention includes a clock system illustrated by block 105 (System Clock Generator) which provides the basic timing for the system. The generator 105 may be comprised of a free running controlled oscillator to develop a train of periodic pulses (Basic Clock) on a line 107. The Generator also provides additional timing signals $T_0$–$T_3$ and clock phase signals $\phi_1$–$\phi_4$. The relationship of the several signals derived from the generator 105 is shown in FIG. 7. The signals $T_0$–$T_3$ and $\phi_1$–$\phi_4$ are derived from the basic clock signal, also shown in FIG. 7, by conventional gate/flip-flop logic as is well known in the art.

With reference again to FIG. 6, all instruction words appearing on the upper bus 90 will reside, at least temporarily, in an instruction register 96 with the op-code and the operand(s) disposed respectively in portions 92 and 94. The op-code of the word is applied via a bus 100 to suitable decode logic 102. Decode logic 102 provides three output signals — "Sequence Code", "Direct Code" and "Within TPU Block". These signals are defined by the equations:

SEQUENCE CODE = $N_1 \leq$ OP CODE $< N_2$
DIRECT CODE = $N_2 \leq$ OP CODE $< N_3$
WITHIN TPU BLOCK = (SEQUENCE CODE)+$\lambda$
 (DIRECT CODE) = $N_1 \leq$ OP CODE $< N_3$ Wherein $N_1$, $N_2$ and $N_3$ define the bounds of op-codes assigned to the TPU in question.

Assuming that the instruction in the register 96 lies within the prescribed bounds of responsibility of the TPU, the Within TPU Block signal is generated and supplied to a timing and control logic block 104. Block 104 is comprised of suitable gates interconnected to generate appropriate signals as will be described and as are defined by the several Boolean equations set forth in Table 1 below.

Figure 8:
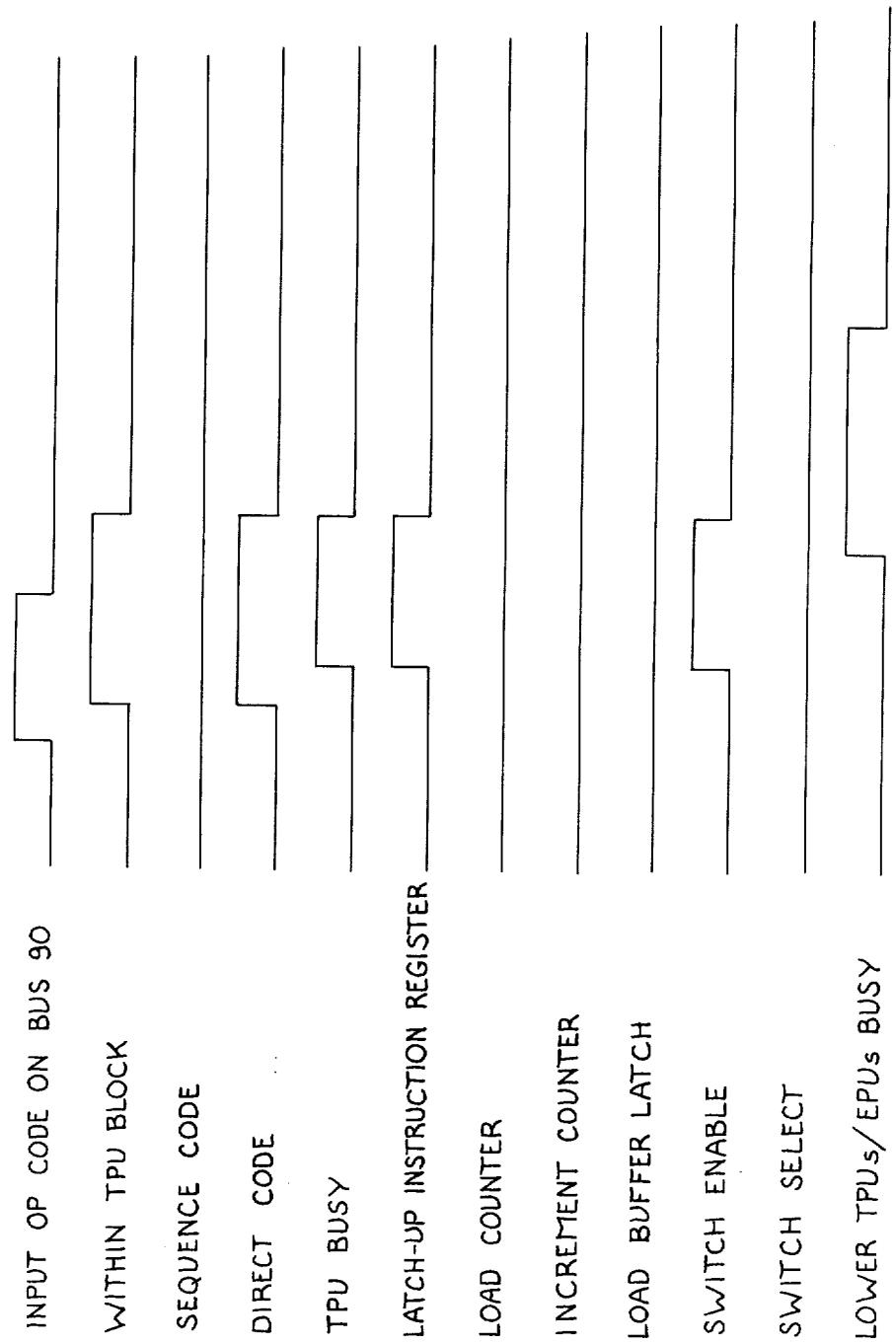
FIGS. 8, 9 and 10 are timing diagrams useful in understanding the operation of the processing unit of FIG. 6.

= 0) the decode logic recognizes that that op-code is within the TPU's block of reserved op-codes and that this is a direct op-code. This recognition raises the TPU busy signal which latches up the instruction word in the register 96. As soon as the TPU busy signal is raised, the instruction is removed from the upper bus 90 by the TPU or the control section controlling this upper bus. With the enabling of Switch 110 (FIG. 6) the instruction is placed on the lower bus 98. This placement is achieved through the generation of a switch select signal from logic 104 which is supplied to switch 110 via a line 126. As shown in FIG. 8, the switch select signal is at a logic 0 level to allow the placement of the op-code from the register 96 into the lower bus 98. The instruction word is now held on the lower bus until the EPU or TPU that is responsible for the block of op-codes within which this op-code lies detects the op-code and it in turn raises its busy signal.

As soon as the appropriate lower busy signal (as determined by an op-code decode logic 114 and selected by a switch MPX 116) is raised and presented to the TPU timing control logic 104, the TPU can remove the existing instruction word from the lower bus by disabling switch 110 since the raising of the busy signal implies that the instruction word has been latched-up by the appropriate EPU or TPU which responded with the raising of its busy signal.

Since this is a direct op-code, the TPU is finished in accordance with the Reset TPU Busy equation of Table 2 and the TPU busy signal is dropped. At the same time that the TPU busy signal is dropped, the two decode signals (Within TPU block and Direct Code) are also dropped.

FIG. 8 shows the timing for a TPU passing a direct op-code instruction word to a processing unit (EPU or Table 1

| | | |
|---|---|---|
| SET TPU BUSY | = | WITHIN TPU BLOCK · TO · BASIC CLOCK |
| LATCH-UP INSTRUCTION REGISTER | = | TPU BUSY |
| RESET TPU BUSY | = | (STOP · $O_2$ · LOWER TPU/EPU BUSY RESPONSE) |
| | + | (DIRECT CODE · LOWER TPU/EPU BUSY RESPONSE · $O_2$) |
| STOP | = | SEQUENCE ROM-LAST INSTRUCTION IN SEQUENCE (FLAG BIT) |
| INCREMENT COUNTER | = | $\overline{\text{DIRECT CODE}}$ · $T_3$ · $O_3$ |
| LOAD BUFFER LATCH | = | $\overline{\text{DIRECT CODE}}$ · $T_2$ · $O_2$ |
| LOAD COUNTER | = | TPU BUSY · $T_1$ · $O_1$ · (Address =0) |
| SET SWITCH ENABLE FLIP-FLOP | = | LOAD BUFFER LATCH + (DIRECT CODE · $T_1$ · $O_1$) |
| RESET SWITCH ENABLE FLIP-FLOP | = | LOWER TPUs/EPUs BUSY RESPONSE |
| SWITCH SELECT | = | SEQUENCE CODE |
| LOWER BUSY TPU/EPU RESPONSE | = | $Y_1$ · $\overline{Y_2}$ = LOWER BUSY WAS LOW IS NOW HIGH |

In response to the Within TPU Code signal, block 104 generates a signal "Set" which places a TPU busy flip-flop 106 in its set state to provide a TPU busy signal on a line 108. This signal will lock or "latch-up" the contents of the instruction register 96 and will also be provided to a higher level TPU or control section to indicate acceptance of the instruction.

In the present example it will be first assumed that the op-code in the register 96 is a direct op-code. As such, the entire instruction from the instruction register 96 will be passed directly to the next lower bus 98 via the switch 110. Switch 110 is enabled by a Switch Enable Signal from a flip-flop 112 whose state is governed by the equations set forth in Table 1 above.

FIG. 8 shows the relationship in relative order of occurance of the several signals utilized in the execution of a direct op-code instruction by the TPU. As shown, when an op-code appears on the upper instruction bus 90 and the TPU is not busy (TPU busy signal TPU) that was not busy. If the processing unit had been busy when the switch was enabled the op-code and operand would have been held on the lower bus until the processing unit was able to accept the op-code and the operand and so indicate with its busy signal.

Figure 9:
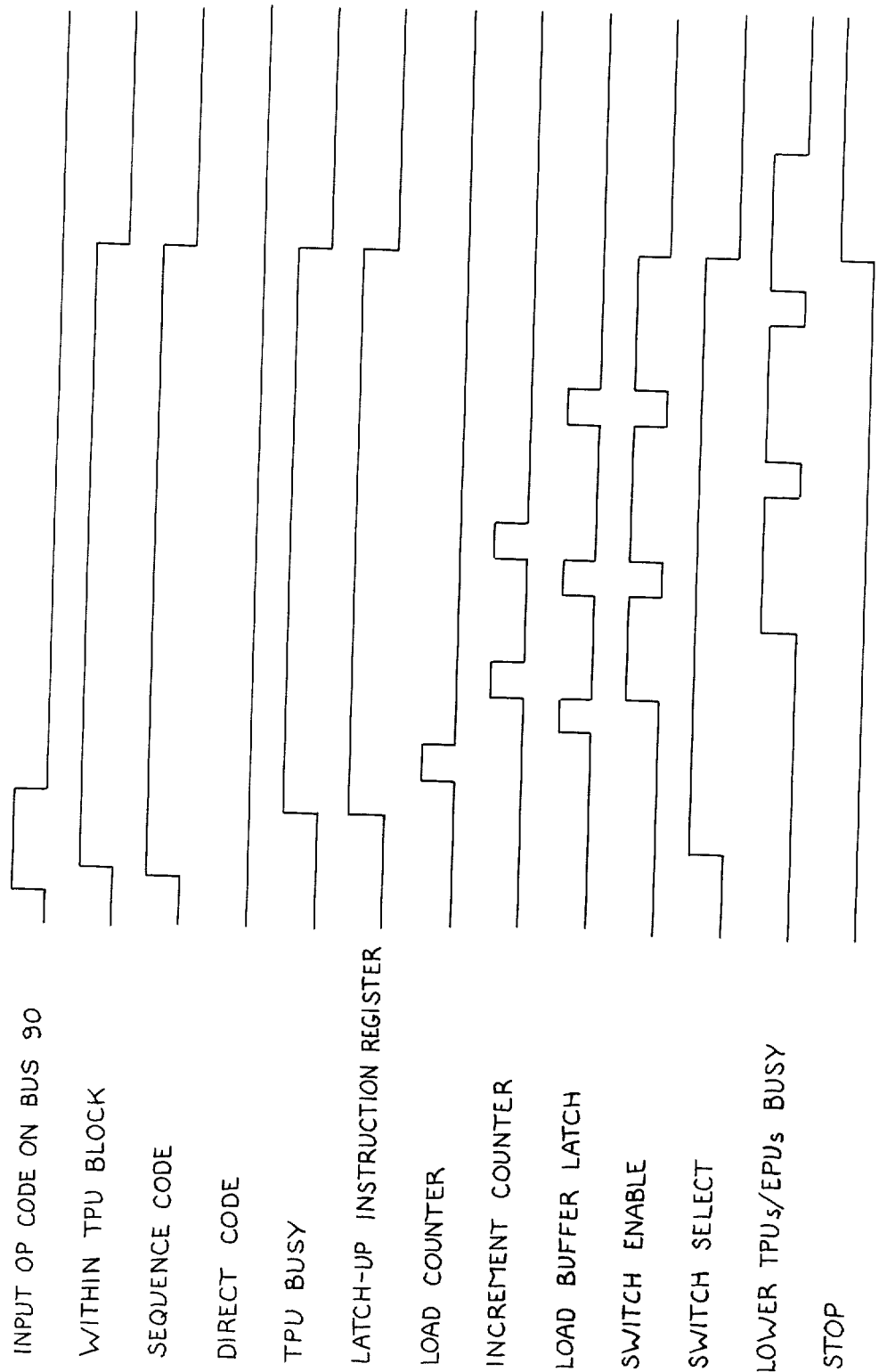

The flow of control information within a TPU during the execution of a sequence op-code is also explained with respect to FIG. 6 and a timing diagram of FIG. 9 which is similar to that of FIG. 8. The instruction word is latched up in the instruction register 96 in the same manner as was described in the case of the direct op-code instruction. With the decoding of the op-code of the instruction in register 96 as a sequence instruction, the logic 104 provides a binary 1 switch select signal on a line 126 to cause switch 110 to pass the contents of a buffer latch (register) 124 onto the lower bus 98.

As can be seen in the TPU control logic equations of Table 1, a load counter signal is generated to gate a preset address into a counter 118 from a preset store 120. Store 120 contains, for each sequence op-code for which the TPU is responsible, a word to be used to preset counter 118 to the starting address of a prescribed sequence of instruction words stored in a sequence store 122. In response to the counter address, store 122 provides the contents of the location addressed to a buffer latch 124. The buffer latch is loaded (FIG. 9) by a Load Buffer Latch signal provided by the timing and control logic 104 via a line 128. At this time, the first instruction word of the sequence is placed on the lower bus 98. The buffer latch 124 is not mandatory to the design of a TPU but is useful in increasing TPU throughput. That is, one instruction word may be held in the buffer latch while a subsequent instruction is being retrieved from the sequence store 122. As can be seen in the sequence code timing diagram (FIG. 9) and in the TPU timing control logic equations (Table 1), as soon as the first instruction word op-code in the sequence of instructions is stored in the buffer latch 124 the counter 118 is incremented by one to provide to the sequence store 122 the address of the next instruction word in the sequence. As shown by the equations of Table 1, the increment counter signal is generated in response to a DIRECT CODE signal and $T_3$ and $\phi_3$. If the buffer latch were not used, the counter would not be incremented until the instruction on the lower bus is accepted by the processing unit (TPU or EPU) responsible for this instruction op-code.

As each op-code (instruction) is sequentially read from the sequence store 122 and accepted by the processing units connected to the lower bus 98, the counter 118 is incremented by one and the next op-code in the sequence of op-codes is stored in the latch. When the switch enable signal occurs, the contents of buffer latch 124 are placed on the lower bus 98.

When the last instruction in a sequence is read from the sequence store 122, a flag bit in that instruction effects the generation of a "Stop" signal on a line 130 to the timing and control logic 104. As shown by the "Reset TPU Busy" equation of Table 1, the Stop signal in conjunction with an indication of a Lower TPU/EPU Busy Response, resets the TPU Busy flip-flop 106 with the occurrence of the $\phi_2$ signal. The TPU of FIG. 6 is now in condition to accept the next instruction word present on the upper bus 90.

Frequent mention has been made of busy signals received from lower level processing units (TPU's and EPU's) and the part these signals play in the operation of a TPU. Essentially, the states of these signals signify the ability of a processing unit to accept an instruction word. It will be remembered from the description of FIG. 6 that the op-code was decoded in the logic 114 and that this decoding identifies the lower unit for which an instruction word is destined. This identification is indicated by the multiple line depiction between the op-code decode logic 114 and the MPX switch 116. Inasmuch as the busy signals from the lower levels are brought up on individually identified lines, a simple selection of lines by the output of the logic 114 provides the essence of the lower level units' ability to accept an instruction word.

In actual practice, a slightly more sophisticated system is used. This system looks to a change in the appropriate lower level signal from a "not busy" state to a busy state to provide a more positive indication that the lower level unit has received its instruction. As previously indicated, the receipt of this combination of signals results in the generation of the Lower Busy TPU/EPU Response signal which in turn permits the changing of the instruction word placed by the TPU on its output bus.

The manner in which this is accomplished in the illustrated preferred embodiment of the present invention may be seen in FIG. 6. As there shown, the output of switch 116 is applied via line 136 to a first "D type" flip-flop 132. (A D type flip-flop is one which will change its state to follow the state of its input when pulsed by a trigger signal.) The output of the flip-flop 132 forms the $Y_1$ term of the Table 1 equations and also forms the input to a second D type flip-flop 134. The output of the flip-flop 134 is the $\overline{Y}_2$ term of the equation. The trigger signal to each of the flip-flops is the basic clock signal from the system clock generator 106.

The output (Selected Lower Busy Signal) of the switch 116 which forms the input to flip-flop 132 is the result of a selection resulting from the output of the decode logic 114 (derived from the op-code of the instruction now on the lower bus 98) to provide a signal on line 136 corresponding to the busy status of the processing unit responsible for the instruction now on bus 98. This responsible unit would have been not busy in order for the present instruction to be on the bus 98 as previously described. Thus, the line 136 is a binary 0, and the flip-flops 132 and 134 are reset ($Y_1 = 0$ and $\overline{Y}_2 = 1$). When the responsible unit accepts the instruction word from bus 98, it will change the state of its busy signal to a binary 1 resulting in a change in the signal on line 136 causing flip-flop 132 to set with the occurrence of a basic clock pulse ($Y_1 = 1$). The equation (Table 1) for the signal Lower Busy TPU/EPU Response is now satisfied by the presence of the $Y_1$ and $\overline{Y}_2$ signals at the input of the timing and control logic 104. At the time of the next basic clock signal, flip-flop 134 will set ($\overline{Y}_2 = 0$) disabling the Lower Busy TPU/EPU Response signal.

When the Lower Busy TPU/EPU Response signal occurred, the two signals, Reset Switch Enable Flip-Flop and Reset TPU Busy, are generated in accordance with the equations provided in Table 1. The next instruction word is now placed on the lower bus 98.

Figure 10:
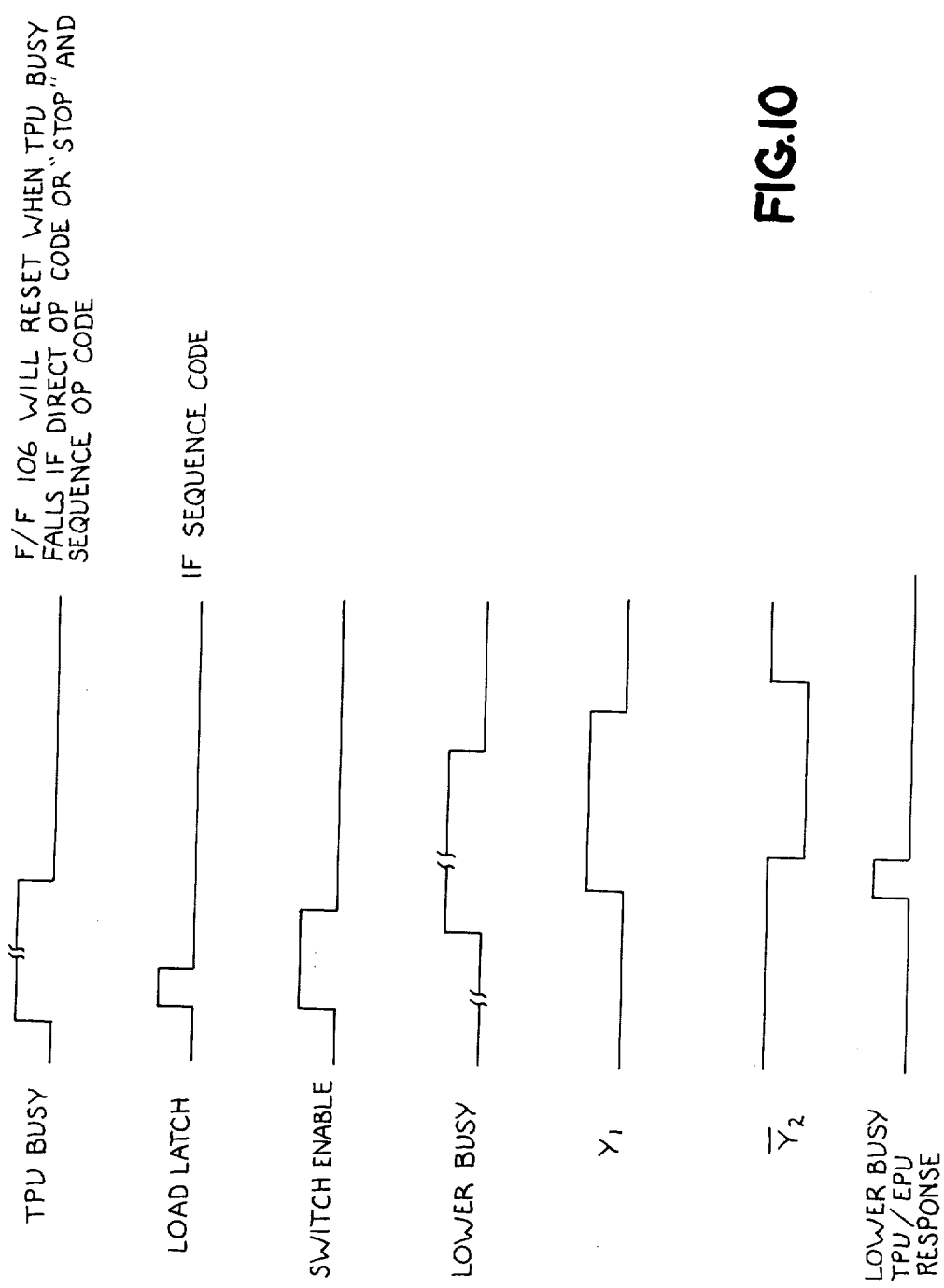

A timing diagram for the above operations is shown in FIG. 10.

In the preferred embodiment of the present invention the circuitry is preferably constructed from integrated circuits. These integrated circuits are all commercially available devices available from well-known manufacturers. The device types, quantity, and manufacturer of the devices are given in Appendix A for major components of the TPU in FIG. 6. Not listed are the individual flip-flops 106 and 112, 132 and 134, switch 116 and decode logic 114, which are all well known in the art.

The software and system benefits afforded by the present invention are made possible by the utilization of TPU's similar to that previously described with respect to FIG. 6 in conjunction with a plurality of execution processing units (EPU's) which communicate with those TPU's. Referring again to FIG. 5, one exemplary type of EPU to be described is the Boolean logic unit (BLU) 52. The BLU operates in response to instructions provided thereto from an events processor instruction controller (EPIC) 38 via an EPIC BUS 46. The EPIC is a typical TPU as just described in connection with FIG. 6.

Figure 11:
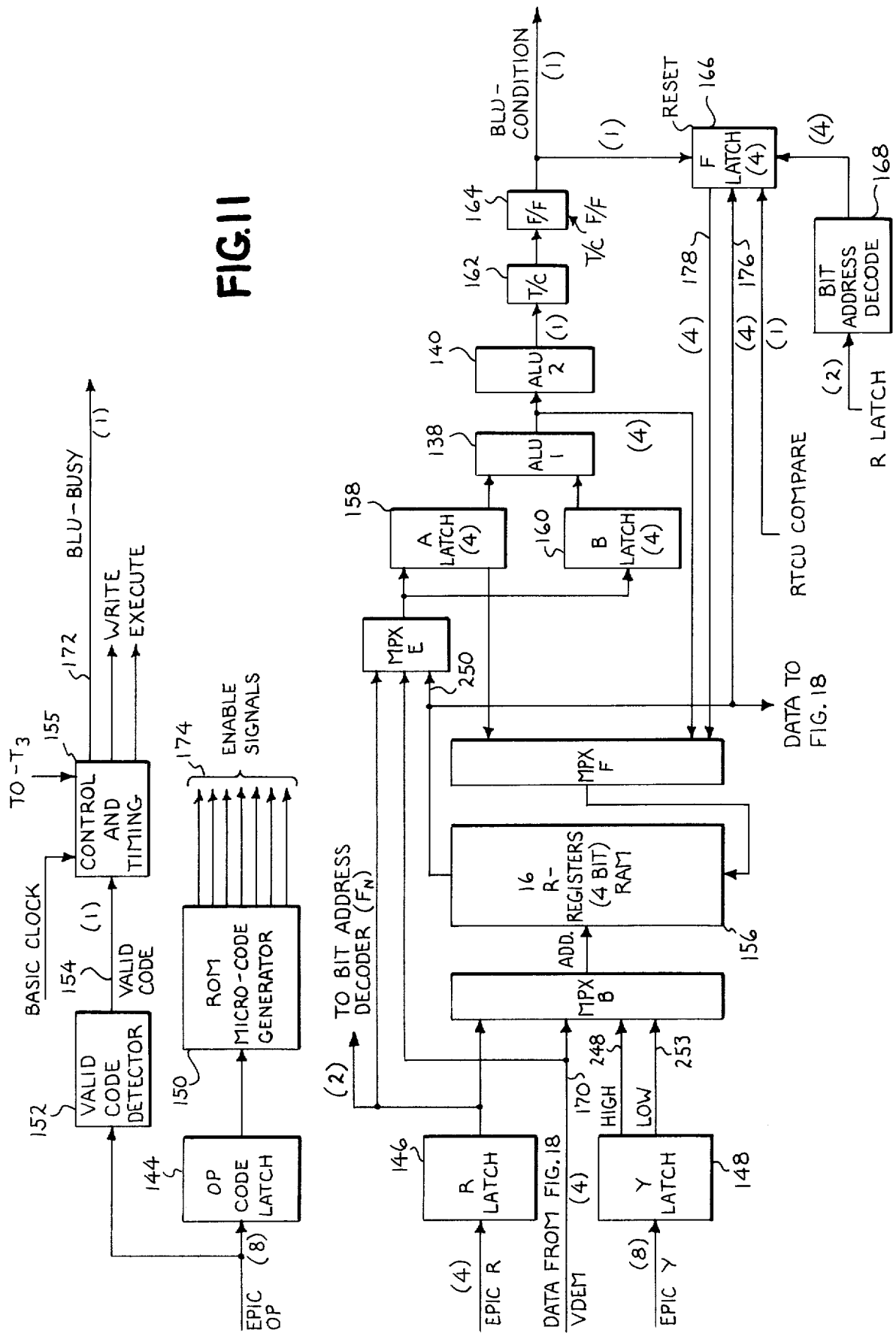
FIG. 11 is a block diagram of a second exemplary type of processing unit for use in the present invention for performing the execution of instructions to perform logical computations.
Figure 12:
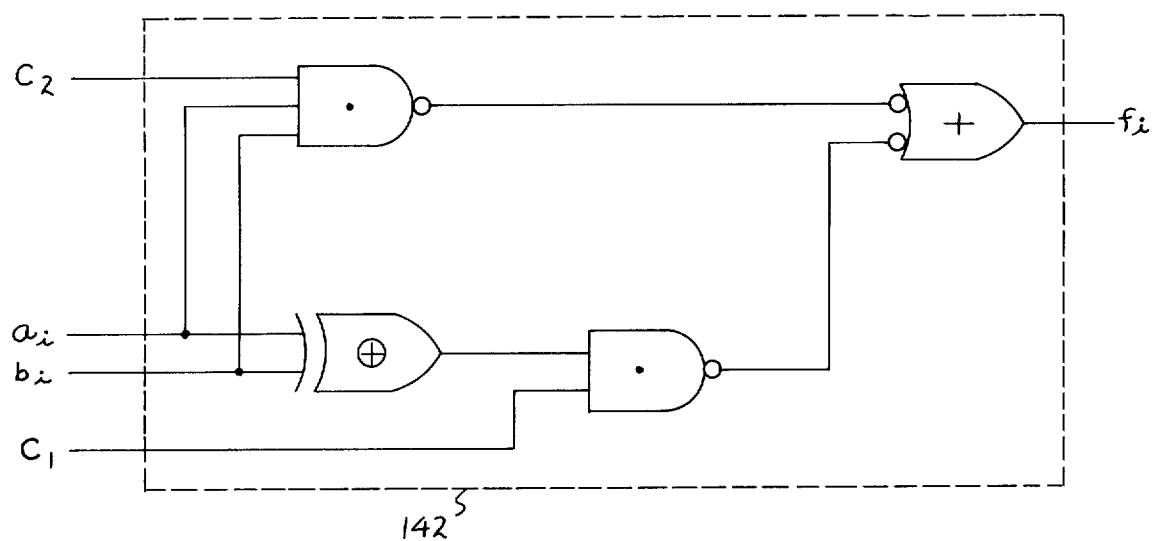
FIGS. 12 and 13 illustrate logic structures of Boolean logic circuits employed in the processing unit of FIG. 11 and are useful in understanding the operation of logical computations performed by that processing unit.
Figure 13:
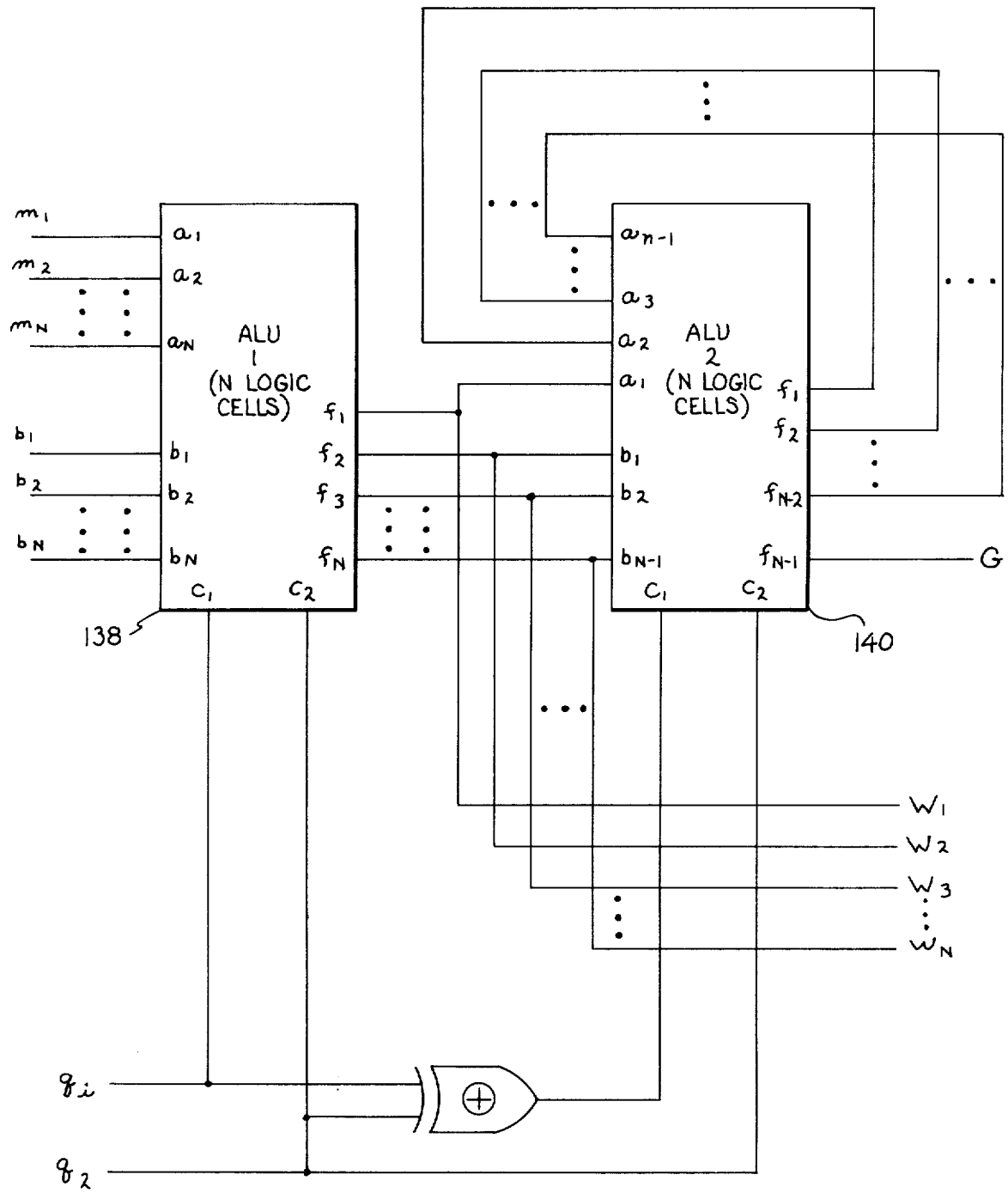

The BLU is shown in block diagram form in FIG. 11. FIGS. 12 and 13 will be referred to in the subsequent description of the operation of two arithmetic logic units ALU 1 and ALU 2 in the BLU of FIG. 11. Further, FIG. 14 shows bit patterns of each of a plurality of control words stored in a micro-decode generator (ROM) in FIG. 11. These control words are read out of the micro-code generator as output control signals for controlling the operation of the BLU in response to the op-codes shown in FIG. 14. FIGS. 15 and 16 give a listing of each of 32 bits which may reside within each of the words of the micro-decode generator (ROM) with a description of those bits and the function performed by each of those bits. FIG. 14 provides a listing of the op-codes (40 through 77 octal) for which the BLU is responsible. These op-codes are used to address the ROM of the micro-decode generator.

Figure 11A:
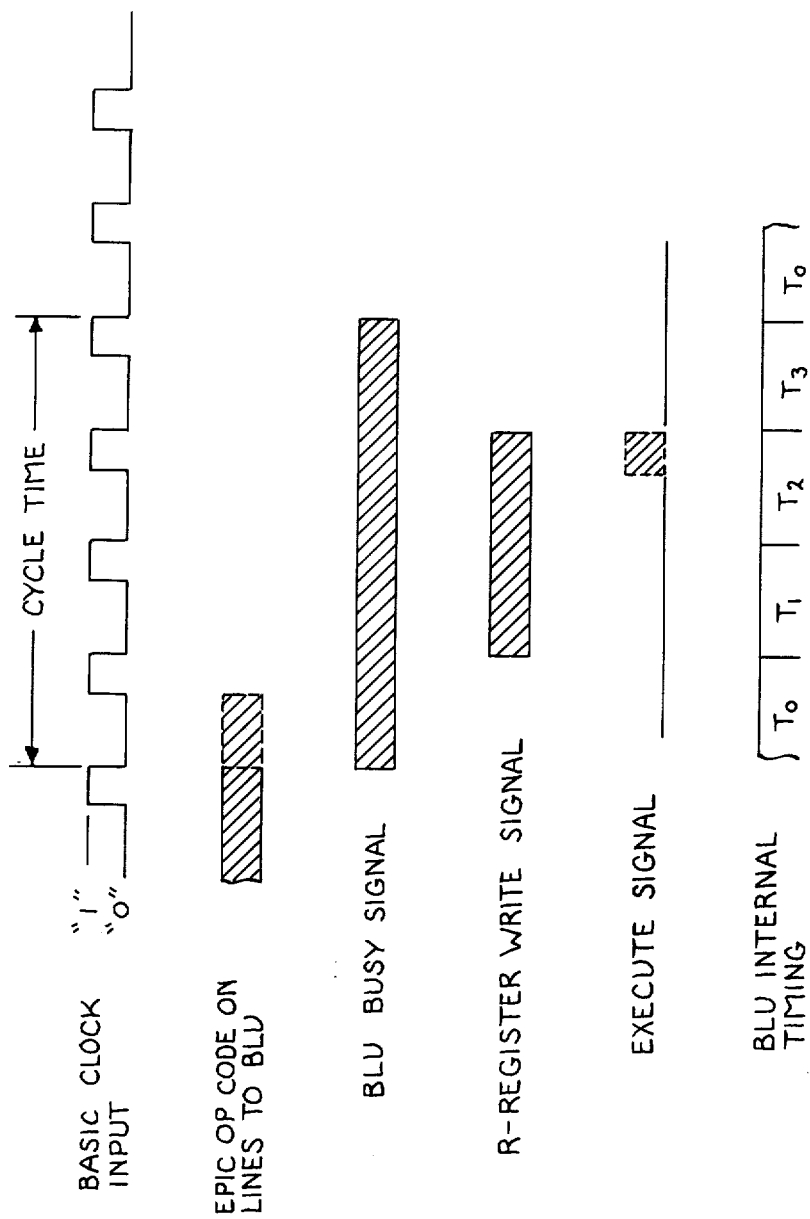
FIG. 11A illustrates timing for the processing unit of FIG. 11 and is useful in understanding the operation of that unit.

FIG. 11A is a basic timing diagram showing the inter-relationships between major signals generated during the execution of various instructions by the BLU. The BLU also contains a control and timing logic and a valid code detecotor logic the structure of which is defined by the equations of Table 2 below as will be further defined as this description proceeds.

Table 2

| | CONTROL & TIMING |
|---|---|
| SET BLU BUSY | = VALID CODE · BASIC CLOCK · $T_0$ |
| SET BLU $\overline{BUSY}$ | = BASIC CLOCK · $T_3$ |
| WRITE | = $T_1 + T_2$ |
| EXECUTE | = $T_2$ · BASIC CLOCK · VALID CODE DETECTOR |
| VALID CODE | = OP CODE $\leq N_1$ · OP CODE $\geq N_2$ |

Each application for which an EPU is designed results from the realization of a task or tasks which must be performed to accomplish a given function. In the case of the BLU, its design resulted from the realization that the majority of discrete information processing takes asociated with real time control systems of the type previously described in connection with the process equipment of FIG. 5 involve sequences of Boolean algebraic transformations on arbitrary numbers of binary quantities representing various events. Although these binary quantities are usually packed into multi-bit words for storage they are seldom processed in any fashion other than one at a time by means of data processor bit manipulator instructions such as mask, shift right, shift left, etc. By defining an instruction set which treats groups of these binary quantities as single entity variables, the data processors data throughput is increased by parallelism of information flow. Additionally the cost and complexity of the software is reduced by increasing the level of the data processor's data processing language.

The development of a set of instructions for the BLU is based upon the idea of treating N bit words as N dimensional vectors defined over a Galois field, modulo-2. This set of instructions provides a universally programmable means of generating any Boolean algebraic function ($f_1$ to $f_n$) of any number of variables. The first instruction may be written as follows wherein "+" denotes logical OR and "·" denotes logical AND, and further where the vector being operated on is denoted as $b$, having components $b_1$ through $b_N$:

$$f_1(b; m_1, m_2, \ldots m_N) = (m_1 \cdot b_1) + (m_2 \cdot b_2) + \ldots (m_N \cdot b_N).$$

The parameters $m_1$ through $m_N$ constitute a mask on $b$ such that if $m_i$ is a logical 1, $b_i$ is included in the function while if $m_i$ is a logical 0, $b_i$ has no affect on the function. Thus, $f_1(\cdot)$ generates the logical sum (ORing of bits) of any number of arbitrary components of $b$. The second instruction is the dual of the first instruction and is defined as:

$$f_2(b; m_1, m_2, \ldots m_N) = (m_1 + b_1) \cdot (m_1 + b_1) \ldots (m_N + b_N)$$

In this latter instruction, if $m_i$ is a logical 0 $b_i$ contributes to the output and if $m_i$ is a logical 1, $b_i$ does not contribute to the output. The third instruction is merely the modulo-2 sum (i.e., the exclusive ORing) of the vector $b$ with the parameter vector $M$ bit by bit as follows:

$$f_3 = b \oplus M = \begin{bmatrix} b_1 \oplus m_1 \\ b_2 \oplus m_2 \\ \vdots \\ b_N \oplus m_N \end{bmatrix}$$

Where $\oplus$ denotes exclusive OR.

From the above it can be seen if $m_i$ is a logical 1, $b_i$ is complemented, while if $m_i$ is a logical 0, $b_i$ is unchanged. If the result from $f_1$ and $f_2$ can be stored in any of the N components of an output vector, then either $f_1$ or $f_2$, and $f_3$ constitute a complete algebra for variable dimension vector spaces defined over a Galois field, modulo-2.

Referring now to FIG. 11, the two ALU's previously referenced are shown as 138 and 140. The ALU's (ALU 1 and ALU 2) may be constructed of a plurality of logic cells as shown by FIG. 12 to form two arrays of connected logic cells as shown by FIG. 13. The logic cell shown in FIG. 12 can be described by the following Boolean equation:

$$f_i = [a_i b_i] \overline{c_1} c_2 + [a_i + b_i] \cdot c_1 c_2 + [a_i \oplus b_i] \cdot c_1 \overline{c_2}$$

From the above equation it can be seen that the cell shown in FIG. 12 will generate the three desired functions of the inputs $a_i$ and $b_i$ as a function of two control signals $c_1$ and $c_2$ provided to the inputs of the cell.

An array of N of the cells of FIG. 12, suitable for working on N-bit vectors, can be built with N/2 quadruple two input NAND gate circuits, N/4 quadruple exclusive OR gate circuits, and N/3 triple 3 input NAND gate circuits. When two such arrays are connected as shown in FIG. 13 the scalar output G is defined by the equation:

$$G = [(m_1 b_1)+(m_2 b_2)+ \ldots (m_N b_N)]\cdot \overline{q_1} q_2+[(m_1 +b_1)(m_2+b_2) \ldots (m_N+b_N)]\cdot q_1 q_2+[(m_1 \oplus b_1)+(m_2 \oplus b_2)+ \ldots (m_N \oplus b_N)]\cdot q_1 \overline{q_2}$$

Wherein: control variables $q_1$ and $q_2$ generate $C_1$ and $C_2$ (control inputs) as described with respect to FIG. 12.

The vector output W ($W_1$ through $W_N$) from array 138 of FIG. 13 is as follows:

$$\begin{bmatrix} W_1 \\ W_2 \\ \vdots \\ W_N \end{bmatrix} = \begin{bmatrix} m_1 b_1 \\ m_2 b_2 \\ \vdots \\ m_N b_N \end{bmatrix} \cdot \overline{q_1} q_2 + \begin{bmatrix} m_1 \oplus b_1 \\ m_2 \oplus b_2 \\ \vdots \\ m_N \oplus b_N \end{bmatrix} \cdot q_1 \overline{q_2} + \begin{bmatrix} m_1 + b_1 \\ m_2 + b_2 \\ \vdots \\ m_N + b_N \end{bmatrix} \cdot q_1 q_2$$

The dimension of the Boolean vectors to be described in the example BLU of FIG. 11 is 4($N=4$). Referring now to FIG. 11 it can be seen that an op-code latch 144, an R latch 146 and a Y latch 148, each receive input signals comprised of a number of bits as shown by the numbers in parentheses from the EPIC BUS 46 from the events processor instruction controller (EPIC) 38 (FIG. 5). The op-code latch 144 receives the operation code signals which are presented to a micro-code generator 150 to address locations in that generator in a real memory contained therein to generate the particular enable output signals for execution of the instruction provided to the BLU in accordance with the op-code. Additionally, the op-code signals from the EPIC BUS are provided to a valid code detector 152 which detects if this op-code is in the block of op-codes reserved for the BLU. The valid code detector 152 provides a valid code signal via a line 154 to a control and timing circuit 155 which generates various internal control signals utilized by the BLU.

Also shown in FIG. 11 is a block 156 containing 16 four-bit addressable R registers which provide storage for 16 four-bit event vectors within the BLU. Additionally, two latching circuits designated A Latch 158 and B Latch 160 function as input registers to the two ALU's, specifically to ALU 1. A true complementer circuit (T/C) 162 provides a means of complementing the scalar output of ALU 2 to a T/C flip-flop 164 which inputs to an addressable F latch 166 which receives its address from a bit address decode unit 168.

The operand of the instruction is provided to the BLU from the EPIC BUS to the R Latch 146 and Y Latch 148. The outputs of these latches are provided to the switch input (MPXB) of the R registers 156. The commercially available integrated circuit logic devices which may be utilized to construct the BLU of FIG. 11 are shown in Appendix B attached to and forming a part of this specification.

The BLU of FIG. 11 performs the following logical operations (Boolean computations) using the two arithmetic logic units (ALU 1 and ALU 2):

1. Vector-Or
2. Vector-And
3. Vector Exclusive Or-(EXOR)
4. Boolean inner product (BIP)
5. Boolean dual product (BDP)

Data in the form of input words (four bits in length) for performing the above operations originate in the R registers 156, the Y Latch 148, or consists of data transferred to the BLU via conductors 170 from the data memory unit (DMU) 48 of FIG. 5. Data from the Y Latch is gated into the R registers via the MPXB switch so that the data may be later read out of the R registers for subsequent computation. The data coming from the DMU can be selectively applied to the R registers via the MPXB switch or placed selectively in the A and B Latches via a switch MPXE.

In the basic operation of the BLU, when an instruction having an op-code for which the BLU is responsible is applied to the EPIC BUS (FIG. 5), the op-code of that instruction is decoded by the valid code detector 152 which issues a valid code signal to the control and timing block 155. As can be seen from the equations of Table 2, the valid code signal is generated when the op-code is equal to or less than $N_4$ and equal to or greater than $N_5$, where $N_4$ and $N_5$ define the block of op-codes for which the BLU is responsible. FIG. 14 shows a typical listing of op-codes which the BLU of this example is capable of executing. For purposes of this illustration, the octal numbers 77 to 40 have been used for the range $N_4$ to $N_5$.

Also as shown in Table 2 under the control and timing equations, the control and timing logic 155 will generate the BLU busy signal on line 172 in response to the valid code signal (line 154), the basic clock and $T_0$ signals. The basic timing for the BLU is shown in FIG. 11A which shows that the BLU busy signal goes active approximately one clock period after the op-code is received by the BLU. The equations for generating two signals "write" and "execute" from the control and timing logic 155 is also shown in Table 2. The write signal is generated at time $T_1$ or $T_2$, thus giving the R register write signal a pulse width of two clock periods. The execute signal is generated in response to $T_2$ and the basic clock signal as shown in FIG. 11A and initiates the required computation as specified by the op-code presented to the BLU, such as Load A Latch, Load B Latch, etc. (see Appendix B).

When the BLU busy signal goes high the instruction is latched into the op-code latch 144, the R Latch 145 and the Y Latch 148. The op-code bits are then provided to the micro-code generator 150. The micro-code generator 150, in the preferred embodiment, is a read-only memory having thirty-two 32-bit words which are individually addressable by an op-code from the op-code latch 144. Each of the words in the generator 150 contains a predetermined bit pattern to control the generation of various enable signals from the generator to effect the proper execution of the instruction as specified by the op-code. FIG. 15 depicts the bit configuration of each of the words in the micro-code generator 150. The numbers to the left in FIG. 15 correspond to the op-codes shown in FIG. 14. The numbers across the top of FIG. 15 correspond to 32 output enable lines 174 from the micro-code generator 150. The purpose of each of the signals on these enable lines is further described in FIG. 16.

The operations which take place in the BLU during the execution of any particular instruction is directly dependent upon the pattern of bits read out of the micro-code generator 150 in response to the op-code. For example, if the instruction calls for data to be loaded from the Y Latch into one of the R registers as addressed by the contents of the R Latch, the micro-code generator will develop an output signal which is applied to the MPXB switch causing the data to be transferred through the switch into the addressed R register. In a similar fashion, if the instruction called for data to be transferred from the data memory unit into either the A or B Latch, the micro-code generator would generate an enable signal which would cause the data from the DMU (FIG. 5) to be transferred through the MPXE switch as addressed by the signal coming from the micro-code generator, thus placing the data into the selected A or B Latch. Some instructions call for data to be read from or written into the R registers 156 from the output of ALU 1. In this particular instance the instruction op-code would cause the micro-code generator to generate the appropriate signals to enable the MPXF switch with an address directing the data from ALU 1 through the MPXF switch into the RAM (156). Also, at this time, the MPXB switch would be enabled to cause the data to be passed into the R register as addressed by the contents of the R latch through MPXB; that is, the contents of the operand field of the instruction. Other instructions presented to the BLU can direct data from the T/C flip-flop 162 to be placed in the F Latch 166. In this latter instance this would be a one bit data signal. As shown, the F Latch 166 is comprised of four bits each selectively addressible from a bit address decoder 168. The bit address decoder receives two input signals from the R Latch which are decoded to determine into which bit position of the F Latch the output of the T/C flip-flop is to be placed. Thus, when an instruction is decoded by the micro-code generator to perform this type of function, a signal is provided to the F Latch to enable the bit to be gated into the proper bit position in the F Latch. It will also be noted that the F Latch receives an input from the real time clock unit 50 of FIG. 5 on a line called "RTCU compare." The F Latch can be utilized to receive inputs from a real time clock unit which allows binary values to be entered into a Boolean equation being executed by the BLU. The F Latch can also receive inputs from the addressable R registers on a four bit bus 176 (FIG. 11). During a vector operation, it is possible to load vectors into the F Latch from the R registers. In a similar fashion, vectors may be read out of the F Latch on a four bit bus 178 into the MPXF switch. In the manner previously described, the vector can be stored in an addressed R register in accordance with the contents of the R Latch and as directed by the particular enable signals from the generator 150.

Still referring to FIG. 11, reference is made to the T/C flip-flop 164 wherein an output signal designated "BLU-condition" is shown. The BLU-condition is an output signal which can be fed to the control section 12 of FIG. 5 whereby that condition can be used by the control section to perform branch test instructions. This is an exemplary showing of how the various processing units in the system architecture can provide signals back to the control section whereby the control section can then perform instructions for program execution based upon the conditions of the various processing units within the system.

To illustrate the basic operation of the BLU in response to the logical instructions presented to that unit, consider the bits in the A and B Latches labeled as follows:

$A$ Vector $= (a_1, a_2, a_3, a_4)$
$B$ Vector $= (b_1, b_2, b_3, b_4)$

The vector OR operation results in a four bit R vector (out of ALU 1), each bit of which is the ORing of the corresponding bits in Latches A and B. Thus: $R$ Vector $(r_1, r_2, r_3, r_4)$ wherein:

$r_1 = a_1 + b_1$ $r_2 = a_2 + b_2$ $r_3 = a_3 + b_3$ $r_4 = a_4 + b_4$

In a similar fashion, the vector AND operation results in a four bit R vector, each bit of which is the ANDing of corresponding bits in the A and B vectors. Thus: $R$ Vector $= (r_1, r_2, r_3, r_4)$ wherein:

$r_1 = a_1 \cdot b_1$ $r_2 = a_2 \cdot b_2$ $r_3 = a_3 \cdot b_3$ $r_4 = a_4 \cdot b_4$ The exclusive OR operation also results in a four bit vector where each bit is the exclusive OR of the corresponding bits in vectors A and B. The exclusive OR can be defined in terms of the AND and OR operations as follows:

$r_1 = \bar{a}_1 b_1 + a_1 \bar{b}_1$ $r_2 = \bar{a}_2 b_2 + a_2 \bar{b}_2$ $r_3 = \bar{a}_3 b_3 + a_3 \bar{b}_3$ $r_4 = \bar{a}_4 b_4 + a_4 \bar{b}_4$ where the bar denotes the logical complement (or not function). The exclusive OR operation is useful in the BLU when it is desired to complement selected bits in a vector. For example, if the A vector is:
$a = (0100)$, and the B vector is:
$b = (0111)$, then the result of A exclusive OR B is:
$r = 0011$.

It can be seen that only the second bit of vector B has been complemented corresponding to the logic one in bit position two of vector A.

The Boolean inner-product (BIP) and the Boolean dual product (BDP) result in a one bit answer from ALU 2 of FIG. 11. These operatons are defined by the equations:

$r = A \ BDP \ B = (a_1 + b_1) \cdot (a_2 + b_2) \cdot (a_3 + b_3) \cdot (a_4 + b_4)$ $r = A \ BIP \ B = (a_1 \cdot b_1) + (a_2 \cdot b_2) + (a_3 \cdot b_3) + (a_4 \cdot b_4)$ This one bit answer (r) is placed in the function latch (F latch) where it may then be placed in one of the bits in the R registers as previously described.

Another example of an EPU which may be designed to process a block of functionally related op-codes is the data memory unit (DMU) 48 previously mentioned in connection with FIG. 5. The DMU in its application in the system of the present invention provides storage for discrete events to be processed by the Boolean logic unit (BLU) just discussed. A structural concept incorporated in the DMU is the idea of virtual storage of discrete information. The justification for including this concept in the system will be discussed followed by a detailed explanation of the particular hardware mechanization of the concept used with the virtual storage of discrete information.

In prior data processing systems, equipment which is external to the data processor has normally been treated as peripherals and all communication and interaction with the external equipment is by way of a few input and output instructions which, although general purpose, can frequently result in awkward and complex software problems.

This type of communication is to be contrasted with the present invention which provides for an interface with external equipment, as previously described in connection with FIG. 5, to the effect that equipment is part of a data memory unit (DMU). Because of this integral structure, the present invention need have no input and output instructions and thus the invention circumvents both the additional software and the delays incurred in the application of the prior art to problems similar to those handled by the present invention.

Regarding the communications with external equipment from a data processor, a particular problem to be addressed can be stated as follows. The present data processor is required to interact with a set of external equipments each of which can generate N output signals to the data processor as a function of M input signals received from the data processor. In this problem N and M refer to a certain number of signals nominally counted in the hundreds or thousands. When referring to the number of equipments, the designation "L" for the number of equipments will be used. Each of the signals on the external buses 64 and 68 (FIG. 5) will be available simultaneously (that is, allowing only a short time delay on the order of milliseconds to differentiate between one and another) with all the other signals. Further, each signal will be considered to be of the "discrete event" type. This type being similar to a one line digital signal also referred to as a Boolean variable but differing in that the transitions between logic 0 to logic 1 carry the essential information of the signal. As previously mentioned, this type of interfacing or busing structure is typical of many commercial and military applications wherein a data processor is required to control or be controlled by external equipments on a command/acknowledge basis. In actual use, the data processing system can drive a certain number, L, of equipments where N is the number of signals which normally controls various valves and solenoids and M is the number of return signals from the process equipments indicating that the desired action has been taken.

The interaction between the control inputs 66 and sensor outputs 62 (FIG. 5) consists of the solution of Boolean equations involving time dealys between an input discrete event and the generation of a corresponding output discrete event. Thus, the processing requirements are eminently suited to the previously described Boolean logic unit (BLU) which not only calculates complete equations but can actually calculate a vector or group of Boolean variables at one time.

What is desired for the interface between the process equipments (and the like) is a memory similar to a data memory unit with the following characteristics: (1) a programmer of the data processor of the present invention can read a data vector for purposes of calculations into the BLU wherein the vector consists of signals from the processing equipment along with, possibly, the result of previous calculations; and, (2) the programmer can write a data vector into the memory of the DMU, some bits of which are stored for use in later calculations and other bits of which are used to drive discrete lines going to the process equipment. The technique of allowing a programmer to read and write data which represents data external to the data processor as if it were actually internal to the data processor is commonly referred to as a virtual memory. In this instance, since the data is of a discrete type event and the combination of real and virtual memory is allowed, the memory will be referred to as a virtual discrete event memory shown as VDEM in FIGS. 5, 17, 18, 19, and 20. The VDEM is used as a part of the complete data memory unit (DMU). A VDEM is shown pictorially in FIG. 17 as it resides in the DMU. Basically, the VDEM has the ability to write one Boolean variable at a time and to read one Boolean variable at a time. A DMU may use one or more VDEM units to accomplish its task of writing a complete vector of Boolean variables or reading a complete vector of Boolean variables. When more than one VDEM is utilized in a DMU, it is called one page of memory. In the example to be described, each external equipment is interfaced to a separate page (VDEM). Thus, for L external equipments, L VDEM units are incorporated into the architecture. The following paragraphs describe the details of the mechanization of an exemplary VDEM.

Figure 17:
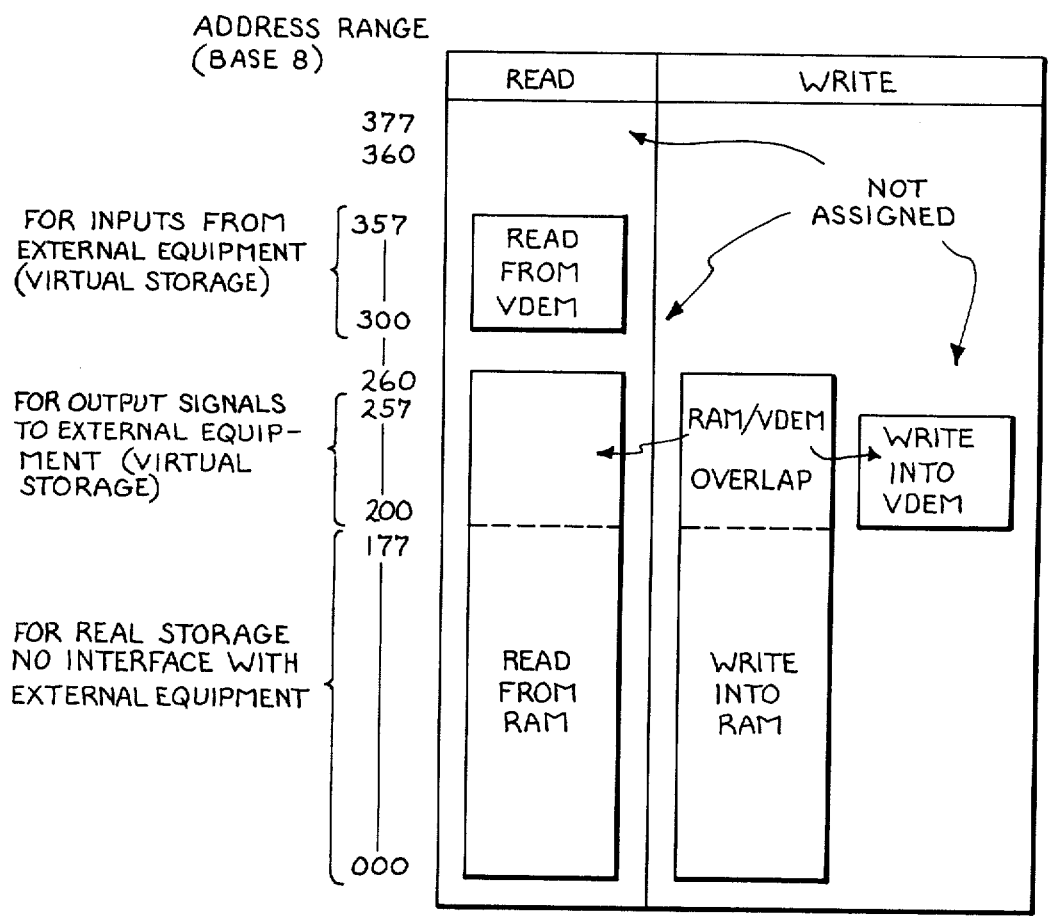
FIG. 17 is a memory map pictorially showing the segmented organization of data in a memory for use in a second type of processing unit of the type depicted in FIGS. 18, 19 and 20.

In the exemplary VDEM of FIG. 17, the store has an overall storage space for 400 base 8 (or 256 base 10) one bit words (each word representing a Boolean variable). Each word in the store or memory is uniquely defined by a memory address which spans the range of octal 000 (address of the first word) through octal 377 (address of the last word) with intermediate variables labeled in sequenced fashion within this range. Of these 256 (base 10) locations, 48 (base 10) locations (addresses 300 through 357, octal) are prescribed for receiving input signals from the external equipment and are virtually addressable memory locations. Also, 48(base 10) locations (spanning the address range of octal 200 through octal 257) are prescribed and reserved to provide output signals to the external equipment and these locations are all also virtually memory addressable. The store locations in address range 000 through 177 (base 8) are prescribed or reserved for real storage (no interface with external equipment) of information. It should be noted that there is an overlap in the assignment of locations 200 through 257 between the virtual addressable output storage and the real addressable storage. Writing information into either of these locations in the overlap region results in writing information into both the real memory and the virtual output memory. Writing information into these memory locations allows reading output variables previously sent to the external equipment.

Figure 18:
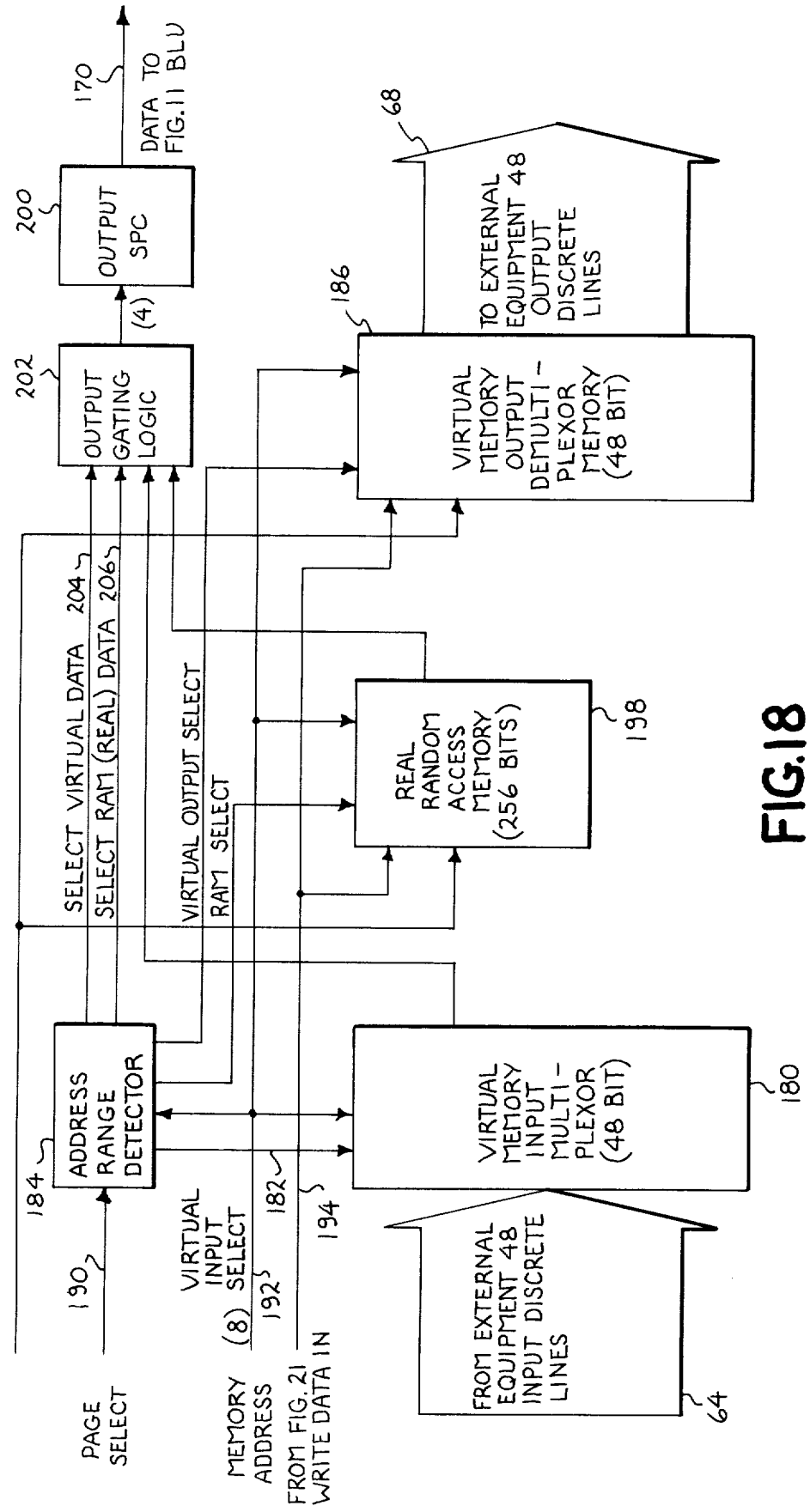
FIG. 18 is a block diagram of the memory of FIGS. 18, 19 and 20 showing in greater detail how that memory is segmented for the processing of data in accordance with the organization of data as depicted by FIG. 17.
Figure 19:
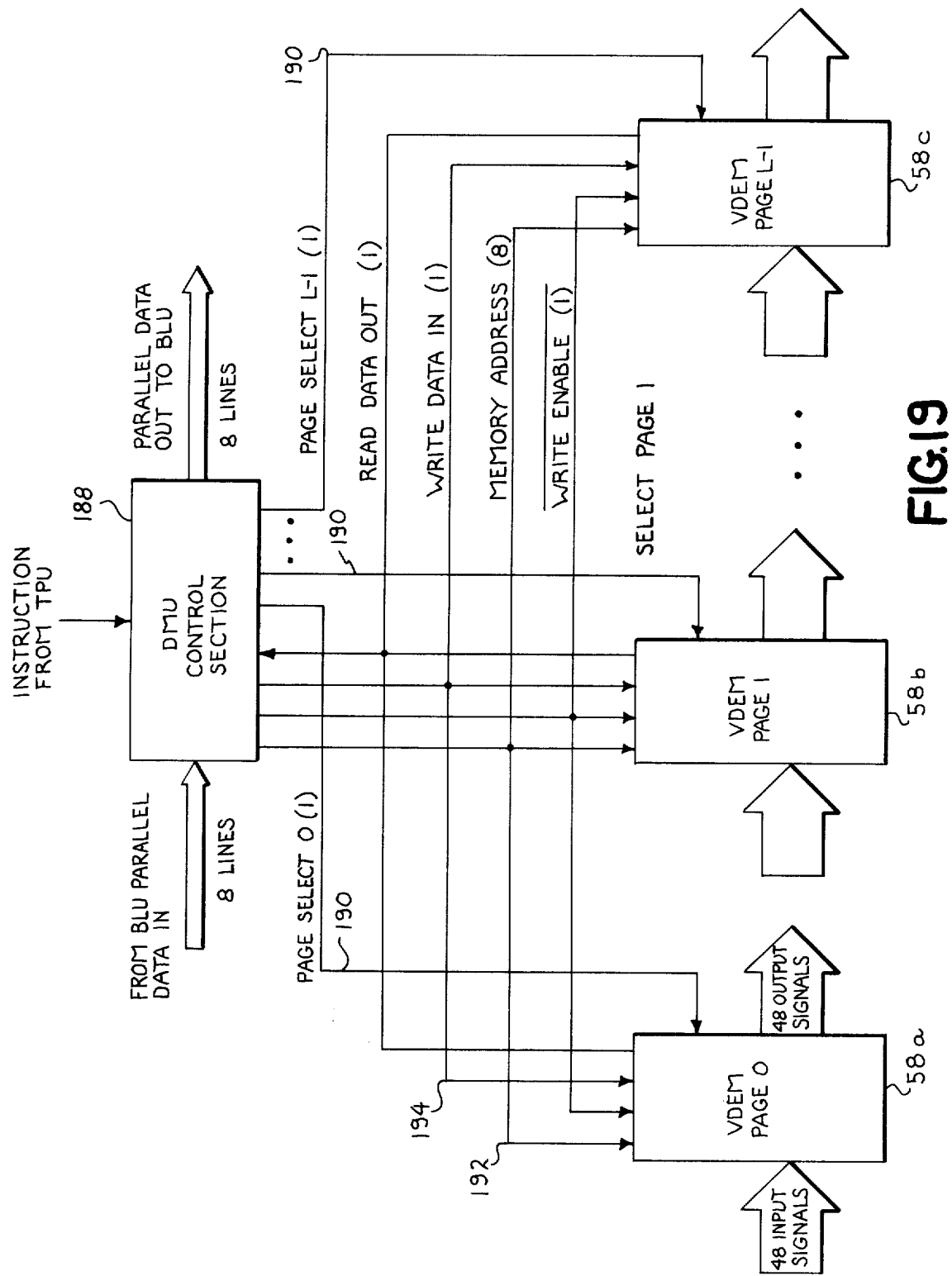
FIG. 19 is a major block diagram of a second type of processing unit as illustrated by FIG. 20 showing interconnection of signal lines between the memory and a control section of that unit.

The actual hardware implementation of a VDEM page is illustrated in FIG. 18. In the exemplary system the interface or external bus with the external equipment connected to the data processor includes 48 simultaneously present input signals on lines 64 into a 48 bit input switch or multiplexor 180 from the external equipment. It will be noted that the input multiplexor receives a virtual input select signal on a line 182 from an address range detector 184. The input multiplexor 180 is the equivalent to that previously described with respect to the virtual input portion of the memory of FIG. 17. Also included are 48 simultaneously present output signals on lines 68 which are provided to the external equipment from an output switch or demultiplexor 186 which corresponds to the virtual memory output portion as shown in FIG. 17. Interface signals for controlling the VDEM are provided from a DMU control section 188 as shown in FIG. 19. A page select signal, via line 190, is applied to each VDEM and enables the VDEM for read/write operation when that signal is a logic 0. Eight memory address lines 192 identify a location for the read or write operation in the VDEM. A "write data in" signal on a line 194 provides one bit of data to be written into a memory location. This data line is not applicable for read operation. A "write enable" signal on a line 196 forces the write data N bit to be written into the defined location when the write enable signal is a logic 0. When the write enable signal is a logic 1 data is read from the random access memory or real memory 198 and gated to the output serial to parallel converter (SPC) 200 via an output gating logic 202 as shown in FIG. 18.

Referring now to FIG. 18, an address range detector 184 monitors the memory address provided on lines 192 from the DMU control section 188 (FIG. 19) and determines whether a read or write function is to be performed with real random access memory 198, the virtual memory input multiplexor memory 180, or the virtual output demultiplexor memory 186. The output gating logic 202 selects either real or virtual input storage in response to two signals, "select virtual data" and "select RAM (Real) data" on lines 204 and 206 respectively from the range detector 184 to derive the data signal (line 170) for transfer to the BLU.

Commercially available logic elements or devices utilized in the implemation of the VDEM are as follows:

Address Range Detector 184
  Fairchild semiconductor type 9301 "one of 10 decoder"
Random Access Memory 198
  Monolithic Memories Type 5530, 256 word memory
Input Multiplexor 180
  Seven Fairchild semiconductor Corporation Type 9312, eight input multiplexors
Output Demultiplexor 186
  Seven Fairchild Semiconductor Corp. Type 9334, eight output demultiplexors, with memory
Output Gating 202
  one gate from Texas Instruments Corp. Type 7400, quad 2 input NAND gate Reference is made to Appendix D for a complete listing of vendor publications which document the circuits utilized in constructing the various units of the present invention.

Figure 21:
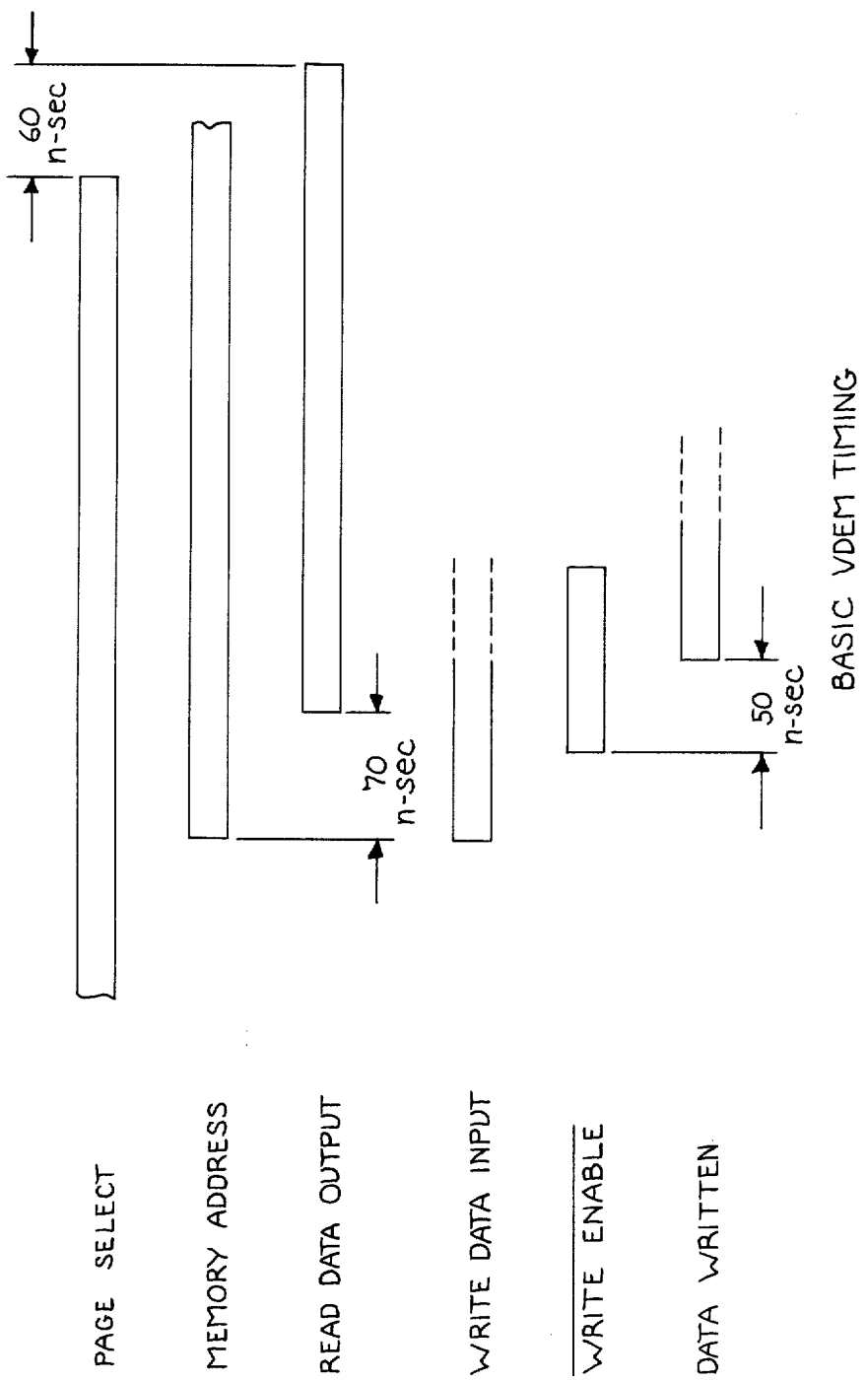
FIGS. 21 and 22 are timing diagrams useful in understanding the operation of the processing unit and that unit's memory of FIG. 20.

The VDEM operates completely by the utilization of combinational logic and requires no external clock for its operations. Success in using the VDEM is based upon that unit's ability to operate as quickly as comparable real data memory elements. FIG. 21 shows the basic timing for a VDEM and illustrates the delays in the VDEM resulting from physical gate delays. The times indicated are well within normal memory cycle times such as core memories and comparable to available semiconductor devices such as the above referenced 5530 device.

Reference is now made to FIG. 19 which illustrates the implementation of a plurality of VDEM's operating through the interface with the DMU section 188. As can be seen the DMU may be described in terms of a DMU control section 188 which drives L number of VDEM pages 58a, 58b and 58c. The general operations of the DMU control section are: (1) to provide the desired data processor interface with a higher level TPU; (2) receive a parallel input data word to be stored from another processing unit such as the BLU as shown in FIG. 19; (3) convert the parallel data word into a serial sequential stream of data bits to be stored from the DMU control section into the selected VDEM's for a write operation; (4) withdraw a serial stream of data bits from the selected VDEM's for a read operation; and, (5) assemble the serial stream of data bits into a parallel word for a read operation for output to another processing unit; eg., the BLU. Additionally, it is desired that the DMU control section 188 perform a data mapping function in its conversion from parallel to serial and serial to parallel. That is to say, instead of eight parallel bits for a read operation being stored into eight sequential locations in a VDEM page, the eight parallel bits may be stored in eight non-sequential VDEM locations. The definition of assignment of a bit in the input parallel word to a particular one bit location in a VDEM is under control of the programmer. As a result of this mapping function, the result of the calculation in the BLU may be stored as a combination of read and/or virtual storage locations in a VDEM. Similarly, the data processor programmer may define a mapping of VDEM locations to form the parallel data out word and the data for computations in the BLU may be a combination of virtual input and real storage data.

In FIG. 19, the memory address, write enable, write data in and read data out signals are common to all VDEM pages.

An appropriate page select signal (lines 190) from the DMU control section 188 is used to select a page of a VDEM. Thus, only one page may be referenced at a given time. As a further capability of the DMU control section, a part of the TPU instruction word may define the number of bits in a data word up to some maximum number (nominally eight in this example) on which a read or write operation is performed. That is, a parallel input or output word of the DMU control section may be one to eight bits.

Figure 20:
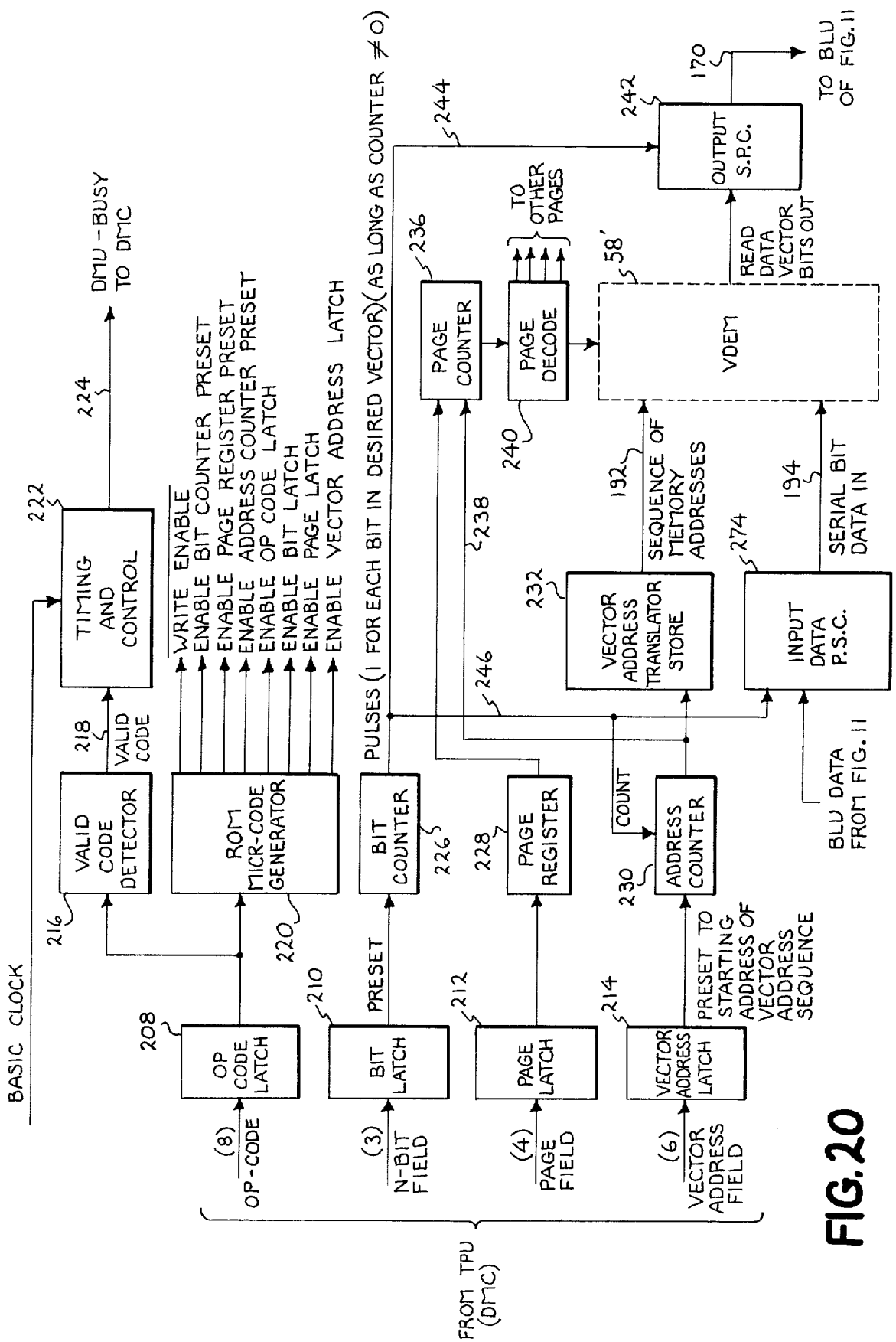
FIG. 20 is a detailed block diagram of a second type of processing unit for use in the present invention for executing instructions provided thereto from a processing unit of the type shown by FIG. 6.

Reference is now made to FIG. 20 which illustrates in deatiled block diagram form the DMU control section. To simplify the discussion, only one VDEM page 58' is shown. Instructions to the DMU of FIG. 20 are provided from the higher level TPU (DMC in the present example) whereby those instructions consist of four fields defined as follows:

1. Op-code field (eight bits) — defines the particular operation to be performed. These bits are loaded into an op-code latch 208.
2. N bit field (three bits) — defines the number of parallel bits to be used in the read or write operation. The bits in this field are loaded into a bit latch 210.
3. Page field (four bits) — defines the VDEM page that the operation is directed to. The bits in this field are loaded into a page latch 212.
4. Vector address field (six bits) — defines the particular pre-defined vector of bits for data mapping between the parallel data and VDEM serial data to be used in the operation. The vector address bits from this field are loaded into a vector address latch 214.

The function of the various illustrated logic blocks in FIG. 20 will now be explained. The op-code latch 208, bit latch 210, page latch 212, and vector latch 214 provide temporary storage for the instruction provided to the DMU from the next higher TPU (eg. DMC) in the hierarchical system.

A valid code detector 216 is utilized to generate a valid code signal (line 218) if the op-code of the instruction provided to the DMU is one for which that unit is responsible. The generation of the valid code signal in the DMU of FIG. 20 is done in the same manner as that previously described for the BLU, with the exception that the op-codes recognized by the valid code detector are different from those recognized by the BLU. The DMU of FIG. 20 like the BLU, contains a micro-code generator 220 which generates enable signals for the accomplishment of individual logic block functions (e.g. incrementing a counter, generating the write command, etc.). A timing and control logic 222 is also utilized in a similar fashion to the BLU to generate the "DMU busy" signal on line 224 to the data memory controller (DMC) as well as the timing pulses for the individual logic block functions.

In the operation of the DMU, a bit counter 226 is initially loaded with a number representative of the number of bits to be converted. Upon each successive bit read from or written into the VDEM the bit counter is decremented by one. When the contents of the bit counter are zero it indicates that all of the bits have been converted and the conversion is complete. A page register 228 is loaded from the page latch 212 and holds the number of the VDEM page currently being utilized. An address counter 230 is loaded from the vector address latch 214. The address counter contains the number representative of the plurality of addresses for addressing a vector address translator 232. The vector address translator in the preferred embodiment is a read only memory. However, it may comprise some other type of store. Each location in the vector address translator memory, as pre-defined by the data processor programmer, identifies a particular address (real or virtual) for each bit in the parallel word to be read from or written into the VDEM. For example, to read eight bits, the address counter references eight consecutive locations in the vector address translator and each of these locations contains the VDEM memory address of the required bit.

An input data parallel to serial converter (PSC) 274 is initially loaded with a parallel input word from another EPU (BLU in the current example) and under control of the bit counter 226 strips off one bit of data for writing into the VDEM for each count of the bit counter. A page counter 236 is initially loaded with pre-defined page numbers from the page register 228. The page counter also receives the memory bit address inputs from the address counter 230 via conductors 238. If the vector read or write exceeds the boundaries of a VDEM page presently being addressed by the page counter (an address greater than octal 377 in the present example) the page counter is incremented by one and the ensuing bit read or write operations are performed on the next higher addressable VDEM page. A page decode 240 communicates with the page counter and the VDEM and serves as a decoder which generates the appropriate page select signal to a VDEM page corresponding to the page counter number. An output serial to parallel converter (SPC) 242 forms a parallel word from the serial bits read from the VDEM page selected for transfer to another EPU (BLU in the current example).

Appendix C attached hereto lists the various logic components or devices required for the implementation of all the logic blocks in the DMU control section.

The following describes typically how three relevant instructions can be executed by the data memory unit (DMU). The first instruction to be described contains an op-code number 100 which is identified as a DMU no operation code. Assuming that the DMU is initially not busy, the op-code is transferred through the op-code latch 208 to the valid code detector 216. The valid code detector signal enables the timing and control logic 222 to generate the DMU busy signal on the next basic clock applied to the timing and control logic. Since the micro-code generator 220 has not enabled an executable operation, the busy signal is dropped.

The next instruction to be described is op-code number 103 which sets up the DMU for a four bit data transfer. The cycle of operation is the same as that just described for the no operation code except that the ROM micro-code generator 220 enables the bit counter 226 to be loaded with the N bit field and the address counter 230 to be initialized to the starting address for the vector using the vector address field. This instruction is used to set up the DMU for both vector read and write instructions.

Figure 22:
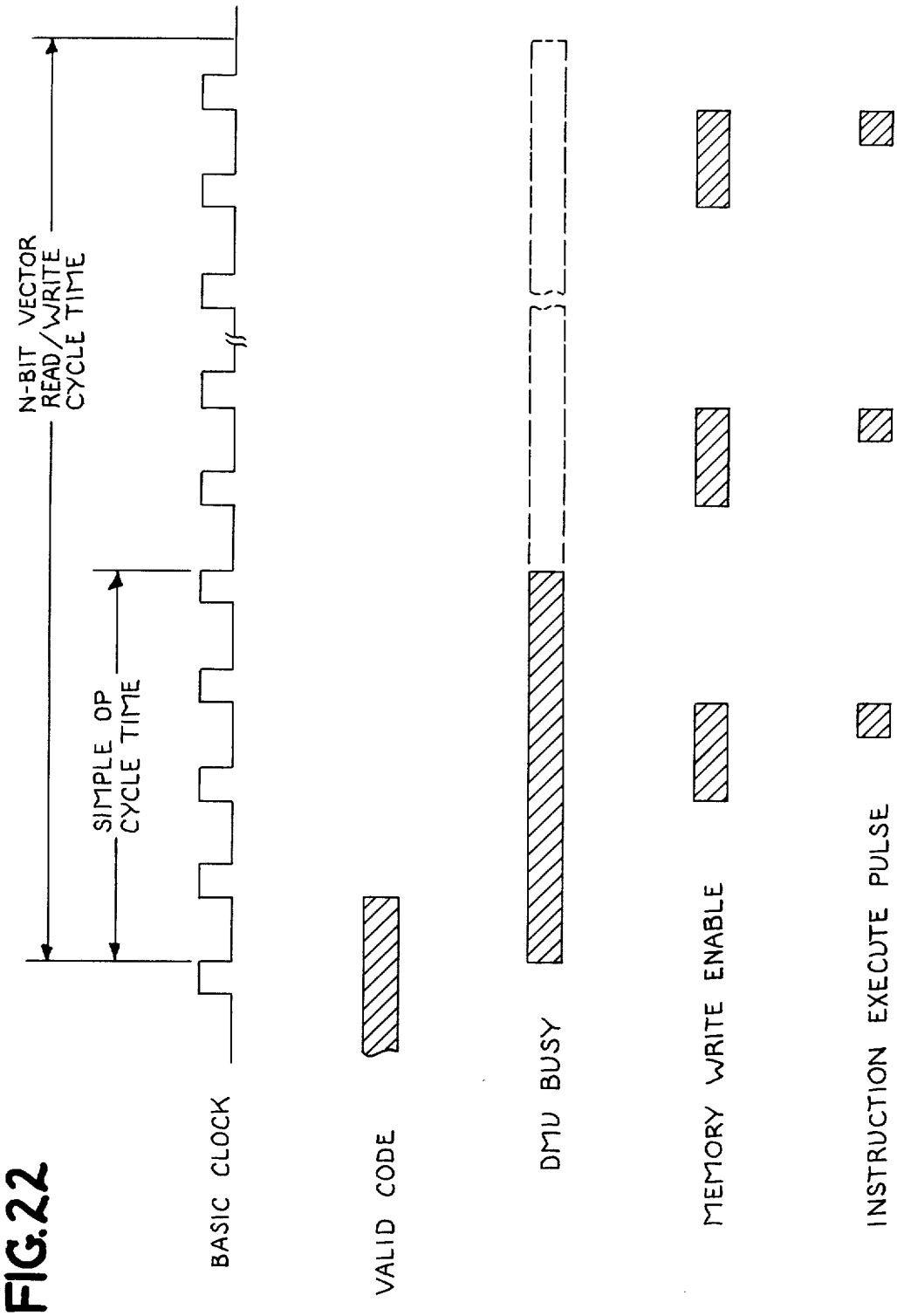

The final DMU instruction is for an op-code number 112 which enables the reading of the vector defined by the 103 op-code instruction. Timing for this latter instruction is illustrated in FIG. 22. After the DMU goes busy, that is, the DMU busy signal goes to a binary 1, the current address is applied to the vector address translator 232 which in turn generates the bit address for the first bit. After sufficient time for the data to be read from the VDEM, the bit is stored in the output SPC 242 by a pulse applied thereto via line 244 from the bit counter 226, the bit counter is decremented, and the address counter 230 is incremented by a count pulse on a line 246 from the bit counter. If at this time the bit counter is not zero, the operation is repeated as above and further repeated until the bit counter becomes zero. When the bit counter becomes zero, the busy signal is dropped and the DMU awaits the reception of another instruction from the DMC or executes an instruction which was placed on the op-code bus while it was busy. A DMU parallel word write is executed in a similar fashion except that the input data to PSC 234 is loaded initially and generates one bit for writing into the VDEM for each cycle of operation. Further, the $\overline{\text{write enable}}$ signal is generated during each cycle to enable storage of the serial bit provided to the UDEM from the input data SPC.

With the preceding background from the description of the BLU, DMU, and TPU, an operational description will now be given of how a high level instruction from the control section 12 (FIG. 5) is passed through a series of TPU's for the ultimate execution of that high level instruction by the DMU and BLU EPU's.

The particular high level instruction to be discussed is an instruction residing in the program store 10 (FIG. 5) which specifies the combining of four bits of information (discrete events) stored within the data processor of FIG. 5 together with four bits of information that are determined by discrete events external to the data processing system. These two groups of four bits of information are defined as two four bit vectors. The operation to be performed on the two four bit vectors is the Boolean inner product (BIP) which combines two vectors designated $A = (a_1, a_2, a_3, a_4)$ and $B = (b_1, b_2, b_3, b_4)$ and each comprising four bits of discrete information. The Boolean inner product forms the scalar result $r = (a_1 \odot b_1) + (a_2 \odot b_2) + (a_3 \odot b_3) + (a_4 \odot b_4)$. In the ensuing description FIGS. 5, 6, 11 and 20 will be referred to when appropriate. Additionally, Tables 3, 4 and 5 as set forth below contain listings of the op-codes or instructions which will be read out of the various TPU's in response to the high level instruction retrieved from the control section 12.

TABLE 3

SEQUENCE OF CODES RESULTING FROM SEQUENCE CODE 270

| OP-CODE | DESCRIPTION | RESPONSIBLE PROCESSING UNIT |
|---|---|---|
| 121 | XFER VDEM DATA TO DMU | DMC |
| 100 | DMU NO-OP | DMC |
| 52 | LOAD BLU REGISTER A FROM DMU | EPIC |
| 170 | BOOLEAN INNER PRODUCT | EPIC |

TABLE 4

DMC SEQUENCE FOR OP-CODE 121

| OP-CODE | DESCRIPTION | RESPONSIBLE PROCESSING UNIT |
|---|---|---|
| 103 | SET-UP TRANSFER | DMU |
| 111 | XFER DATA | DMU |
| 100 | NO-OP | DMU |

TABLE 5

EPIC SEQUENCE FOR OP-CODE 170

| OP-CODE | DESCRIPTION | RESPONSIBLE PROCESSING UNIT |
|---|---|---|
| 55 | LOAD BLU-B LATCH WITH $(R_1)$ | BLU |
| 57 | REGISTER $R_2$ TO F LATCH | BLU |
| 62 | GENERATE BIP (ALU-1 DO AND) (ALU-2 DO OR) | BLU |
| 60 | T/C FLIP-FLOP TO $F_v$ | BLU |
| 41 | F TO REGISTER $R_2$ | BLU |

To begin the description let it first be assumed that a high level instruction defined as a sequence code instruction having an op-code 270 (octal) as shown in Table 3 is retrieved from the program store 10 and placed on the CS Bus 26 by the control section 12 as shown in FIG. 5. This 270 op-code lies within the range of op-codes for which the (MIC) 28 is responsible. Further, the operand fields of this high level instruction will specify the address of the storage register (R register) in the (BLU) 52, the address of the sequence of discrete events to take place in the DMU 48, and the address of a second storage register (R register) in the BLU into which the result (scalar result r) is to be placed.

Since the instruction on the CS BUS is a 270 op-code, the MIC will accept this instruction and interpret the 270 op-code as a sequence code. That is, a code of the type that requires translation. As a result, MIC starts to generate a sequence of op-codes in place of the 270 op-code. The sequence of op-codes generated passed out on the EPIC Bus 46 is shown in Table 3. Also shown in Table 3 is a column indicating those processing units which are responsible for receiving the various op-codes. Additionally, a description is provided in Table 3 defining the operations performed in those responsible units as specified by the op-code presented to those units. The op-codes read from the MIC are placed on the MIC Bus 36 one at a time along with the operands which were stored in the MIC instruction register when the instruction having the op-code 270 was accepted. Referring to FIG. 6 it will be recalled that an instruction from the next higher level is, when applied to a TPU, is stored in the instruction register. Further, it will be recalled that the contents of the operand latch portion of the instruction register is passed directly to that TPU's lower instruction bus.

The instructions thus placed on the MIC Bus 36 comprise an op-code (one of the sequence codes from Table 3) and the set of operands which was stored in the MIC 28 when the op-code 270 instruction was accepted from the control section 12. Two of the instructions passed out by the MIC require further translation. The op-code instruction 121, as shown in Table 3, is treated as a sequence code by the TPU shown as the data memory controller (DMC) 42 and the op-code instruction 170 is treated as a sequence code by the TPU EPIC 38. Tables 4 and 5 show the sequence of instructions that the DMC and EPIC issue in response to the 121 and 170 op-codes, respectively. Tables 4 and 5, like Table 3, also indicate the units which are responsible for receiving each of these op-codes.

When the MIC puts the 121 op-code instruction on the MIC BUS, the DMC recognizes that instruction as containing an op-code within the block of op-codes for which it is responsible. The DMC responds by storing the op-code 121 and that instruction's operand field in the DMC op-code and operand latches (instruction register of the TPU) and then raising the DMC busy signal (see FIG. 6). In the present instance, the DMC busy signal is the equivalent to the TPU busy signal generated by the control logic 104 as previously described in connection with FIG. 6. The operand stored by the DMC is the same operand that was originally issued by the control section 12 with the instruction identified by op-code 270. The MIC now acknowledges the DMC's busy signal by removing instruction op-code 121 from the MIC BUS and placing the next instruction in the sequence of 270 op-codes thereon. This code is shown as op-code 100 in Table 3. As can be seen in Table 3, the DMU is responsible for the instruction op-code 100. The DMC, therefore, will accept this op-code 100 as a direct op-code and place that op-code directly (no translation required) on the DMC BUS 54 (Bus 98 in FIG. 6). The DMC, however, cannot accept the instruction op-code 100 until it completes the sequence as specified by the op-code 121 which it previously accepted, because an EPU cannot accept an op-code if that unit is busy. As the DMC passes out the sequence of op-codes (103, 111, 100) listed in Table 4, the DMU will accept these op-codes along with the operand that was passed through the MIC and the DMC from the control section.

Reference is now made to the DMU block diagram of FIG. 20. The DMU 48 will store that portion of the operand which contains the address of the sequence of discrete events addresses as specified in the original instruction (op-code 270) read out of the control section 12 of FIG. 5. The address of the sequence of discrete events addresses in the VDEM will determine the discrete events which are sent to the BLU from the DMU in the form of a four bit discrete events vector. In FIG. 20 the op-code 103 is loaded into the op-code latch 208, the output of which is decoded by the microcode generator 220. The micro-code generator will now generate the specified output signals to cause the operand to be loaded into the page latch 212 and vector address latch 214. As shown in Table 4, op-code 103 performs a set up transfer function to be performed by the DMU. The operand which is loaded into the page and vector address latches specifies the VDEM page to be addressed and the operand loaded into the vector address latch is passed into the address counter 230 which initially contains an address of a location in the vector address translator 232. It will be recalled from the previous description of the DMU that each addressable location in the vector address translator contains a word having an address which is presented to the VDEM to effect a sequential or random retrieval of vector bits from that memory in accordance with the contents of the words read from the vector address translator. The DMU can now accept the next instruction from the DMC.

As shown in Table 4, when the DMU accepts the next instruction with op-code 111 the operations are set into effect by a decoding of the op-code latch contents by the micro-code generator to effect the transfer of a four bit vector from the VDEM to the BLU. This is accomplished by the micro-code generator generating the proper output control signals to cause the bit counter 226 to be decremented by one for each bit read from the VDEM and to increment the address counter 230 by one each time a vector address is read from the vector address translator to address the VDEM to read the bits in the vector from each location in the VDEM. As each bit of the four bit events vector is read from the VDEM, it is placed into the output SPC 242 for subsequent transfer to the BLU. When the bit counter 226 decrements to zero, the four bit events vector will have been completely loaded into the output SPC. It can now be seen how a four bit events vector results from the translation of a single operand previously placed into the page and vector address latches. This four bit events vector comprises both read data (stored in the systems data memory) and virtual data (stored in the external events virtual memory).

The four bit events vector now resides in the output SPC and is available to the BLU for transfer into that unit. The DMU now can accept the instruction with op-code 100 from the DMC. It will be noted in Table 4 that op-code 100 defines a no operation instruction. This instruction will be loaded into the op-code latch of the DMU of FIG. 20 whereby that instruction is decoded as a valid op-code in the valid code detector 216 and further decoded by the micro-code generator 220 which effects no operation in the DMU. After the op-code 100 instruction is decoded, the timing and control 222 of the DMU will drop its DMU busy signal to the DMC. This indicates to the DMC that the DMU is through with its operations. Further, the no operation instruction read out of the DMC will contain the previously mentioned "STOP" bit as utilized by all TPU's to cause the DMC to go not busy. As soon as the DMC goes not busy, the op-code 100 from the MIC, now present at the input of the DMC, will be passed directly through the DMC to the DMU wherein that instruction will be executed in the same manner as just described for the op-code 100 instruction read out of the DMC. The manner of including no operation instructions in sequences of op-codes read from the various TPU's as just described for the MIC and DMC is to provide a method of inserting delays into the system to insure that one EPU which is to provide data to another EPU has completed all of its assigned functions prior to the transfer of that data to the latter EPU.

After the last op-code 100 instruction has been accepted and executed by the DMU as passed out by the DMC, the last two op-codes shown in Table 3 from the MIC (op-codes 52 and 170) are sequentially placed on the MIC BUS 36 along with the operand of the original op-code 270 instruction and accepted one at a time by the EPIC 38. The first instruction (op-code 52) is provided to the EPIC and is a direct operation instruction. Thus, EPIC 38 passes the instruction directly to the BLU. Reference is now made to FIG. 11, the BLU block diagram. Assuming at this time that the BLU is not busy, the op-code 52 instruction is stored in the op-code latch of the BLU. In this particular instance, the BLU stores the operand of the instruction but does not use the operand. The op-code as decoded by the micro-code generator 150 causes the four bit vector to be loaded from the output SPC 242 of FIG. 20 of the DMU into the A latch 158 of the BLU (FIG. 11) via conductor 170 and the MPXE switch.

The MIC now provides the instruction op-code 170 defined in Table 3 as a Boolean inner-product instruction to the EPIC. This instruction is recognized by the EPIC as a sequence instruction. In response to the op-code 170, the EPIC will begin to sequentially generate the op-codes listed in Table 5. Each of these op-codes (55, 57, 62, 60 and 41) are provided in sequence to the BLU of FIG. 11. The first instruction is op-code 55 which effects the loading of the BLU latch 160 with the contents of register $R_1$ in the R registers 156. This is effected by the operand specified by the originally retrieved op-code 270 instruction which now resides in the R and Y Latches of FIG. 11. The Y Latch 148 is an eight-bit latch which contains two four bit addresses, one addressing register $R_1$ and the other addressing register $R_2$ in the R registers 156. Register $R_1$ contains a predetermined pattern of binary bits previously calculated or placed in that register by the programmer which will be utilized as a mask to generate a vector result. The Y latch, which now contains the address for register $R_1$, is provided to the MPXB switch via lines 248. The op-code 57, which now resides in the op-code latch 144, is utilized to address the micro-code generator 150. The generator 150 will now generate an enable output signal to the MPXB switch to gate the address from the Y latch into the R registers. Thus, register $R_1$ is addressed and its contents is placed on conductors 250 and applied as one input to the MPXE switch. MPXE, at this time, also receives an enable input signal and a control input signal from the micro-code generator 150 which gates the contents of register $R_1$ into the B latch 160. The B latch, like those latches previously described, receives a latch input signal which is generated as a result of one of the enable signals from the micro-code generator 150 to allow the contents of register $R_1$ coming through the MPXE switch to be gated into the latch. With the B latch now loaded, the control and timing logic 155 causes the BLU busy signal to go inactive. The inactivation of the BLU busy signal will allow the EPIC to generate or pass out to the BLU the next op-code, op-code 57. As shown in Table 5 this instruction specifies that the contents of register $R_2$ in the R registers 156 of the BLU are to be transferred to the F latch 166. Upon receipt of op-code 57 the BLU immediately goes busy and the micro-code generator generates the proper output signals to cause register $R_2$ in the R registers to be addressed. Register $R_2$ is now addressed from a second portion of the Y latch providing the address on conductors 252 to the MPXB switch which is the address now being gated to the R registers to address register $R_2$. The output of register $R_2$ is now presented on conductors 176 which apply the contents of register $R_2$ as one input to the F latch 166. The contents of register $R_2$ are now gated into the F latch by an enable signal generated by the micro-code generator 150 and applied to the F latch. The F latch now contains a four bit vector previously stored in register R₂.

The BLU control and timing logic 155 now drops the BLU busy signal, thus allowing the EPIC to respond by passing out the next op-code (op-code 62). Op-code 62 is provided to the BLU and immediately upon a decoding of that op-code by the detector 150 raises the BLU busy signal to the EPIC. As shown in Table 5, op-code 62 specifies that the Boolean inner-product (BIP) is to be generated by the performance of an AND function on each of the bits of the vectors now stored in the A and B latches (158 and 160) by ALU 1. The resultant vector generated by ALU 1 is then provided to the input of ALU 2 which now provides an output representative of the ORing of all of the bits of the aforementioned vector. The one-bit output from ALU 2 is provided to T/C circuit 162. The T/C circuit 162, in this particular instance, passes the bit directly through to the input of the T/C flip-flop 164. The ANDing and ORing operations just described for the ALU 1 and ALU 2 are straight combinational logic wherein all of the signals flow in an ungated fashion directly through the two units as well as through the T/C circuit. However, the one-bit provided to the T/C flip-flop is gated into that flip-flop by an enable signal generated by the micro-code generator 150 in conjunction with a timing signal provided by the control and timing logic 155. The BLU will now drop its busy signal notifying the EPIC to respond by passing out its next op-code (op-code 60). As can be seen in Table 5, op-code 60 specifies that the contents of the T/C flip-flop are to be gated into position $F_N$ of the F Latch 166 as specified by two bits contained in the R Latch 146 and decoded by the bit address decode 168. $F_N$ specifies one of the four bits in the vector now residing in the F Latch as previously loaded from register R₂. After the completion of the execution of op-code 60, the result will be the modification of bit $F_N$ of the vector originally stored in register R₂. Upon receipt of the op-code 60, as previously described, the BLU will go busy and the micro-code generator 150 will generate an enable signal applied to the F Latch to gate the bit from the T/C flip-flop into bit $F_N$ of the latch 166.

The BLU will now go not busy. The EPIC will again respond by generating or passing out the op-code 41 which is, as previously described, loaded into the op-code latch 144 of the BLU. As shown in Table 5, op-code 41 specifies to the BLU that the contents of the F Latch are to be placed in register R₂. This is accomplished by the micro-code generator 150 providing the proper output enable signals to the MPXF and MPXB switches to allow the contents of the F Latch to be gated through the MPXF switch into register R₂ as specified by the R₂ register address now residing in the Y Latch 148. When op-code 41 was read out of the EPIC, that instruction contained a STOP bit which is utilized by the EPIC to cause that unit to go not busy as soon as the BLU accepted op-code 41. With the EPIC now not busy, it is available to receive an additional instruction even though the BLU has not completed its last designated operation. As soon as register R₂ is loaded with the updated vector the BLU again goes not busy and is available to receive subsequent op-codes.

Figure 23:
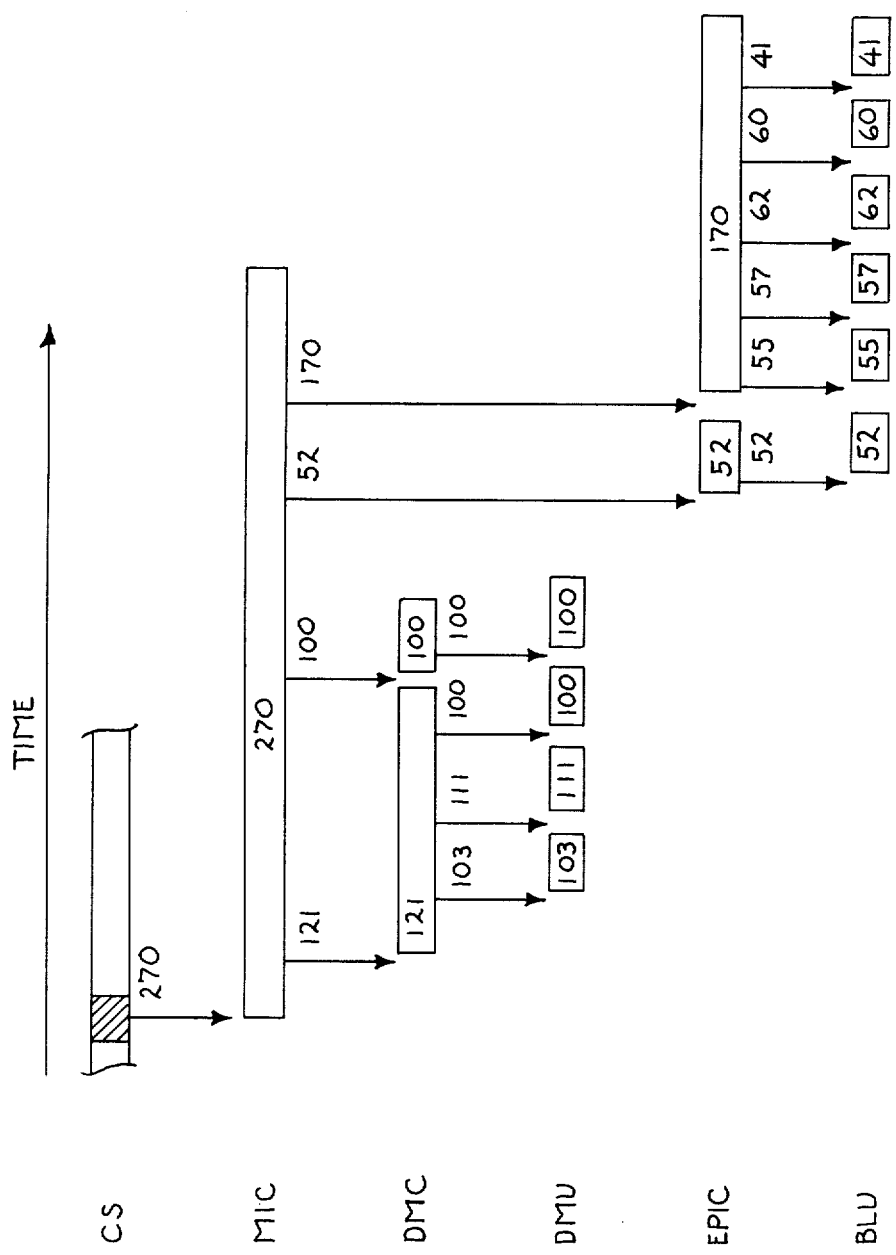
FIG. 23 is a pictoral bar chart showing how instruction sequences are generated in a time sequence by the processing units of the present invention to execute a single high level instruction issued by the processing unit highest in the pyramidal architecture.

FIG. 23 shows a hierarchy of sequence op-codes and the resulting lower level op-codes to demonstrate the manner in which one high level instruction (op-code 270) is broken up into a combination of two sequence op-codes (121, 170) and two direct op-codes (100, 52). Also shown in FIG. 23 are the 10 resulting op-codes that get executed by the EPU's, DMU and BLU. As shown, four op-codes get executed by the DMU and six op-codes get executed by the BLU as a result of sequences stored in the MIC, DMC and the EPIC.

Again referencing FIG. 5, one of the EPU's shown is the interface logic 78 and alphanumeric display 76. The following information describes how commercially available devices such as line printers, card readers, magnetic tape units and disc mask storage units, etc. which do not have the control structure like those processing units previously described may be incorporated or implemented into the system of the present invention. In the present description, one exemplary type of device, of the various types of commercially available devices, to be described for implementation into the system utilizes a Burroughs Corporation Model BDS40832-200 Self-Scan Panel Display Subsystem as an EPU when taken in conjunction with interface logic for connecting that panel display subsystem to the next higher level TPU. This next higher level TPU is shown as a character processor controller (CPC) 32 which interconnects through the CPC BUS 70 to the interface logic 78 of the alphanumeric display 76. A description of and the specifications for the Burroughs subsystem may be found in "Burroughs Corporation Bulletin NO. 1172C" dated January, 1972. As described in that bulletin the display subsystem allows the display of up to 256 alphanumeric characters (nominally grouped to form a meaningful message). As specified by Burroughs, the display subsystem requires the activation of single controlled input lines to accomplish the basic functions of changing a character on the display, etc. To this end, the individual instructions which are provided to the display subsystem from a higher level TPU have op-codes identifying those instructions as direct instructions. That is, for each instruction presented to the display subsystem via its interface logic one function will be performed such as clear the display, etc.

Figure 24:
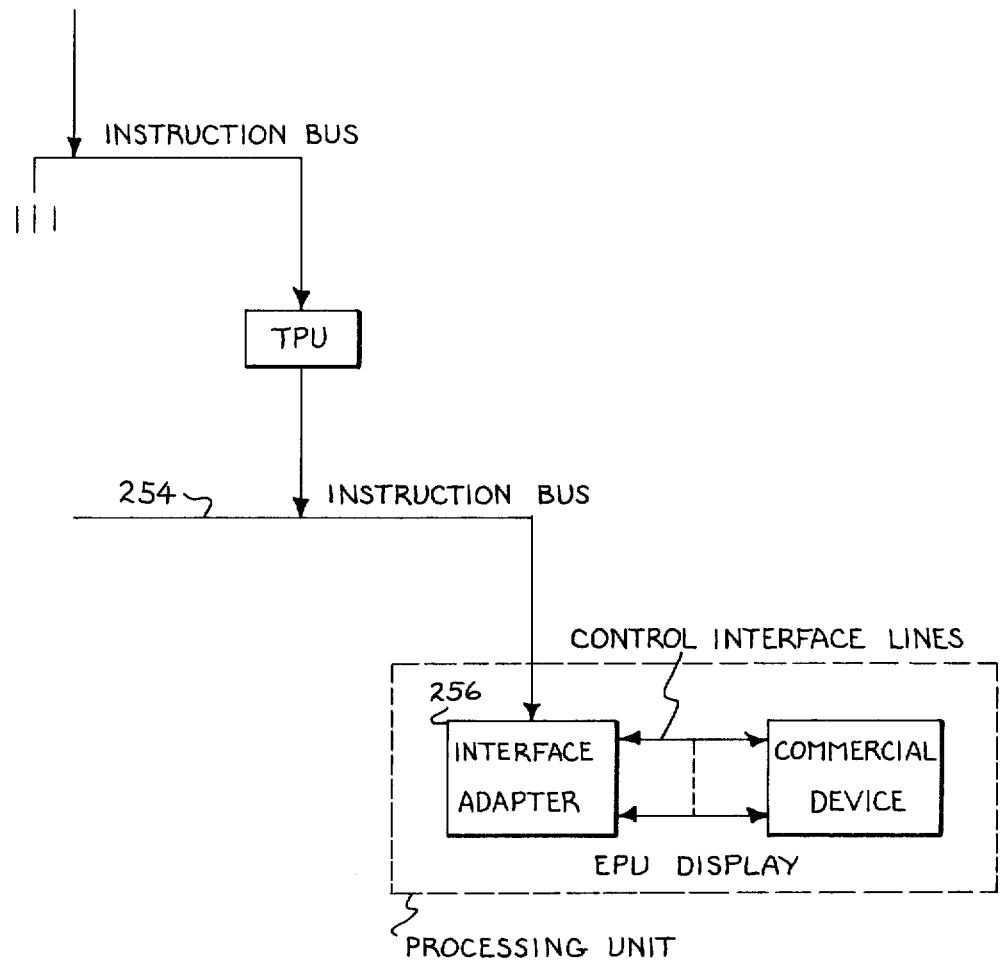
FIG. 24 is a major block diagram of a third type of processing unit showing how a commercially available device can be implemented into the system of the present invention by the utilization of an adapter unit with that device.

Reference is now made to FIG. 24 in conjunction with FIG. 5. FIG. 24 shows in major block form how a commercially available product may be implemented as an EPU into the system architecture by the use of an interface adapter or interface logic. In FIG. 24 the instructions having op-codes for which the EPU is responsible are provided via an instruction bus 254 in the same manner as previously described for the rest of the system to an interface adapter 256. Basically, the interface adapter of FIG. 24 comprises the control structure similar to that previously described for the other EPU's, such as the DMU and the BLU, to perform the appropriate conversions required to interface a commercial device to the system architecture of the present invention.

Like all processing units within the system the display subsystem EPU is assigned a block of op-codes defining instructions for controlling the operation of the display. Table 6, which follows, lists a plurality of direct op-code instructions which have been assigned for explanatory purposes to the display in the present embodiment. These op-codes, however, may be arbitrarily renumbered for a particular application; that application being dependent upon the type of commercially available device being incorporated into the system. Also in Table 6, the center column is a description of the operation performed within the interface adapter for each op-code presented thereto. Additionally, Table 6 provides a description in the right column of the operation which takes place in the display unit.

Table 6

| Direct Op-Code No. | Operation Performed Within Interface Adapter | Operation in the Display Unit |
| --- | --- | --- |
| 020 | SSIU NO OPERATION Busy signal generated, then dropped; no other functions performed. | None |
| 021 | HOME CURSOR Generate "Cursor Home"discrete signal to the Self-Scan Unit. | Sets cursor present display position) to upper left-hand corner of display. |
| 022 | JUMP CURSOR Buffer instruction operand to the Self-Scan Unit, then generate the discrete "Cursor Preload" signal; wait for "Data Taken" signal return before dropping "Busy". | Set cursor number to what is on the input lines. |
| 023 | READ CURSOR Buffer the "Cursor Address Out" lines to the SSIU output latch. | None |
| 024 | WRITE DISPLAY CHARACTER Buffer instruction operand to the Self-Scan "Data-In" lines. Generate "Write" signal then wait for "Data Taken"signal. | Replace character at current cursor location by new character code, then increment cursor by 1. |
| 025 | SPARE | |
| 026 | CURSOR UP Activate the display "cursor up" discrete control line. | Decrease the present cursor location by 32. |
| 027 | CURSOR DOWN Activate the display " cursor down" discrete control line. | Increase the present cursor location by 32. |
| 030 | CURSOR LEFT Activate the display "cursor left" discrete control line. | Decrease the present cursor location by 1. |
| 031 | CURSOR RIGHT Activate the display "cursor right" discrete control line. | Increase the present cursor location by 1. |
| 032 | CURSOR VISUAL ON Set VISUAL ON flip-flop element; activates the "cursor visual on" discrete control line which remains activated after the unit is not "busy". | Present position of cursor is physically displayed by completely filled in character. |
| 033 | CURSOR VISUAL OFF Deactivate VISUAL ON flip-flop element; disables "cursor visual on" discrete control line. | Physical display of cursor position is deactivate. |
| 034 | CURSOR BLINK ON Set BLINK flip-flop element; enables "cursor blink" discrete control line to the display. | Visual cursor indication flashes ON then OFF, then repeats at a fixed rate. |
| 035 | CURSOR BLINK OFF Deactivate the BLINK flip-flop element; disables the "cursor blink" discrete control line. | Visual cursor indication will no longer blink. |
| 036 | CARRIAGE RETURN Activate the "carriage return" discrete control line. | Increases the cursor location to the beginning of the next 32 character segment. |
| 037 | CLEAR DISPLAY Deactivate VISUAL ON and BLINK flip-flop elements; activate the "clear" discrete control line. | Set all display characters to blank; set cursor to 0. |

Figure 25:
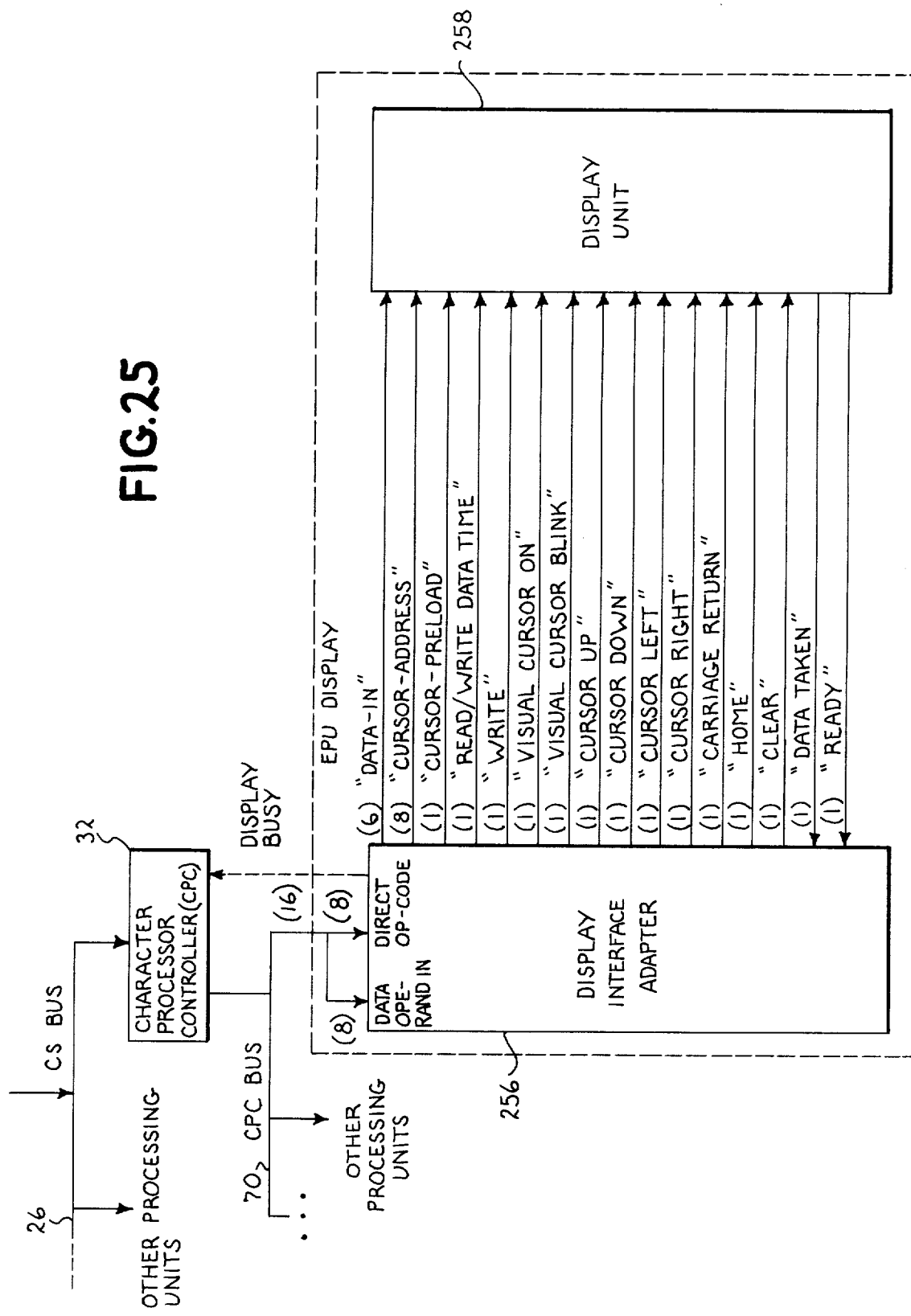
FIG. 25 is similar to FIG. 24, but defining in detail interface lines connected between the adapter unit and the commercially available device.

FIG. 25 shows a major block diagram of the display EPU which includes the display interface adapter 256 and a display unit 258. The display EPU receives op-codes and operand data from the CPC 32 via the CPC BUS 70 as inputs to the display adapter. The inputs are designated "data operand in" and "direct op-code". Also shown in FIG. 25, and identified by appropriately included notations, are interface control and data lines which interconnect the display interface adapter with the display unit. It will be noted that those lines having a number in parenthesis specify the number of wires physically employed between the interface adapter and the display unit. For example, a "Data in" bus is comprised of six lines for providing six bits of data from the interface adapter to the display unit. All of the lines indicated having only one line such as a "Write" line are single wires utilized to provide control signals to the display unit to cause that unit to perform an operation as specified by that line. There are two single lines which provide signals from the display unit back to the display interface adapter which are utilized by the latter to signify one of two conditions. The first of these conditions being the condition telling the display interface adapter that the display unit is ready to receive data. The second of these conditions being a signal, 'Data taken", which is provided to the interface adapter from the display unit indicating to the latter that it has received or taken the last data presented to the display unit.

Figure 26:
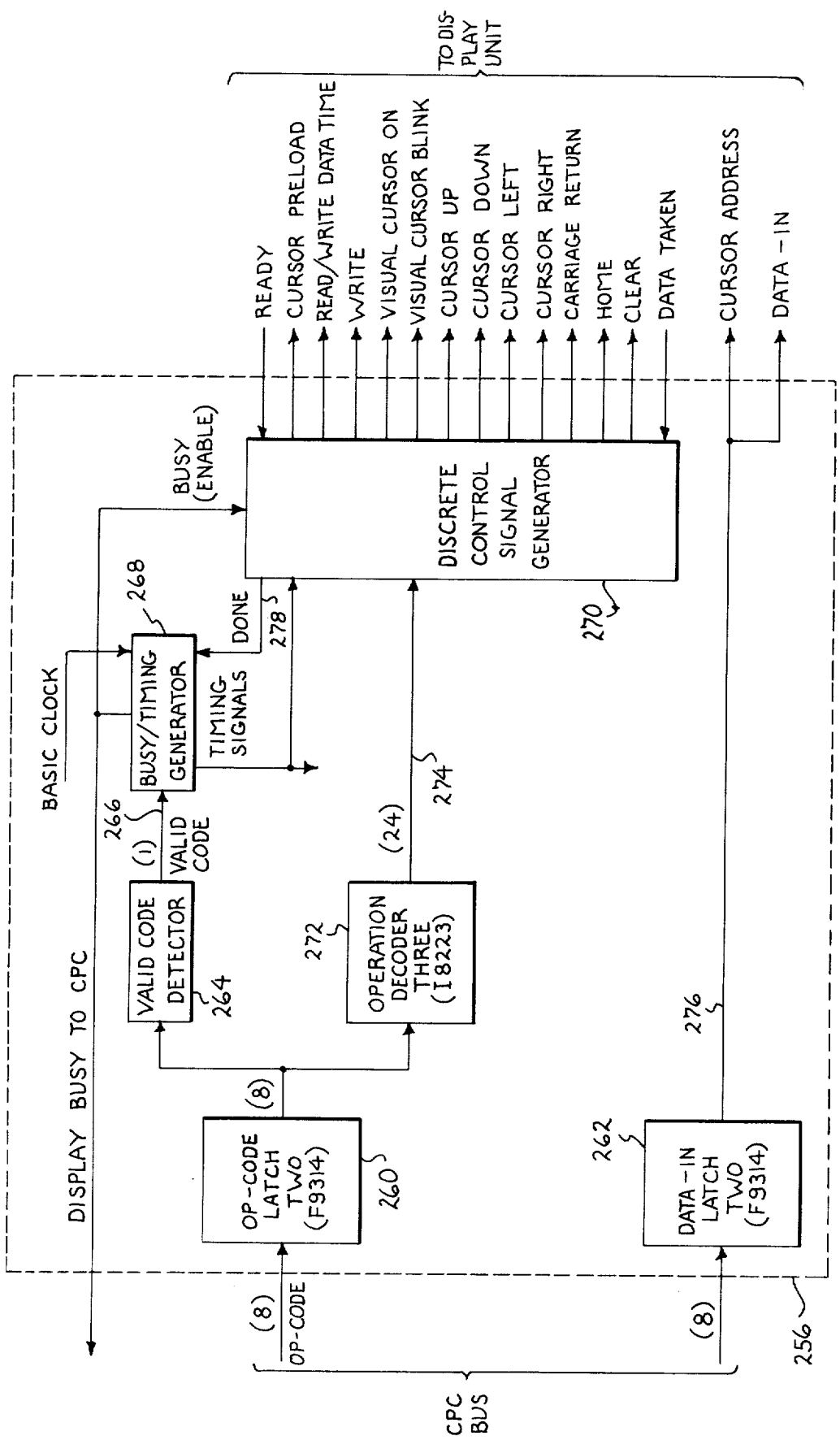
FIG. 26 is a detailed block diagram of the adapter unit of the processing unit of FIGS. 24 and 25.

Referring now to FIG. 26 it will be immediately obvious that a great deal of similarity exists in this block diagram when compared to the previously described EPU's. That is, the interface adapter of FIG. 26 includes an op-code latch 260 and a data-in latch 262, for receiving data in the same manner as in the previously described EPU's. Also, the interface adapter 256 includes a valid code detector 264 for generating a valid code signal on a line 266 in response to an op-code in the op-code latch for which this EPU is responsible. The valid code signal is provided to a busy/timing generator 268 which is utilized to generate a display busy signal to the CPC to control the latter in the manner previously described. The busy/timing generator 268 also generates specified output timing signals for controlling the gating of information through the various blocks of the interface adapter and for controlling the timing of information provided to the display unit. It will also be noted that the busy/timing generator provides the display busy signal to a discrete control signal generator 270 which will be subsequently described. The interface adapter 256 also includes an operation code decoder 272 which is comprised of a programmable read-only memory, in the preferred embodiment, whereby 32 words having 24 bits per word in that memory are directly addressable by the op-code latch (contents) to provide output control signals to the discrete control signal generator 272 via lines 274 for decoding by the latter to provide control signals to the display unit in accordance with the op-code presented to the interface adapter.

The Data-in latch provides data directly to the display unit via lines 276. In FIG. 26 this data comprises two sets of signals designated "cursor address" and data-in. These two sets of signals are derived from the common bus 276. Dependent upon the op-code, the data thus presented will be either a cursor address or data-in for display.

Appendix D, attached, provides a complete listing of the various logic devices showing the device code, the quantities of devices used, the manufacturer and the function performed by each of those devices for implementation in constructing each of the logic blocks shown in the adapter 256 of FIG. 26. It is considered that one having ordinary skill in the art by having these references and devices at his disposal could construct the device to functionally perform the operations as to be described.

In describing the operation of the display EPU, all of the instructions listed in Table 6 will not be described since it is considered that two typical examples will be sufficient to enable one skilled in the art to understand the operation of the invention and to be able to implement the logic elements into the interface adapter logic in a proper manner to execute those instructions not described.

The operation of the display EPU in the execution of "display clear" instruction (op-code 37) will be described. As can be seen in Table 6 op-code 37 is utilized to set all of the display characters on the display to blank; that is, to wipe out any information currently on the display, and to set a cursor to zero. The cursor is an electronic device in the display which is set to a given position to locate a position on the display for displaying data characters. In the particular display under discussion, when the cursor is set to zero it is considered to place the cursor to a home position which corresponds to the upper left-most corner of the display, the starting position for the cursor.

Figure 27:
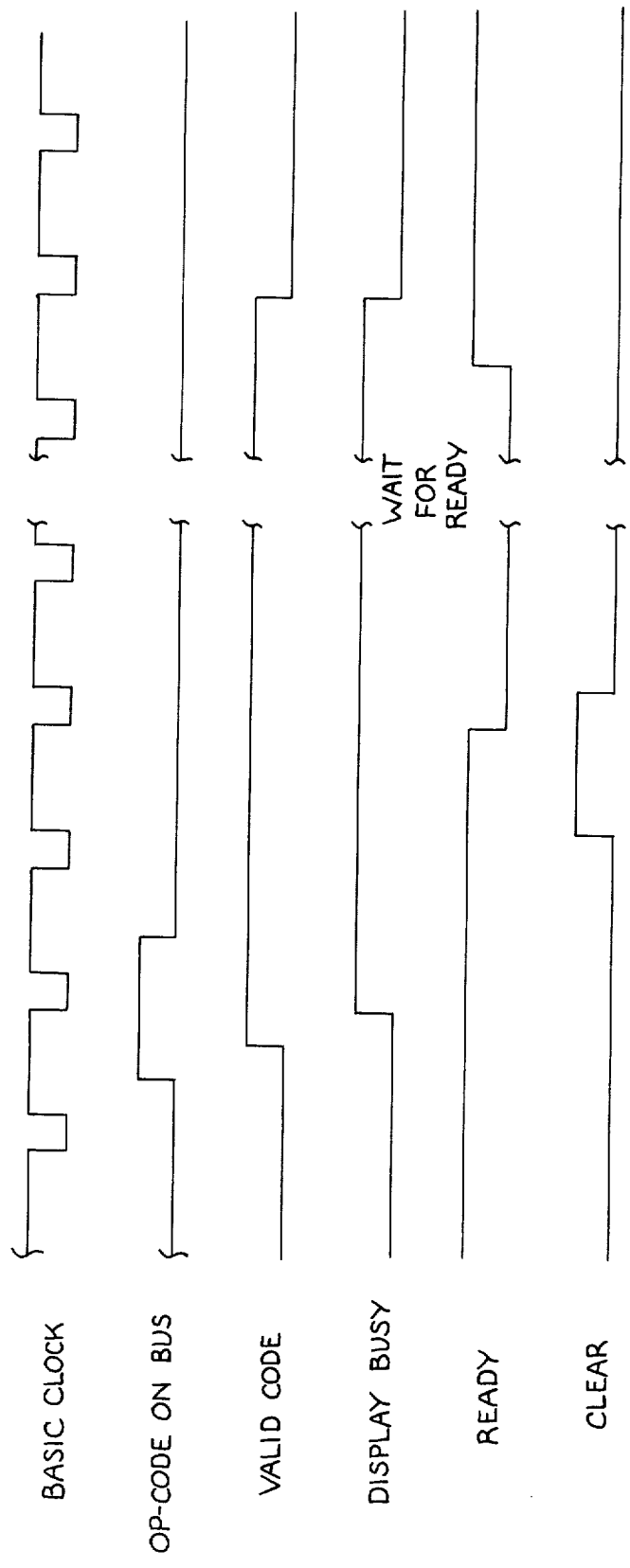
FIGS. 27 and 28 are timing diagrams useful in understanding the operation of the adapter unit of FIG. 26 and that unit's interface operation with a commercially available device shown as a display unit.

Refering now to FIGS. 26 and 27, let it be assumed that the interface adapter 256 is not busy. Thus, the display busy signal to the CPC is a binary 0 which enables the CPC to place op-code 37 on the CPC BUS for input to the op-code latch 260 and the data-in latch 262 of FIG. 26. With op-code 37 in the op-code latch, the valid code detector 264 generates a valid code output signal for input to the busy/timing generator 268. The timing relationships showing the basic system clock signal and the presence of the op-code on the bus and a generation of the valid code are shown in FIG. 27. As soon as the busy/timing generator receives the valid code signal, the interface adapter goes busy on the next basic clock signal. With the busy signal enabled, the busy signal now notifies the CPC that the display EPU is busy and cannot receive data at this time.

At the same time that the valid code detector 264 is decoding the op-code, the operation decoder 272 is being addressed at a location specified by the op-code. The contents of the location addressed by op-code 37 are read out presenting a specified bit configuration to the discrete signal generator 270. In this particular instance, a signal is provided via one of the 24 control conductors from the operation decoder 272 to the discrete control signal generator 270 designated, but not illustrated, as display clear. As can be seen in the timing diagram of FIG. 27 the interface adapter now goes into a wait state until a "Ready" signal from the display is presented to the discrete control signal generator 270. When the Ready signal is presented as a binary 1 to the discrete control signal generator, that generator generates a "Clear" output signal to the display unit. The combination of the Ready signal, the display "Busy Enable" signal and the Display Clear decode signal from the operation decoder applied to the discrete control signal generator effects the generation of the Clear signal to the display unit. As shown in FIG. 27, the display now drops the Ready signal and the adapter waits for the Ready signal to reappear as a logic 1 from the display unit before continuing. When the Ready signal is received by the discrete control signal generator 270 the busy signal is reset to a logic 0 on the next clock signal. This is accomplished as shown in FIG. 26 by a signal "DONE" on conductor 278 applied to the busy/timing generator 28 at the time of receipt of the Ready signal by the discrete control signal generator. The display EPU now waits for another op-code or begins the execution of an op-code which was placed on the CPC BUS while that unit was busy executing the clear op-code (op-code 37).

Figure 28:
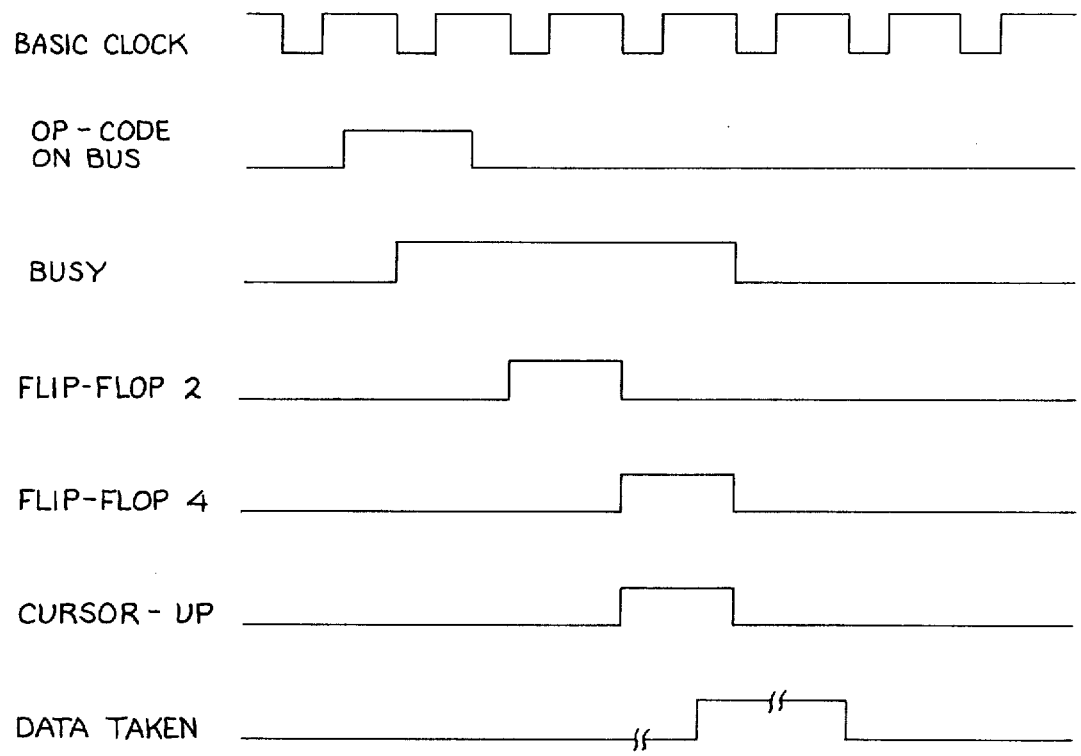

The operational timing for the execution of all of the other instructions listed in Table 6 by the display EPU is as shown in FIG. 28. FIG. 28 applies basically to all cursor and display type instructions. It should, however, be noted that the graph labeled "cursor-up" applies only to instructions for positioning the cursor and the graph labeled "Data Taken" applies only to display instructions.

The execution of a Cursor Up instruction (op-code 26) causes the interface adapter 256 to activate a cursor up control line from the discrete control signal generator of FIG. 26 to the display unit. In the display unit, this control signal causes the present cursor location to be decreased by 32 thus moving the position of the cursor up 32 points from its present position on the display. The initial part of this instruction execution by the display EPU is the same as previously described for the clear display instruction with the busy signal being generated after the valid code signal is enabled by the valid code detector. When the op-code from the op-code latch addresses a location in the operation code decoder 272, a decode word is read out of that decoder which contains a control bit that directs the discrete control signal generator 270 to generate the cursor up signal. As shown in FIG. 28 a flip-flop 2 (not shown) in the discrete control signal generator is set one clock period following the activation of a busy signal. It is the combination of the busy signal, the clock signal and the decode control signal from the operation decoder which causes flip-flop 2 to set. On the next clock, a flip-flop 4 (not shown) in the discrete control signal generator is set and flip-flop 2 is reset. When flip-flop 4 sets the cursor up signal is sent to the display causing the display to perform the specified function.

On the next clock signal, the busy signal and the Cursor-Up signal are both dropped to a logic 0, thus completing the execution of the instruction by the discrete control signal generator generating the DONE signal to the busy/timing generator. It should also be pointed out that in the timing diagram of FIG. 28 the Cursor-Up instruction and all similar type instructions do not require the monitoring of the Data Taken signal from the display unit by the discrete control signal generator. The Data Taken signal as generated by the display unit whenever that unit is instructed to write to the cursor (relocate the cursor an amount as specified by an address in the data-in latch) or if the display is commanded to write a display character on the display in accordance with data transferred to the display over the data-in lines from the data-in latch. The instructions which require the use of the Data Taken signal are listed in Table 6. As can be seen in FIG. 28 if a write cursor or a write display character instruction is executed by the display EPU, the timing is exactly as shown with the exception that the Data Taken signal is provided from the display unit to the discrete control signal generator of FIG. 26 after the display unit has received the data. The Data Taken signal is utilized by the discrete control signal generator to generate the DONE signal to the busy/timing generator which in turn generates a not busy signal on the first clock following the Data Taken signal. It should be pointed out, if the data taken ready signal rises at some time after flip-flop 4 has reset, that the busy signal will go to a logic 0 on the first clock signal following the Data Taken signal going to a logic 1. Thus, the busy signal can conceivably extend one clock period beyond its present position as shown in the timing diagram of FIG. 28.

Attached as Appendix E, is a computer print-out of instructions which have been incorporated into an operating system built in accordance with the present invention. This listing corresponds generally to the symbolic designations provided herein excepting that "MPC" corresponds to control section 12, "SSU" corresponds to the ANDU 76, and "DEM" corresponds to DMU 48.

In summary, it has been shown how the computer system architecture of the present invention makes it possible for a designer using building blocks to develop a computer system making maximum use of presently available and anticipated advances in medium and large scale integration circuits (MSI/LSI) to reduce the magnitude of computer software problems associated with present generation computer systems. In essence, the present invention allows a system design engineer to substitute additional amounts of a capital intensive quantity (MSI/LSI hardware) for large amounts of a labor intensive quantity (software) thereby providing more powerful data processing systems at reduced cost. A resultant data processor as disclosed by the illustrated embodiment allows a designer to design a system which is a biased programmable computer that uses a high level problem oriented machine language which bypasses many software steps by directly executing the instructions defined by the machine languages. The inventive system architecture permits one step or instruction to take the place of many steps or instructions which would have to be separately programmed on a general purpose digital computer to accomplish the same result. The system cost advantages afforded by the present invention reside in the architectural design which is more efficient than a standard micro-program computer in terms of the amount of read-only memory required for a given high level instruction such as a macro-instruction; thus, resulting in a machine language which can be made much more powerful for a given read-only memory cost.

While the principles of the invention have now been made clear in an illustrative embodiment, there will be immediately obvious to those skilled in the art many modifications of structure, arrangement, the elements, materials and components used in the practice of the invention and otherwise, which are particularly adapted for specific environments and operating requirements without departing from those principles. The appended claims are, therefore, intended to cover and embrace any such modifications within the limits only of the true spirit and scope of the invention.

APPENDIX A

| Component | Device Code | Quan. | Manufacturer | Function |
|---|---|---|---|---|
| OP CODE LATCH | 9314 | 2 | Fairchild | QUAD LATCH |
| OPERAND LATCH | 9314 | 6 | Fairchild | QUAD LATCH |
| PRESET ROM | 8223 | 2 | Signetics | 32 WORD X 8 BIT ROM |
| COUNTER | 9366 | 2 | Fairchild | 4 BIT BINARY COUNTER |
| SEQUENCE ROM | 8223 | 8 | Signetics | 32 WORD X 8 BIT ROM |
| SWITCH | 9322 | 2 | Fairchild | QUAD 2-INPUT MULTIPLEXER |
| BUFFER LATCH | 9314 | 2 | Fairchild | QUAD LATCH |
| TIMING & CONTROL & TPU DECODE LOGIC | 9314 | 1 | Fairchild | QUAD LATCH |
| | 9321 | 1/2 | Fairchild | DUAL 1-TO-4 DECODER |
| | 9366 | 1 | Fairchild | 4 BIT BINARY COUNTER |
| | 8828 | 2 1/2 | Signetics | DUAL D FLIP/FLOP |

APPENDIX A-continued

| Component | Device Code | Quan. | Manufacturer | Function |
|---|---|---|---|---|
| | 8815 | 1 | Signetics | DUAL 4 INPUT NOR |
| | 8870 | 2 2/3 | Signetics | TRIPLE 3 INPUT NAND |
| | 8880 | 5 1/4 | | QUAD 2 INPUT NAND |
| | 8885 | 3 1/4 | Signetics | QUAD 2 INPUT NOR |
| | 8H90 | 3 1/6 | Signetics | HEX INVERTER |

APPENDIX B

| FUNCTION | DEVICE | QUAN. | MANUFACTURER | DESCRIPTION |
|---|---|---|---|---|
| OP-CODE LATCH | 9314 | 2 | Fairchild | QUAD LATCH |
| R LATCH | 9314 | 1 | Fairchild | QUAD LATCH |
| Y LATCH | 9314 | 2 | Fairchild | QUAD LATCH |
| VALID CODE DETECTOR | 8880 | 3 | Signetics | QUAD, 2-INPUT NAND |
| ROM MICRO-CODE GENERATOR | 8223 | 4 | Signetics | 32 WORD X 8 BITS ROM |
| R-REGISTERS | 3101 | 2 | Intel | 16 WORD X 4 BITS RAM |
| A LATCH | 9314 | 1 | Fairchild | QUAD LATCH |
| B LATCH | 9314 | 1 | Fairchild | QUAD LATCH |
| ALU 1 | 8241 | 2 | Signetics | QUAD EXCLUSIVE OR |
| | 8880 | 2 | Signetics | QUAD 2-INPUT NAND |
| | 8870 | 1 1/3 | Signetics | TRIPLE 3-INPUT NAND |
| ALU 2 | 8241 | 2 | Signetics | QUAD EXCLUSIVE OR |
| | 8880 | 2 | Signetics | QUAD 2-INPUT NAND |
| | 8870 | 1 1/3 | Signetics | TRIPLE 3-INPUT NAND |
| BLU OUTPUT LATCH | 9314 | 2 | Fairchild | QUAD LATCH |
| T/C (1 BIT) | 8880 | 1 | Signetics | QUAD 2-INPUT NAND |
| | 8H90 | 2/6 | Signetics | HEX INVERTER |
| T/C FF | 7474 | 1 | TI | DUAL D-FLIP/FLOP |
| F LATCH | 8828 | 2 | Signetics | DUAL D FLIP/FLOP |
| | 8880 | 2 1/4 | Signetics | QUAD 2-INPUT NAND |
| BIT DECODE | 9321 | 1/2 | Fairchild | DUAL 1-OF-4 DECODER |
| CONTROL AND TIMING MULTIPLEXERS | 9309 | 6 | Fairchild | DUAL 4-INPUT MULTIPLEXER |
| | 9312 | 8 | Fairchild | EIGHT INPUT MULTIPLEXER |
| | 9366 | 1 | Fairchild | 4-BIT BINARY COUNTER |
| | 8H90 | 1 | Signetics | HEX INVERTER |
| | 8880 | 2 | Signetics | QUAD 2-INPUT NAND |
| | 8828 | 2 | Signetics | DUAL D FLIP/FLOP |
| | 8870 | 1 | Signetics | TRIPLE 3-INPUT NAND |

APPENDIX C

| | |
|---|---|
| 1) OP CODE LATCH | Two Fairchild Semiconductor type 9314 4 bit registers. |
| 2) BIT LATCH | One type 9314 device. |
| 3) PAGE LATCH | One type 9314 device. |
| 4) VECTOR ADDRESS LATCH | Two type 9314 devices. |
| 5) VALID CODE DETECTOR | Three Texas Instruments Corp. type SN7400 devices. |
| 6) ROM MICRO-CODE GENERATOR | One Signetics Corp. type 8223 programmable read only memory. |
| 7) TIMING AND CONTROL | Two Texas Instruments Corp. type SN74111 dual J-K flip-flop and two type SN7400 devices by the same manufacturer. |
| 8) BIT COUNTER | One Texas Instruments Corp. type SN74193 up-down binary counter. |
| 9) PAGE REGISTER | One Fairchild Semiconductor Corp. type 9314 4-bit register. |
| 10) ADDRESS COUNTER | Three Texas Instruments Corp. type SN74193 counters. |
| 11) VECTOR ADDRESS TRANSLATOR | Two Monolithic Memories Corp. type 6300 256 words by 4 bits programmable read only memories. |
| 12) INPUT DATA PSC | Two Fairchild Semiconductor Corp. type 9300 universal shift registers. |
| 13) PAGE COUNTER | One Texas Instruments Corp. type SN74193 counter. |
| 14) PAGE DECODE | One Fairchild Semiconductor Corp. type 9301 one-of-ten decoder. |
| 15) OUTPUT SPC | One Fairchild Semiconductor Corp. type 9334 eight bit demultiplexer with memory. |

APPENDIX D

| Device Code | Quantity | Manufacturer | Function |
|---|---|---|---|
| S8223 | 1 | Signetics, Corp. | Programmable Read Only Memory; |

APPENDIX D-continued

| Device Code | Quantity | Manufacturer | Function |
|---|---|---|---|
| | | | 32 words, 8 bits per word. |
| SN7400 | 4 | Texas Instruments | Four two-input NAND gates. |
| SN7402 | 3 | Texas Instruments | Four two-input NOR Gates. |
| SN7404 | 3 | Texas Instruments | Six INVERTER Gates. |
| SN7410 | 1 | Texas Instruments | Dual four-input NAND |
| SN7427 | 1 | Texas Instruments | Triple three-input NOR |
| SN7474 | 4 | Texas Instruments | Dual R-S type flip-flop. |
| 9300 | 1 | Fairchild | Universal shift-register. |
| 9314 | 6 | Fairchild | Four bit register. |
| 9322 | 2 | Fairchild | Four two-input multiplexer. |

The following is a list of vendor publications which document the circuits by device code number as listed in the specification and Appendices A, B, C and D.

The TTL Data Book For Design Engineers, published by Texas Instruments, Inc., Copyright 1973.

The Fairchild Semiconductor TTL Data Book, published June 1972.

Digital Designer's Choice Logic Specifications Handbook, Vol. 1, Logic Elements, COpyright 1971, by Signetics Corporation.

Digital 8000 Series TTL/MSI, Copyright 1972, by Signetics Corporation.

INTEL Data Catalog, published October 1973, by INTEL Corporation.

MMI 6300 — Monolithic Memories Inc. Specification Sheet, 1024 Bit Bipolar (256X4) Electrically Programmable Read Only Memory, Published September 1973.

MMI 5530 — Monolithic Memories Inc. Specification Sheet, 256 Bit Bipolar Random Access Memory, Published June 1973.

21-DSA-2377

APPENDIX E

```
INSTRUCTION FIELD SYMBOL DEFINITIONS
*********************************************************************
     OP      =  OPERATION CODE NUMBER IN OCTAL (001 THROUGH 377)
     C       =  LOWER 8 BITS OF FIRST INSTRUCTION PULL
     A       =  UPPER 8 BITS OF SECOND INSTRUCTION PULL
     B       =  LOWER 8 BITS OF SECOND INSTRUCTION PULL
     XXX     =  DON'T CARE FIELD (MAY BE ANYTHING)
     D       =  ADDRESS DISPLACEMENT FOR JUMPS,CALL SUBS, RETURNS
     I       =  INDEX VALUE FOR INDEX REGISTER LI
     M       =  PMU MEMORY ADDRESS
     U       =  IMMEDIATE OPERAND FOR COMPUTATIONS
     R       =  BLU REGISTER
     S       =  BLU REGISTER
     T       =  RICU T-REGISTER
     L       =  ABSOLUTE PROGRAM ADDRESS
     P       =  ABSOLUTE PAGE ADDRESS
     TV      =  TIME VALUE FOR RICU
     Y       =  DATA MEMORY VECTOR ADDRESS
     N       =  NUMBER OF BITS DESIGNATION OR BIT INDICATOR
    .AND.    =  LOGICAL AND OPERATION
    .OR.     =  LOGICAL OR OPERATION
    .EXOR.   =  LOGICAL EXOR OPERATION
     R(N)    =  BLU REGISTER, BIT N
     S(N)    =  BLU REGISTER, BIT N
INSTRUCTION DEFINITION SYMBOLOGY EXPLANATION
*********************************************************************
     U       =  MPC U REGISTER(16 BITS)
     PRU(A)  =  CONTENTS OF PROGRAM MEMORY LOCATION A
    .NE.     =  NOT EQUAL TO
    .GT.     =  GREATER THAN
    .LT.     =  LESS THAN
     LI      =  INDEX COUNTER (12 BITS)
     :       =  WORD CONCATENATION
     L(0)    =  PRESENT PROGRAM LOCATION
```

-continued

```
    L(I)   =  PROGRAM LOCATION FOR SUBROUTINE RETURN
    CPC    =  OUTPUT REGISTER OF THE CPC UNIT
    COND   =  ONE BIT REGISTER FOR CONDITIONAL JUMPS
    ACW    =  ALARM CONTROL WORD REGISTER
    IR     =  INSTRUCTION REGISTER
    (R)    =  CONTENTS OF R-REGISTER NUMBER R
    .BIP.  =  BOOLEAN INNER PRODUCT OPERATION
    .BDP.  =  BOOLEAN DUAL PRODUCT OPERATION
    MC     =  PRESENT MASTER CLOCK VALUE
    HIGH   =  UPPER BITS OF A WORD
    LOW    =  LOWER BITS OF A WORD
    IU     =  MAINTENANCE PANEL INPUT BUFFER
    RUN    =  PROGRAM RUN CONDITION
    CP     =  PMU PAGE REGISTER PAGE
    NOP    =  NO OPERATIONS PERFORMED BY THE INSTRUCTION
```

| OP  | C   | A   | B   | TYPE     | DEFINITION | UNIT |
|-----|-----|-----|-----|----------|------------|------|
| 377 | XXX |     |     | TRANSFER | U TO PMU(LI) | MPC |
| 376 | XXX |     |     | TRANSFER | PMU(LI) TO U | MPC |
| 375 | U   | L1  | L2  | JUMP     | IF LI.NE.L1:L2 THEN L(0) = L(0) +U,LI=LI+1 | MPC |
| 374 | XXX |     |     | TRANSFER | CPC TO U (WHEN CPC IS NOT BUSY) | MPC |
| 373 | XXX |     |     |          | ENABLE C,A,B REGISTER LOADING | MPC |
| 372 | XXX |     |     |          | DISABLE C,A,B REGISTER LOADING | MPC |
| 371 | XXX |     |     | RETURN   | IF COND=1 THEN L(0) = L(-1) | MPC |
| 370 | U   |     |     | RETURN   | L(0) = L(-1) + U | MPC |
| 367 | U   |     |     | RETURN   | L(0) = L(-1) - U | MPC |
| 366 | U   |     |     | RETURN   | IF COND=1 THEN L(0) = L(-1) - U | MPC |
| 365 | U   |     |     | RETURN   | IF COND=1 THEN L(0) = L(-1) + U | MPC |
| 364 | M   |     |     | TRANSFER | PMU(CP:M) TO ACW | MPC |
| 363 | C   | A   | B   | TRANSFER | C TO IR1, A:B TO IR2 AND LI | MPC |
| 362 | U   | U   | R   | JUMP     | IF U.GT.(R) THEN L(0) = L(0) - U | MPC |
| 361 | XXX |     |     | TRANSFER | ACW TO U | MPC |
| 360 | XXX |     |     | TRANSFER | U TO DATA KEYBOARD DISPLAY | MPC |
| 357 | U   | U   | R   | JUMP     | IF U.BIP.(R)=1 THEN L(0) = L(0) + U | MPC |
| 356 | U   | U   | R   | JUMP     | IF U.BDP.(R)=1 THEN L(0) = L(0) + U | MPC |
| 355 | U   | U   | R   | JUMP     | IF U=(R)(4BITS) THEN L(0) = L(0) + U | MPC |
| 354 | U   | XXX | F   | JUMP     | IF MC.LT.(I) THEN L(0) = L(0) + U | MPC |
| 353 | U   | U   | R   | CALL SUB | IF U=(R) THEN L(-1) = L(0), L(0) = L(0) + U | MPC |
| 352 | U   | U   | R   | CALL SUB | IF U=(R) THEN L(-1) = L(0), L(0) = L(0) - U | MPC |
| 351 | P   | L1  | L2  | TRANSFER | TAPE PAGE P TO PMU(LI) THROUGH PMU(L1:L2) | MPC |
| 350 | R   |     |     | TRANSFER | (R) TO U LOW | MPC |
| 347 | R   |     |     | TRANSFER | (R) TO U HIGH | MPC |
| 346 | R   |     |     | TRANSFER | U LOW TO (R) | MPC |
| 345 | R   |     |     | TRANSFER | U HIGH TO (R) | MPC |
| 344 | XXX | L1  | L2  | SET COND | IF LI.NE.L1:L2 THEN COND=1 | MPC |
| 343 | M   | XXX | R   | TRANSFER | (R) TO PMU(CP:M) HIGH | MPC |
| 342 | M   | XXX | R   | TRANSFER | (R) TO PMU(CP:M) LOW | MPC |
| 341 | U   | U   | R   | JUMP     | IF U=(R) THEN L(0) = L(0) + U | MPC |
| 340 | P   | L1  | L2  | TRANSFER | PMU(LI) THROUGH PMU(L1:L2) TO TAPE PAGE P | MPC |
| 337 | XXX |     |     |          | PUSHBUTTON LOAD; IB TO PMU( L(0) ), L(0) = L(0) + 1 | MPC |
| 336 | XXX |     |     |          | PUSHBUTTON EXECUTE; IB TO IR, EXECUTE IR | MPC |
| 335 | XXX |     |     |          | PUSHBUTTON ENTER; IB TO U | MPC |
| 334 | XXX |     |     |          | PUSHBUTTON STEP; PMU(L(0)) TO IR, EXECUTE IR,L(0)=L(0)+1 | MPC |
| 333 | XXX |     |     |          | PUSHBUTTON HALT; RUN=0 | MPC |
| 332 | XXX |     |     |          | PUSHBUTTON ADVANCE; L(0) = L(0) + 1 | MPC |
| 331 | XXX |     |     |          | PUSHBUTTON RUN; RUN=1 | MPC |
| 330 | XXX |     |     |          | PUSHBUTTON BOOTSTRAP; AUTO LOAD PMU FROM TAPE | MPC |
| 327 | XXX |     |     | TRANSFER | BLU TO U LOW | MPC |
| 326 | XXX |     |     | TRANSFER | BLU TO U HIGH | MPC |
| 325 | XXX |     |     | TRANSFER | RTCU TO U | MPC |
| 324 | XXX |     |     | INDEX    | INCREMENT LI; LI=LI + 1 | MPC |
| 323 | L   |     |     | TRANSFER | PMU(CP;L) TO U | MPC |
| 322 | XXX |     |     | TRANSFER | CP:L TO U | MPC |
| 321 | L   |     |     | TRANSFER | U TO PMU(CP;L) | MPC |
| 320 | XXX |     |     | TRANSFER | CPC TO U (IGNORE CPC BUSY) | MPC |
| 317 | L   |     |     | TRANSFER | BLU TO PMU(CP:L) LOW | MPC |
| 316 | L   |     |     | TRANSFER | BLU TO PMU(CP:L) HIGH | MPC |
| 315 | U   |     |     | JUMP     | L(0) = L(0) + U | MPC |
| 314 | U   |     |     | JUMP     | L(0) = L(0) - U | MPC |
| 313 | U1  | XXX | U2  | JUMP     | L(0) = L(0) + U2:U1 | MPC |
| 312 | M   |     |     | TRANSFER | L(0) TO PMU(M) | MPC |
| 311 |     |     |     | NOP      |            | MPC |
| 310 | L   | XXX | P   | JUMP     | L(0) = P:L | MPC |
| 307 | P   |     |     | SET PAGE | CP = P | MPC |
| 306 | L   | XXX | P   | CALL SUB | L(-1) =L(0), L(0)= L(0) + P:L | MPC |

-continued

| | | | | | | |
|---|---|---|---|---|---|---|
| 305 | D | | | CALL SUB | L(-1) =L(0), L(0)= L(0) + D | MPC |
| 304 | XXX | | | RETURN | L(0) = L(-1) | MPC |
| 303 | XXX | | | NOP | | MPC |
| 302 | XXX | | | NOP | | MPC |
| 301 | XXX | | | NOP | | MPC |
| 300 | L | XXX | P | CALL SUB | L(-1) = L(0), L(0) = P:L | MPC |
| 277 | U | Y | R | LOGICAL | U.AND.(Y) TO R | MIC |
| 276 | R1 | Y | R2 | LOGICAL | (R1).AND.(Y) TO (R2) | MIC |
| 275 | U | Y | R | LOGICAL | U.OR.(Y) TO R | MIC |
| 274 | R1 | Y | R2 | LOGICAL | (R1).OR.(Y) TO (R2) | MIC |
| 273 | U | Y | R | LOGICAL | U.EXOR.(Y) TO R | MIC |
| 272 | R1 | Y | R2 | LOGICAL | (R1).EXOR.(Y)TO (R2) | MIC |
| 271 | U | Y | N:R | LOGICAL | U.BIP.(Y) TO R(N) | MIC |
| 270 | R1 | Y | N:R2 | LOGICAL | (R1).BIP.(Y) TO R2(N) | MIC |
| 267 | U | Y | N:R | LOGICAL | U.BDP.(Y) TO R(N) | MIC |
| 266 | R1 | Y | N:R2 | LOGICAL | (R1).BDP.(Y) TO R2(N) | MIC |
| 265 | U | Y | N:R | LOGICAL | U= (Y) TO R(N) (4 BIT COMPARE) | MIC |
| 264 | R1 | Y | N:R2 | LOGICAL | (R1)= (Y) TO R2(N) (4 BIT COMPARE) | MIC |
| 263 | | | | SPARE | | MIC |
| 262 | | | | SPARE | | MIC |
| 261 | | | | SPARE | | MIC |
| 260 | | | | SPARE | | MIC |
| 257 | | | | SPARE | | MIC |
| 256 | R | Y | N-1 | TRANSFER | (Y) TO (R), N BITS | MIC |
| 255 | | | | SPARE | | MIC |
| 254 | R | Y | N-1 | TRANSFER | (R) TO (Y), N BITS | MIC |
| 253 | | | | SPARE | | MIC |
| 252 | | | | SPARE | | MIC |
| 251 | | | | SPARE | | MIC |
| 250 | | | | SPARE | | MIC |
| 247 | | | | SPARE | | |
| : | | | | : | | |
| : | | | | : | | |
| 240 | | | | SPARE | | |
| 237 | U | R1 | R2 | LOGICAL | U.AND.(R1) TO (R2) | EPIC |
| 236 | R1 | R2 | R3 | LOGICAL | (R1).AND.(R2) TO (R3) | EPIC |
| 235 | U | R1 | R2 | LOGICAL | U.OR.(R1) TO (R2) | EPIC |
| 234 | R1 | R2 | R3 | LOGICAL | (R1).OR.(R2) TO (R3) | EPIC |
| 233 | U | R1 | R2 | LOGICAL | U.EXOR.(R1) TO (R2) | EPIC |
| 232 | R1 | R2 | R3 | LOGICAL | (R1).EXOR.(R2) TO (R3) | EPIC |
| 231 | U | R1 | N:R2 | LOGICAL | U.BIP.(R1) TO R2(N) | EPIC |
| 230 | R1 | R2 | N:R3 | LOGICAL | (R1).BIP.(R2) TO R3(N) | EPIC |
| 227 | U | R1 | N:R2 | LOGICAL | U.BDP.(R1) TO R2(N) | EPIC |
| 226 | R1 | R2 | N:R3 | LOGICAL | (R1).BDP.(R2) TO R3(N) | EPIC |
| 225 | U | R1 | N:R2 | LOGICAL | U=(R1) TO R2(N) (4 BIT COMPARE) | EPIC |
| 224 | R1 | R2 | N:R3 | LOGICAL | (R1)=(R2) TO R3(N) (4 BIT COMPARE) | EPIC |
| 223 | XXX | U | R | LOGICAL | IF U.BIP.R = 1, SET CONDITION | EPIC |
| 222 | XXX | U | R | LOGICAL | IF U.BDP.R = 1, SET CONDITION | EPIC |
| 221 | XXX | U | R | LOGICAL | IF U.EQ.R = 1, SET CONDITION | EPIC |
| 220 | XXX | XXX | I | LOGICAL | IF MC.LT.I, SET CONDITION | EPIC |
| 217 | R | A | XXX | TRANSFER | A TO R | EPIC |
| 216 | R | XXX | R(A) | TRANSFER | R(A) TO R | EPIC |
| 215 | R2 | U | R1 | ARITH | (R1)+U TO (R2) | EPIC |
| 214 | R2 | U | R1 | ARITH | (R1)-U TO (R2) | EPIC |
| 213 | R2 | XXX | R1 | LOGICAL | (R1) SHIFTED 1 BIT LEFT TO (R2),END AROUND | EPIC |
| 212 | R2 | XXX | R1 | LOGICAL | (R1) SHIFTED 4 BITS RIGHT TO (R2) E.A. | EPIC |
| 211 | R2 | XXX | R1 | TRANSFER | (R1) TO (R2) | EPIC |
| 210 | I | A | B | TRANSFER | (A):(B) TO I | EPIC |
| 207 | I2 | XXX | I1 | TRANSFER | (I1)+ MC TO (I2) | EPIC |
| 206 | I | XXX | N:R | LOGICAL | IF MC.GT.(I), SET R(N) = 1 | EPIC |
| 205 | XXX | U | R | LOGICAL | IF U.EQ.(R), SET CONDITION | EPIC |
| 204 | R2 | XXX | R1 | TRANSFER | (R1) SHIFTED 1 BIT RIGHT TO (R2) E.A. | EPIC |
| 203 | XXX | U | R | LOGICAL | IF U.GT.(R), SET CONDITION | EPIC |
| 202 | | | | SPARE | | EPIC |
| 201 | | | | SPARE | | EPIC |
| 200 | XXX | XXX | R | TRANSFER | DEM TO R | EPIC |
| 177 | U | XXX | R | LOGICAL | U.AND.DEM TO R | EPIC |
| 176 | R1 | XXX | R2 | LOGICAL | (R1).AND.DEM TO (R2) | EPIC |
| 175 | U | XXX | R | LOGICAL | U.OR.DEM TO R | EPIC |
| 174 | R1 | XXX | R2 | LOGICAL | (R1).OR.DEM TO (R2) | EPIC |
| 173 | U | XXX | R | LOGICAL | U.EXOR.DEM TO R | EPIC |
| 172 | R1 | XXX | R2 | LOGICAL | (R1).EXOR.DEM TO (R2) | EPIC |
| 171 | U | XXX | N:R | LOGICAL | U.BIP.DEM TO R | EPIC |
| 170 | R1 | XXX | N:R2 | LOGICAL | (R1).BIP.DEM TO (R2) | EPIC |
| 167 | U | XXX | N:R | LOGICAL | U.BDP.DEM TO R(N) | EPIC |
| 166 | R1 | XXX | N:R2 | LOGICAL | (R1).BDP.DEM TO (R2) | EPIC |

-continued

| | | | | | |
|---|---|---|---|---|---|
| 165 | U | XXX | N:R | LOGICAL | U.EQ.DEM TO R(N) | EPIC |
| 164 | R1 | XXX | N:R2 | LOGICAL | (R1)= DEM TO R2(N) | EPIC |
| 163 | | | | SPARE | | EPIC |
| 162 | | | | SPARE | | EPIC |
| 161 | XXX | XXX | R | TRANSFER | (R) TO DLU | EPIC |
| 160 | | | | SPARE | | EPIC |
| 157 | U | | | TRANSFER | DISPLAY TO TAPE PAGE U | CPC |
| 156 | U | | | TRANSFER | SET UP TAPE WRITE ON PAGE U | CPC |
| 155 | U | | | TRANSFER | SET UP TAPE READ ON PAGE U | CPC |
| 154 | U | | | TRANSFER | U TO DISPLAY CURSOR LOCATION | CPC |
| 153 | U | | | TRANSFER | U TO DISPLAY | CPC |
| 152 | U | | | TRANSFER | TAPE PAGE U TO DISPLAY | CPC |
| 151 | U | | | TRANSFER | MESSAGE U TO DISPLAY | CPC |
| 150 | UP | | | TRANSFER | UP EXECUTED BY DISPLAY PROCESSOR | CPC |
| 150 | 363 | | | EDIT | RIGHT SHIFT DISPLAY | CPC |
| 150 | 362 | | | EDIT | LEFT SHIFT DISPLAY | CPC |
| 150 | 361 | | | EDIT | ROLL DOWN DISPLAY | CPC |
| 150 | 360 | | | EDIT | ROLL UP DISPLAY | CPC |
| 150 | 347 | | | TRANSFER | TCU-STATUS TO CPC | CPC |
| 150 | 346 | | | TRANSFER | U TO TAPE, WRITE 2 WORDS | CPC |
| 150 | 345 | | | TRANSFER | TAPE TO CPC, READ 2 TAPE WORDS | CPC |
| 150 | 333 | | | MAINT | CPC TAPE ALARM MAINTENANCE CODE | CPC |
| 150 | 332 | | | RESET | TAPE ALARM | CPC |
| 150 | 331 | | | MAINT | SC NOT ZERO MAINTENANCE CODE | CPC |
| 150 | 330 | | | MAINT | SC EQUALS ZERO MAINTENANCE CODE | CPC |
| 150 | 321 | | | SET | TAPE ACCESS TO HIGH END OF TAPE | CPC |
| 150 | 320 | | | SET | TAPE ACCESS TO LOW END OF TAPE | CPC |
| 150 | 317 | | | TRANSFER | LAST TAPE PAGE TO CBU | CPC |
| 150 | 316 | | | TRANSFER | CURRENT TAPE PAGE TO CBU | CPC |
| 150 | 315 | | | TRANSFER | NEXT TAPE PAGE TO CBU | CPC |
| 150 | 314 | | | TRANSFER | INTERCHANGE CBU AND DISPLAY | CPC |
| 150 | 313 | | | TRANSFER | CBU TO DISPLAY | CPC |
| 150 | 312 | | | TRANSFER | DISPLAY TO CBU | CPC |
| 150 | 311 | | | TRANSFER | LAST TAPE PAGE TO DISPLAY | CPC |
| 150 | 310 | | | TRANSFER | NEXT TAPE PAGE TO DISPLAY | CPC |
| 150 | 257 | | | TRANSFER | DLU TO TAPE DESIRED ADDRESS REGISTER | TCU |
| 150 | 256 | | | INITIATE | TCU READ ADDRESS | TCU |
| 150 | 255 | | | RESET | TCU TAPE ALARM | TCU |
| 150 | 254 | | | STOP | TCU TAPE DATA WRITE | TCU |
| 150 | 253 | | | INITIATE | TAPE DATA WRITE | TCU |
| 150 | 252 | | | TRANSFER | TAPE STATUS/ALARM WORD TO DLU | TCU |
| 150 | 251 | | | SET | TAPE ACCESS TO HIGH OR LOW USING DLU(0) | TCU |
| 150 | 250 | | | ACCESS | LAST TCU PAGE | TCU |
| 150 | 247 | | | ACCESS | NEXT TCU PAGE | TCU |
| 150 | 246 | | | ACCESS | REWIND TO TAPE HOME POSITION | TCU |
| 150 | 245 | | | STOP | TAPE DATA READ | TCU |
| 150 | 244 | | | TRANSFER | DLU TO TAPE, WRITE ONE WORD | TCU |
| 150 | 243 | | | TRANSFER | TAPE TO DLU, READ ONE CHARACTER | TCU |
| 150 | 242 | | | INITIATE | TAPE READ | TCU |
| 150 | 241 | | | ACCESS | PRESENT DESIRED TAPE ADDRESS | TCU |
| 150 | 240 | | | TRANSFER | DLU TO TCU PAGE ADDRESS | TCU |
| 150 | 237 | | | TRANSFER | LOAD TIU OUTPUT REGISTER | TIU |
| 150 | 236 | | | SET UP | ADDRESS COMPARE.GT. 24 | TIU |
| 150 | 235 | | | SET UP | ADDRESS COMPARE.GT. -24 | TIU |
| 150 | 234 | | | SET UP | ADDRESS COMPARE.GT. 0 | TIU |
| 150 | 233 | | | SET UP | ADDRESS COMPARE= 0 | TIU |
| 150 | 232 | | | SET UP | ADDRESS COMPARE NOT EQUAL TO -1 | TIU |
| 150 | 231 | | | SET UP | TIU LOOP COUNTER TO 11 | TIU |
| 150 | 230 | | | SET UP | TIU LOOP COUNTER TO 34 | TIU |
| 150 | 227 | | | SET UP | ADDRESS COMPARE= -2,DOWN ADDRESS COUNTER | TIU |
| 150 | 226 | | | SET UP | ADDRESS COMPARE TO-12,UP COUNTER | TIU |
| 150 | 225 | | | DECREMENT | DESIRED ADDRESS COUNTER | TIU |
| 150 | 224 | | | INCREMENT | DESIRED ADDRESS COUNTER | TIU |
| 150 | 223 | | | LOAD | PRESENT ADDRESS COUNTER LOW | TIU |
| 150 | 222 | | | LOAD | PRESENT ADDRESS COUNTER HI | TIU |
| 150 | 221 | | | TRANSFER | DLU TO DESIRED ADDRESS COUNTER | TIU |
| 150 | 220 | | | WAIT | FOR TAPE UNIT REPLY FLAG | TIU |
| 150 | 217 | | | READ | TAPE UNIT STATUS | TIU |
| 150 | 216 | | | SET UP | HI/LOW END OF TAPE | TIU |
| 150 | 215 | | | WRITE | TAPE LEADER | TIU |
| 150 | 214 | | | WRITE | TAPE SYNC PULSE | TIU |
| 150 | 213 | | | WRITE | TAPE DATA | TIU |
| 150 | 212 | | | READ | TAPE UNIT DATA | TIU |
| 150 | 211 | | | ACCESS | FORWARD TO LOAD POINT | TIU |
| 150 | 210 | | | SET UP | TAPE UNIT FAST REVERSE MOTION | TIU |
| 150 | 207 | | | SET UP | TAPE UNIT SLOW REVERSE MOTION | TIU |

-continued

| | | | | | | |
|---|---|---|---|---|---|---|
| 150 | 206 | | | SET UP | TAPE UNIT FAST FORWARD MOTION | TIU |
| 150 | 205 | | | SET UP | TAPE UNIT B-TRACK WRITE | TIU |
| 150 | 204 | | | SET UP | TAPE UNIT B-TRACK READ | TIU |
| 150 | 203 | | | SET UP | TAPE UNIT A TRACK READ | TIU |
| 150 | 202 | | | SET UP | REVERSE TAPE MOTION TO LOAD POINT | TIU |
| 150 | 201 | | | STOP | TAPE MOTION, RETRACT HEADS | TIU |
| 150 | 200 | | | NOP | | TIU |
| 150 | 127 | | | LINK | CPC-C FIELD (MPC-C BUFFER) | DLU |
| 150 | 126 | | | LINK | CPC-D HIGH DATA (MPC-D HIGH BUFFER) | DLU |
| 150 | 125 | | | LINK | SSU | DLU |
| 150 | 124 | | | LINK | TIU | DLU |
| 150 | 123 | | | LINK | CBU | DLU |
| 150 | 122 | | | LINK | CPC-D LOW DATA (MPC-D LOW BUFFER) | DLU |
| 150 | 121 | | | LINK | KBD | DLU |
| 150 | 120 | | | LINK | MAINTENANCE PANEL DATA INPUT | DLU |
| 150 | 117 | | | TRANSFER | DLU TO SC HIGH | DLU |
| 150 | 116 | | | DECREMENT | SC | DLU |
| 150 | 115 | | | INCREMENT | SC | DLU |
| 150 | 114 | | | TRANSFER | DLU TO SC LOW | DLU |
| 150 | 113 | | | RESET | SC | DLU |
| 150 | 112 | | | SET UP | FOR LONG STRING TRANSFER | DLU |
| 150 | 111 | | | SET UP | FOR SHORT(LT.256) STRING TRANSFER | DLU |
| 150 | 110 | | | NOP | | DLU |
| 150 | 070 | | | SET | CBU ADDRESS TO 001 | CBU |
| 150 | 067 | | | SET | CBU ADDRESS TO 377 | CBU |
| 150 | 066 | | | TRANSFER | DLU TO CBU ADDRESS,THEN INCREMENT | CBU |
| 150 | 065 | | | TRANSFER | DLU TO CBU ADDRESS,THEN DECREMENT | CBU |
| 150 | 063 | | | TRANSFER | DLU TO CBU ADDRESS,WRITE ADDRESS | CBU |
| 150 | 061 | | | TRANSFER | DLU TO CBU ADDRESS,READ RAM | CBU |
| 150 | 060 | | | TRANSFER | DLU TO CBU ADDRESS,READ ROM | CBU |
| 150 | 057 | | | TRANSFER | DLU TO RAM LOCATION 000 | CBU |
| 150 | 056 | | | TRANSFER | CBU-ROM(000) TO DLU | CBU |
| 150 | 055 | | | TRANSFER | CBU-RAM(000) TO DLU | CBU |
| 150 | 054 | | | SET | CBU ADDRESS TO 000 | CBU |
| 150 | 053 | | | TRANSFER | DLU TO RAM, BACKSPACE | CBU |
| 150 | 050 | | | INCREMENT | CBU ADDRESS | CBU |
| 150 | 047 | | | TRANSFER | DLU TO RAM, ADVANCE | CBU |
| 150 | 045 | | | TRANSFER | CBU RAM TO DLU | CBU |
| 150 | 044 | | | INCREMENT | CBU ADDRESS | CBU |
| 150 | 043 | | | TRANSFER | DLU TO CBU-RAM | CBU |
| 150 | 042 | | | TRANSFER | CBU ROM TO DLU | CBU |
| 150 | 041 | | | TRANSFER | CBU RAM TO DLU | CBU |
| 150 | 040 | | | NOP | | CBU |
| 150 | 037 | | | CLEAR | DISPLAY | SSU |
| 150 | 036 | | | CURSOR | CARRIAGE RETURN | SSU |
| 150 | 035 | | | CURSOR | BLINK OFF | SSU |
| 150 | 034 | | | CURSOR | BLINK ON | SSU |
| 150 | 033 | | | CURSOR | VISUAL OFF | SSU |
| 150 | 032 | | | CURSOR | VISUAL ON | SSU |
| 150 | 031 | | | CURSOR | RIGHT (SKIP) | SSU |
| 150 | 030 | | | CURSOR | LEFT (BACKSPACE) | SSU |
| 150 | 027 | | | CURSOR | DOWN (LINE FEED) | SSU |
| 150 | 026 | | | CURSOR | UP | SSU |
| 150 | 025 | | | TRANSFER | DISPLAY TO DLU | SSU |
| 150 | 024 | | | TRANSFER | DLU TO DISPLAY | SSU |
| 150 | 023 | | | TRANSFER | DISPLAY CURSOR LOCATION TO DLU | SSU |
| 150 | 022 | | | TRANSFER | DLU TO DISPLAY CURSOR | SSU |
| 150 | 021 | | | CURSOR | HOME | SSU |
| 150 | 020 | | | NOP | | SSU |
| 147 | | | | SPARE | | DMC |
| : | | | | : | | DMC |
| : | | | | : | | DMC |
| 125 | | | | SPARE | | DMC |
| 124 | XXX | Y | N-1 | TRANSFER | D LOW TO (Y), N BITS | DMC |
| 123 | XXX | Y | N-1 | TRANSFER | D HIGH TO (Y), N BITS | DMC |
| 122 | XXX | Y | N-1 | TRANSFER | DLU TO (Y), N BITS | DMC |
| 121 | XXX | Y | XXX | TRANSFER | (Y) TO DEM, 4 BITS | DMC |
| 120 | XXX | Y | N-1 | TRANSFER | (Y) TO DEM, N BITS | DMC |
| 117 | | | | SPARE | | DEM |
| : | | | | : | | DEM |
| : | | | | : | | DEM |
| 114 | | | | SPARE | | DEM |
| 113 | XXX | | | TRANSFER | CLEAR VDEM | DEM |
| 112 | XXX | Y | N-1 | TRANSFER | WRITE, N BITS | DEM |
| 111 | XXX | Y | N-1 | TRANSFER | READ, N BITS | DEM |

| | | | | | |
|---|---|---|---|---|---|
| 10 | XXX | Y | N-1 | CONTROL | ACKNOWLEDGE U-DATA RECEIVED | UEM |
| 07 | XXX | Y | N-1 | SET UP | BLU TO (Y) FOR N BIT TRANSFER | UEM |
| 06 | XXX | Y | N-1 | SET UP | IOU TO (Y) FOR N BIT TRANSFER | UEM |
| 05 | XXX | Y | N-1 | SET UP | U LOW TO (Y) FOR N BIT TRANSFER | UEM |
| 04 | XXX | Y | N-1 | SET UP | U HIGH TO (Y) FOR N BIT TRANSFER | UEM |
| 03 | XXX | Y | XXX | SET UP | (Y) TO UEM, 4 BITS | UEM |
| 02 | XXX | Y | N-1 | SET UP | (Y) TO UEM, N BITS | UEM |
| 01 | P | | | TRANSFER | P TO UEM DATA MEMORY PAGE REGISTER | UEM |
| 00 | XXX | | | NOP | | UEM |
| 77 | XXX | | | SPARE | | BLU |
| 76 | XXX | | | LOGICAL | SET 8 BIT A.GT.(R) CONDITION | BLU |
| 75 | XXX | | | LOGICAL | ROTATE RIGHT 1 BIT | BLU |
| 74 | XXX | | | LOGICAL | SET 8 BIT A.EQ.(R) CONDITION | BLU |
| 73 | R | | | LOGICAL | (R) TO BLU, SUBTRACT | BLU |
| 72 | R | | | TRANSFER | UEM TO R | BLU |
| 71 | XXX | | | TRANSFER | BLU DATA ACKNOWLEDGE | BLU |
| 70 | XXX | | | LOGICAL | ROTATE LEFT 1 BIT | BLU |
| 67 | R | | | TRANSFER | (R) TO BLU SHIFT REGISTER | BLU |
| 66 | R | | | LOGICAL | (R) TO BLU, ADD | BLU |
| 65 | XXX | | | LOGICAL | SET 4-BIT BLU CONDITION | BLU |
| 64 | XXX | | | LOGICAL | SET UP BLU LOGIC UNITS TO EXOR/OR | BLU |
| 63 | XXX | | | LOGICAL | SET UP BLU LOGIC UNITS TO OR/AND | BLU |
| 62 | XXX | | | LOGICAL | SET UP BLU LOGIC UNITS TO AND/OR | BLU |
| 61 | N | | | TRANSFER | RTC CONDITION TO BLU FUNCTION LATCH, BIT N | BLU |
| 60 | N | | | TRANSFER | BLU LOGIC UNIT 2 TO FUNCTION LATCH, BIT N | BLU |
| 57 | R | | | TRANSFER | (R) TO BLU FUNCTION LATCH | BLU |
| 56 | XXX | | | LOGICAL | RESET BLU FUNCTION LATCH | BLU |
| 55 | R | | | TRANSFER | (R) TO BLU LOGIC UNIT INPUT B | BLU |
| 54 | U | | | TRANSFER | U TO BLU LOGIC UNIT INPUT B | BLU |
| 53 | R | | | TRANSFER | (R) TO BLU LOGIC UNIT INPUT A | BLU |
| 52 | XXX | | | TRANSFER | TO BLU LOGIC UNIT INPUT A | BLU |
| 51 | R | | | TRANSFER | BLU SHIFT REGISTER TO R | BLU |
| 50 | R | | | TRANSFER | BLU ADDER TO R | BLU |
| 47 | R | | | TRANSFER | | BLU |
| 46 | R | | | TRANSFER | UEM TO R | BLU |
| 45 | R | | | TRANSFER | U HIGH TO R, ACKNOWLEDGE DATA | BLU |
| 44 | R | | | TRANSFER | U LOW TO R, ACKNOWLEDGE DATA | BLU |
| 43 | R | | | TRANSFER | BLU LOGIC UNIT INPUT A TO R | BLU |
| 42 | R | | | TRANSFER | BLU LOGIC UNIT 1 TO R | BLU |
| 41 | R | | | TRANSFER | BLU FUNCTION LATCH TO R | BLU |
| 40 | XXX | | | NOP | | BLU |
| 37 | | | | SPARE | | |
| : | | | | : | | |
| 27 | | | | SPARE | | RTC |
| 26 | | | | SPARE | | RTC |
| 25 | XXX | | | TRANSFER | RESET RTC MASTER CLOCK TO ZERO | RTC |
| 24 | XXX | | | TRANSFER | RTC DATA ACKNOWLEDGE | RTC |
| 23 | I | | | LOGICAL | SET RTC MC .GT. (T) CONDITION FOR BLU | RTC |
| 22 | I | | | LOGICAL | RESET RTC FLAG FOR REGISTER I | RTC |
| 21 | I | | | LOGICAL | SET RTC FLAG FOR REGISTER I | RTC |
| 20 | XXX | | | TRANSFER | MASTER CLOCK LATCH TO RTC OUTPUT | RTC |
| 17 | | | | SPARE | | RTC |
| 16 | I | | | TRANSFER | (T) TO RTC OUTPUT | RTC |
| 15 | XXX | | | LOGICAL | STOP RTC MASTER CLOCK | RTC |
| 14 | | | | SPARE | | RTC |
| 13 | XXX | | | LOGICAL | START RTC MASTER CLOCK | RTC |
| 12 | | | | SPARE | | RTC |
| 11 | | | | SPARE | | RTC |
| 10 | | | | SPARE | | RTC |
| 7 | I | | | TRANSFER | (T) TO RTC MASTER CLOCK | RTC |
| 6 | U | | | TRANSFER | U TO RTC PAGE REGISTER | RTC |
| 5 | I | | | LOGICAL | SET RTC MASTER CLOCK .LT. A:B CONDITION | RTC |
| 4 | XXX | | | TRANSFER | RTC MASTER CLOCK TO MASTER CLOCK LATCH | RTC |
| 3 | I | | | LOGICAL | SUM OF (I), RTC MC TO RTC ADDER LATCH | RTC |
| 2 | I | | | TRANSFER | RTC ADDER LATCH TO T | RTC |
| 1 | I | | | TRANSFER | A:B TO T | RTC |
| 0 | | | | SPARE | | RTC |

What is claimed is:

1. A data processing system based upon a pyramidal ierarchy of at least three levels having a bus interfacing adjacent levels thereof, comprising:

A. a first, highest level including, 1. a store containing a plurality of addressable locations each capable of retaining an instruction word containing an operation code portion defining an operation to be performed, and 2. a sequence controller for addressing said store to selectively retrieve instruction words therefrom and for placing said words on the bus interfacing the first and second levels;

B. second and third respectively lower levels each including a plurality of processing units connected in parallel to the bus interfacing the respective level to the next higher level,
1. each of said processing units containing recognition means responsive to the operation code portion of the instruction word on the bus interfacing it with the next higher level to accept only those words containing designated operation code portions,
2. each of said processing units being of a one of two types, an execution processing unit or a translator processing unit,
3. each of said second and third levels capable of including execution processing units and translator processing units and each having at least one translator processing unit,
   a. each of said execution processing units responsive to an instruction word recognized thereby to perform the operation specified by that instruction word, and
   b. each of said translator processing units including means to distinguish between first and second types of instruction words recognized thereby comprising,
      i. means responsive to the first of the two types of instruction words for transmitting that instruction word to the next lower interface bus without modification, and
      ii. means responsive to the second of the two types of instruction words for initiating an operation by an associated execution processing unit in accordance with a stored group of additional instruction words, including means to address a store means containing said additional instruction words; and C. addressable store means associated with each of said translator processing units for storing said additional instruction words.

2. The invention in accordance with claim 1 wherein said addressable store means comprises a read-only memory.

3. The invention in accordance with claim 1 wherein the data processing system includes at least four levels with the lowest level comprised of all execution processing units.

4. The invention in accordance with claim 1 wherein the recognition means contained within the processing units includes a decoding means.

5. The invention in accordance with claim 1 wherein said second level includes at least two translator processing units each forming the beginning of a major leg of said hierarchy.

6. The invention in accordance with claim 5 wherein each of said legs terminates with one or more execution processing units.

7. The invention in accordance with claim 1 wherein:
A. each of the processing units includes means to provide a status signal indicative of its ability to accept an instruction word to the translator processing unit or sequence controller from which it receives instruction words; and
B. each of the translator processing units and sequence controller contains,
   1. means to receive the status signals from those processing units of the next lower level to which it is connected and to use as an indication signal the state of that status signal,
   2. means to interrogate the operation code portion of a retrieved instruction word to determine which next lower level processing unit will receive that instruction word,
   3. means responsive to the determination of the interrogation and to the appropriate status signal to determine the time of changing the instruction word available on the next lower bus.

8. The invention in accordance with claim 7 wherein the means responsive to the determination of the interrogation and to the appropriate status signal responds to a prescribed change in the state of the status signal to effect the change in the instruction word on the next lower bus.

9. The invention in accordance with claim 8 wherein the prescribed change is one from an indication that the lower processing unit is not busy to one indicating that the unit is busy.

10. A data processing system based upon a pyramidal hierarchy of at least three levels having a bus interfacing adjacent levels thereof, comprising:
A. a first, highest level including,
   1. a store containing a plurality of addressable locations each capable of retaining an instruction word containing an operation code portion defining an operation to be performed, and
   2. a sequence controller for addressing said store to selectively retrieve instruction words therefrom and for placing said words on the bus interfacing the first and second levels;
B. second and third respectively lower levels each including a plurality of processing units connected in parallel to the bus interfacing the respective level to the next higher level,
   1. each of said processing units containing recognition means responsive to the operation code portion of the instruction word on the bus interfacing it with the next higher level to accept only those words containing designated operation code portions,
   2. each of said processing units being of a one of two types, an execution processing unit or a translator processing unit, to thereby initiate an operation specified by said retrieved additional instruction words.

11. The invention in accordance with claim 10 wherein said addressable store means comprises a read-only memory.

12. The invention in accordance with claim 10 wherein the data processing system includes at least four levels with the lowest level comprised of all execution processing units.

13. The invention in accordance with claim 10 wherein the recognition means contained within the processing units includes a decoding means.

14. The invention in accordance with claim 10 wherein said second level includes at least two translator processing units each forming the beginning of a major leg of said hierarchy.

15. The invention in accordance with claim 14 wherein each of said legs terminates with one or more execution processing units.

16. The invention in accordance with claim 10 wherein:
A. each of the processing units includes means to provide a status signal indicative of its ability to accept an instruction word to the translator processing unit or sequence controller from which it receives instruction words; and
B. each of the translator processing units and sequence controller contains,
1. means to receive the status signals from those processing units of the next lower level to which it is connected and to use as an indication signal the state of that status signal,
2. means to interrogate the operation code portion of a retrieved instruction word to determine which next lower level processing unit will receive that instruction word,
3. means responsive to the determination of the interrogation and to the appropriate status signal to determine the time of changing the instruction word available on the next lower bus.

17. The invention in accordance with claim 16 wherein the means responsive to the determination of the interrogation and to the appropriate status signal responds to a prescribed change in the state of the status signal to effect the change in the instruction word on the next lower bus.

18. The invention in accordance with claim 17 wherein the prescribed change is one from an indication that the lower processing unit is not busy to one indicating that the unit is busy.

19. A data processing system of pyramidal architecture of at least three levels having a bus interfacing adjacent levels thereof, comprising:
A. a first, highest level including,
1. a store containing a plurality of addressable locations each capable of retaining an instruction word to be executed,
2. a sequence controller for addressing said store to selectively retrieve first type instruction words therefrom and for placing said words on the bus interfacing the first and second levels, each such instruction word containing an operation code portion defining an operation to be performed and an operand portion defining at least one source of data to be operated upon; and
B. second and third respectively lower levels, each including,
1. a plurality of processing units of first and second types connected in parallel to the bus interfacing the respective level with the next higher level, at least one of said units being of the first type and each of said units including means for interrogating an instruction word on the bus interfacing it with the next higher level and for accepting only instruction words containing designated operation code portions,
2. each of said first type of processing unit including means for storing second type instruction words, each second type instruction word defining an operation to be performed, and further including selection means for selectively placing said first and second type instruction words on the bus of the next lower level in accordance with the operation code portion of an instruction word provided thereto from the bus of the next higher level, and
3. each of said second type of processing unit responsive to an instruction word accepted thereby to execute the instruction word as specified by the operation code portion of that instruction word by selectively performing an operation whereby that selected operation is performed on data defined by the operand portion of a first type instruction when so specified by the operation code portion of the instruction being executed.

20. A data processing system of pyramidal architecture having at least three levels, each higher level having a bus interfacing it with the next lower level, comprising:
A. a first, highest level including,
1. a store containing a plurality of addressable locations each capable of retaining an instruction word to be executed,
2. a sequence controller for placing a first type instruction word on the bus interfacing the first and second levels, each such instruction word containing an operation code portion defining at least one operation to be performed and an operand portion including a field defining at least one source of data to be operated upon; and
B. second and third respectively lower levels, each including,
1. a plurality of processing units of first and second types connected in parallel to the bus interfacing the respective level to the next higher level, at least one of said units being of said first type, each of said processing units capable of accepting only an instruction word containing an operation code portion of a prescribed content,
a. each of said first type of processing units including means for storing second type instruction words, each of said second type instruction words comprised of an operation code portion defining an operation to be performed, said first type processing unit further including recognition selection means for selectively placing an instruction word on the bus of the next lower level in accordance with the operation code portion of an instruction provided thereto from the bus of the next higher level,
b. each of said second types of processing units selectively responsive to said first and second types of instruction words accepted thereby to execute an instruction as specified by the operation code portion of that instruction by selectively performing an operation whereby that selected operation is performed on data defined by the field of the operand portion of a first type instruction when so specified by the operation code portion of the instruction being executed.

21. The invention in accordance with claim 20 wherein the field of the operand portion of the first type instruction word defines a plurality of sources of data to be operated upon and wherein the second type of processing units perform operations defined by at least one of the plurality of sources.

22. A data processing system of pyramidal architecture having at least three levels consecutively defining highest to lowest levels, each level having an instruction bus for the interconnection of adjacent levels thereof comprising:
A. a sequence controller including a store, said controller containing means for retrieving an instruction word retained in said store and for placing a retrieved word on the highest level bus serving to interconnect the first and second levels, said instruction word containing an operation code portion defining an operation to be performed and an operand portion defining data to be operated on;

B. a first plurality of processing units connected in parallel between the buses of the first and second levels, and a second plurality of processing units connected in parallel to at least one bus of the third level whereby each processing unit interfaces with the bus of the next higher level, said processing units being of two types, execution processing units and translator processing units, at least one of said processing units connected between the buses of the first and second levels being a translator processing unit, 1. each of said processing units including storage means for temporarily storing an instruction word provided thereto from the bus interfacing it with the next higher level,
2. each of said processing units including recognition means responsive to the operation code portion of the instruction word stored in its storage means to accept only instruction words containing designated operation codes,
3. each of said translator processing units comprising,
   a. an addressable store for storing at least one group of additional instruction words, each defining an operation to be performed, said addressable store being addressable from the operation code portion of the instruction word in said translator processing unit's storage means at a location therein containing the first instruction word of a group of words,
   b. means responsive to the operation code portion of the instruction word in said translator processing unit's storage means to sequentially retrieve words of an identified group from said addressable store to thereby sequentially place the retrieved instruction words on the bus of the next lower level to effect an operation in at least one processing unit at a lower level responsible for each of the instruction words so retrieved, and
4. each of said execution processing units responsive to an instruction word retrieved from a translator processing unit of the next higher level and recognized thereby to perform the operation specified by that instruction word on data defined by the operand portion of the instruction word retrieved by said sequence controller.

* * * * *